US012563546B2

(12) United States Patent
Lee et al.

(10) Patent No.: US 12,563,546 B2
(45) Date of Patent: Feb. 24, 2026

(54) UPLINK AND/OR DOWNLINK SCHEDULING ALIGNMENT FOR PERIODIC MULTIMEDIA TRAFFIC

(71) Applicant: QUALCOMM Incorporated, San Diego, CA (US)

(72) Inventors: Hyun Yong Lee, San Diego, CA (US); Prashanth Haridas Hande, San Diego, CA (US); Peerapol Tinnakornsrisuphap, San Diego, CA (US); Mickael Mondet, Louannec (FR); Diana Maamari, San Diego, CA (US); Chih-Ping Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 18/160,862

(22) Filed: Jan. 27, 2023

(65) Prior Publication Data

US 2023/0254844 A1     Aug. 10, 2023

Related U.S. Application Data

(60) Provisional application No. 63/267,768, filed on Feb. 9, 2022.

(51) Int. Cl.
| | |
|---|---|
| *H04W 72/1263* | (2023.01) |
| *H04L 5/14* | (2006.01) |
| *H04W 72/11* | (2023.01) |
| *H04W 72/23* | (2023.01) |

(52) U.S. Cl.
CPC ....... *H04W 72/1263* (2013.01); *H04L 5/1469* (2013.01); *H04W 72/11* (2023.01); *H04W 72/23* (2023.01)

(58) Field of Classification Search
CPC .... H04L 5/0053; H04L 5/1469; H04W 72/11; H04W 72/115; H04W 72/1263; H04W 72/23
See application file for complete search history.

(56) References Cited

U.S. PATENT DOCUMENTS

| | | | | |
|---|---|---|---|---|
| 7,154,846 B2 * | 12/2006 | Chen | ..................... | H04L 1/1607 370/335 |
| 9,769,789 B2 * | 9/2017 | Damnjanovic | ..... | H04W 68/005 |
| 9,781,739 B2 * | 10/2017 | Chen | ....................... | H04W 4/70 |
| 9,999,039 B2 * | 6/2018 | Vajapeyam | ........... | H04W 72/04 |

(Continued)

FOREIGN PATENT DOCUMENTS

| | | | | | |
|---|---|---|---|---|---|
| BR | 112017021715 A2 | * | 7/2018 | ........ | H04W 72/1278 |
| CN | 113906824 A | * | 1/2022 | ........ | H04W 52/0258 |

(Continued)

*Primary Examiner* — Eric Nowlin
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a plurality of first scheduling cycles that are based at least in part on a second scheduling cycle. The second scheduling cycle is based at least in part on a periodicity of multimedia traffic associated with the UE. The UE may communicate with a network entity based at least in part on the plurality of first scheduling cycles. Numerous other aspects are described.

30 Claims, 18 Drawing Sheets

(56)  References Cited

U.S. PATENT DOCUMENTS

| | | | | |
|---|---|---|---|---|
| 10,123,301 | B2 * | 11/2018 | Damnjanovic | H04W 68/005 |
| 10,412,780 | B2 * | 9/2019 | Manepalli | H04W 76/38 |
| 10,582,494 | B2 * | 3/2020 | Au | H04W 72/23 |
| 11,265,111 | B2 * | 3/2022 | Bhamri | H04L 1/1825 |
| 11,452,165 | B2 * | 9/2022 | Ang | H04W 76/28 |
| 11,457,410 | B2 * | 9/2022 | Huang | H04W 4/46 |
| 11,664,930 | B2 * | 5/2023 | Bhamri | H04L 1/08 |
| | | | | 370/329 |
| 11,700,606 | B2 * | 7/2023 | Ly | H04W 74/0833 |
| | | | | 370/329 |
| 11,706,011 | B2 * | 7/2023 | Mondet | H04L 5/0085 |
| | | | | 370/329 |
| 11,736,221 | B2 * | 8/2023 | Zewail | H04W 72/23 |
| | | | | 370/329 |
| 11,910,320 | B2 * | 2/2024 | Yang | H04B 7/0626 |
| 12,108,424 | B2 * | 10/2024 | Koziol | H04W 72/53 |
| 2002/0105929 | A1 * | 8/2002 | Chen | H04J 13/0048 |
| | | | | 370/335 |
| 2003/0067899 | A9 * | 4/2003 | Chen | H04L 1/1607 |
| | | | | 370/335 |
| 2016/0057731 | A1 * | 2/2016 | Damnjanovic | H04W 68/005 |
| | | | | 455/458 |
| 2016/0353473 | A1 * | 12/2016 | Chen | H04W 4/70 |
| 2017/0026942 | A1 * | 1/2017 | Vajapeyam | H04W 4/70 |
| 2017/0318582 | A1 * | 11/2017 | Au | H04W 28/0205 |
| 2018/0007657 | A1 * | 1/2018 | Damnjanovic | H04W 68/005 |
| 2018/0343686 | A1 * | 11/2018 | Manepalli | H04W 76/28 |
| 2020/0229155 | A1 * | 7/2020 | Chien | H04W 72/044 |
| 2020/0389933 | A1 * | 12/2020 | Ang | H04W 52/0232 |
| 2021/0037468 | A1 * | 2/2021 | Huang | H04W 72/044 |
| 2021/0218500 | A1 * | 7/2021 | Bhamri | H04W 72/21 |
| 2022/0094478 | A1 * | 3/2022 | Bhamri | H04L 1/0021 |
| 2022/0217726 | A1 * | 7/2022 | Koziol | H04W 72/53 |
| 2022/0271861 | A1 * | 8/2022 | Zewail | H04W 72/0446 |
| 2022/0361198 | A1 * | 11/2022 | Ly | H04W 72/1268 |
| 2022/0394618 | A1 * | 12/2022 | Yang | H04W 52/0232 |
| 2023/0007673 | A1 * | 1/2023 | Yao | H04W 72/23 |
| 2023/0042286 | A1 * | 2/2023 | Mondet | H04L 5/0085 |
| 2024/0137874 | A1 * | 4/2024 | Wang | H04L 5/0051 |
| 2024/0172049 | A1 * | 5/2024 | Yang | H04W 76/20 |

FOREIGN PATENT DOCUMENTS

| | | | | | |
|---|---|---|---|---|---|
| CN | 116458237 | A | * | 7/2023 | H04W 72/23 |
| CN | 117882467 | A | * | 4/2024 | H04L 5/0053 |
| CN | 113906824 | B | * | 6/2024 | H04W 52/0232 |
| EP | 2624646 | B1 | * | 12/2016 | H04W 52/0229 |
| EP | 2624635 | B1 | * | 12/2017 | H04W 76/28 |
| EP | 2947830 | B1 | * | 9/2018 | H04L 47/62 |
| EP | 3780891 | A1 | * | 2/2021 | H04W 72/20 |
| EP | 3981220 | B1 | * | 12/2023 | H04W 76/28 |
| EP | 4287760 | A1 | * | 12/2023 | H04W 76/28 |
| KR | 20210016278 | A | * | 2/2021 | H04W 72/20 |
| KR | 102416290 | B1 | * | 7/2022 | H04W 72/20 |
| WO | WO-2011020403 | A1 | * | 2/2011 | H04W 72/121 |
| WO | WO-2015113391 | A1 | * | 8/2015 | H04W 72/1273 |
| WO | WO-2016164142 | A1 | * | 10/2016 | H04W 72/20 |
| WO | WO-2020207558 | A1 | * | 10/2020 | H04W 72/53 |
| WO | WO-2020247744 | A1 | * | 12/2020 | H04W 76/28 |
| WO | WO-2021168653 | A1 | * | 9/2021 | H04W 76/28 |
| WO | WO-2022082738 | A1 | * | 4/2022 | H04W 72/54 |
| WO | WO-2023023913 | A1 | * | 3/2023 | H04L 5/0094 |

* cited by examiner

900

UE

905b
Determine a time domain resource based at least in part on a periodicity (non-integer value) of periodic multimedia traffic Network Entity 905a
Determine a time domain resource based at least in part on a periodicity (non-integer value) of periodic multimedia traffic 910
Periodic multimedia traffic in the time domain resource 1010 — Receive an indication of a plurality of first scheduling cycles that are based at least in part on a second scheduling cycle wherein the second scheduling cycle is based at least in part on a periodicity of multimedia traffic associated with a UE 1020 — Communicate with a network entity based at least in part on the plurality of first scheduling cycles

1000

1210 Obtain a scheduling cadence value that corresponds to a periodicity of multimedia traffic associated with a UE 1220 Communicate with a network entity based at least in part on the scheduling cadence value

1200

Obtain a scheduling cadence value that corresponds to a periodicity of multimedia traffic associated with a UE

1310

Communicate with the UE in a subframe based at least in part on the scheduling cadence value

1320

1300

Determine a time domain resource based at least in part on a periodicity of multimedia traffic associated with a UE, wherein the periodicity comprises a non-integer value

1410

Communicate with a network entity in the time domain resource

1420

1400

1500

1510 Determine a time domain resource based at least in part on a periodicity of multimedia traffic associated with a UE, wherein the periodicity comprises a non-integer value 1520 Communicate with the UE in the time domain resource

1

UPLINK AND/OR DOWNLINK SCHEDULING ALIGNMENT FOR PERIODIC MULTIMEDIA TRAFFIC

CROSS-REFERENCE TO RELATED APPLICATION

This Patent Applications claims priority to U.S. Provisional Patent Application No. 63/267,768, filed on Feb. 9, 2022, entitled "UPLINK AND/OR DOWNLINK SCHEDULING ALIGNMENT FOR PERIODIC MULTIMEDIA TRAFFIC," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for uplink and/or downlink scheduling alignment for periodic multimedia traffic.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive an indication of a plurality of first scheduling cycles that are based at least in part on a second scheduling cycle. The one or more processors may be configured to communicate with a network entity based at least in part on the plurality of first scheduling cycles.

Some aspects described herein relate to a network entity for wireless communication. The network entity may include a memory and one or more processors coupled to the memory. The one or more processors may be configured to transmit, to a UE, an indication of a plurality of first scheduling cycles that are based at least in part on a second scheduling cycle. The one or more processors may be configured to communicate with the UE based at least in part on the plurality of first scheduling cycles.

Some aspects described herein relate to a UE for wireless communication. The UE may include a memory and one or more processors coupled to the memory. The one or more processors may be configured to obtain a scheduling cadence value that corresponds to a periodicity of multimedia traffic associated with the UE. The one or more processors may be configured to communicate with a network entity based at least in part on the scheduling cadence value.

Some aspects described herein relate to a network entity for wireless communication. The network entity may include a memory and one or more processors coupled to the memory. The one or more processors may be configured to obtain a scheduling cadence value that corresponds to a periodicity of multimedia traffic associated with a UE. The one or more processors may be configured to communicate with the UE in a subframe based at least in part on the scheduling cadence value.

Some aspects described herein relate to a UE for wireless communication. The UE may include a memory and one or more processors coupled to the memory. The one or more processors may be configured to determine a time domain resource based at least in part on a periodicity of multimedia traffic associated with the UE. The one or more processors may be configured to communicate with a network entity in the time domain resource.

Some aspects described herein relate to a network entity for wireless communication. The network entity may include a memory and one or more processors coupled to the memory. The one or more processors may be configured to determine a time domain resource based at least in part on a periodicity of multimedia traffic associated with a UE. The one or more processors may be configured to communicate with the UE in the time domain resource.

Some aspects described herein relate to a method of wireless communication performed by a UE. The method may include receiving an indication of a plurality of first scheduling cycles that are based at least in part on a second scheduling cycle, where the second scheduling cycle is based at least in part on a periodicity of multimedia traffic associated with the UE. The method may include communicating with a network entity based at least in part on the plurality of first scheduling cycles.

Some aspects described herein relate to a method of wireless communication performed by a network entity. The method may include transmitting, to a UE, an indication of a plurality of first scheduling cycles that are based at least in part on a second scheduling cycle, where the second scheduling cycle is based at least in part on a periodicity of multimedia traffic associated with the UE. The method may include communicating with the UE based at least in part on the plurality of first scheduling cycles.

Some aspects described herein relate to a method of wireless communication performed by a UE. The method may include obtaining a scheduling cadence value that corresponds to a periodicity of multimedia traffic associated with the UE. The method may include communicating with a network entity based at least in part on the scheduling cadence value.

Some aspects described herein relate to a method of wireless communication performed by a network entity. The method may include obtaining a scheduling cadence value that corresponds to a periodicity of multimedia traffic associated with a UE. The method may include communicating with the UE in a subframe based at least in part on the scheduling cadence value.

Some aspects described herein relate to a method of wireless communication performed by a UE. The method may include determining a time domain resource based at least in part on a periodicity of multimedia traffic associated with the UE, where the periodicity comprises a non-integer value. The method may include communicating with a network entity in the time domain resource.

Some aspects described herein relate to a method of wireless communication performed by a network entity. The method may include determining a time domain resource based at least in part on a periodicity of multimedia traffic associated with a UE, where the periodicity comprises a non-integer value. The method may include communicating with the UE in the time domain resource.

Some aspects described herein relate to a non-transitory computer-readable medium that stores a set of instructions for wireless communication by a UE. The set of instructions, when executed by one or more processors of the UE, may cause the UE to receive an indication of a plurality of first scheduling cycles that are based at least in part on a second scheduling cycle. The set of instructions, when executed by one or more processors of the UE, may cause the UE to communicate with a network entity based at least in part on the plurality of first scheduling cycles.

Some aspects described herein relate to a non-transitory computer-readable medium that stores a set of instructions for wireless communication by a network entity. The set of instructions, when executed by one or more processors of the network entity, may cause the network entity to transmit, to a UE, an indication of a plurality of first scheduling cycles that are based at least in part on a second scheduling cycle. The set of instructions, when executed by one or more processors of the network entity, may cause the network entity to communicate with the UE based at least in part on the plurality of first scheduling cycles.

Some aspects described herein relate to a non-transitory computer-readable medium that stores a set of instructions for wireless communication by a UE. The set of instructions, when executed by one or more processors of the UE, may cause the UE to obtain a scheduling cadence value that corresponds to a periodicity of multimedia traffic associated with the UE. The set of instructions, when executed by one or more processors of the UE, may cause the UE to communicate with a network entity based at least in part on the scheduling cadence value.

Some aspects described herein relate to a non-transitory computer-readable medium that stores a set of instructions for wireless communication by a network entity. The set of instructions, when executed by one or more processors of the network entity, may cause the network entity to obtain a scheduling cadence value that corresponds to a periodicity of multimedia traffic associated with a UE. The set of instructions, when executed by one or more processors of the network entity, may cause the network entity to communicate with the UE in a subframe based at least in part on the scheduling cadence value.

Some aspects described herein relate to a non-transitory computer-readable medium that stores a set of instructions for wireless communication by a UE. The set of instructions, when executed by one or more processors of the UE, may cause the UE to determine a time domain resource based at least in part on a periodicity of multimedia traffic associated with the UE. The set of instructions, when executed by one or more processors of the UE, may cause the UE to communicate with a network entity in the time domain resource.

Some aspects described herein relate to a non-transitory computer-readable medium that stores a set of instructions for wireless communication by a network entity. The set of instructions, when executed by one or more processors of the network entity, may cause the network entity to determine a time domain resource based at least in part on a periodicity of multimedia traffic associated with a UE. The set of instructions, when executed by one or more processors of the network entity, may cause the network entity to communicate with the UE in the time domain resource.

Some aspects described herein relate to an apparatus for wireless communication. The apparatus may include means for receiving an indication of a plurality of first scheduling cycles that are based at least in part on a second scheduling cycle, where the second scheduling cycle is based at least in part on a periodicity of multimedia traffic associated with the apparatus. The apparatus may include means for communicating with a network entity based at least in part on the plurality of first scheduling cycles.

Some aspects described herein relate to an apparatus for wireless communication. The apparatus may include means for transmitting, to a UE, an indication of a plurality of first scheduling cycles that are based at least in part on a second scheduling cycle, where the second scheduling cycle is based at least in part on a periodicity of multimedia traffic associated with the UE. The apparatus may include means for communicating with the UE based at least in part on the plurality of first scheduling cycles.

Some aspects described herein relate to an apparatus for wireless communication. The apparatus may include means for obtaining a scheduling cadence value that corresponds to a periodicity of multimedia traffic associated with the apparatus. The apparatus may include means for communicating with a network entity based at least in part on the scheduling cadence value.

Some aspects described herein relate to an apparatus for wireless communication. The apparatus may include means for obtaining a scheduling cadence value that corresponds to a periodicity of multimedia traffic associated with a UE. The apparatus may include means for communicating with the UE in a subframe based at least in part on the scheduling cadence value.

Some aspects described herein relate to an apparatus for wireless communication. The apparatus may include means for determining a time domain resource based at least in part on a periodicity of multimedia traffic associated with the apparatus, where the periodicity comprises a non-integer value. The apparatus may include means for communicating with a network entity in the time domain resource.

Some aspects described herein relate to an apparatus for wireless communication. The apparatus may include means for determining a time domain resource based at least in part on a periodicity of multimedia traffic associated with a UE, where the periodicity comprises a non-integer value. The apparatus may include means for communicating with the UE in the time domain resource.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
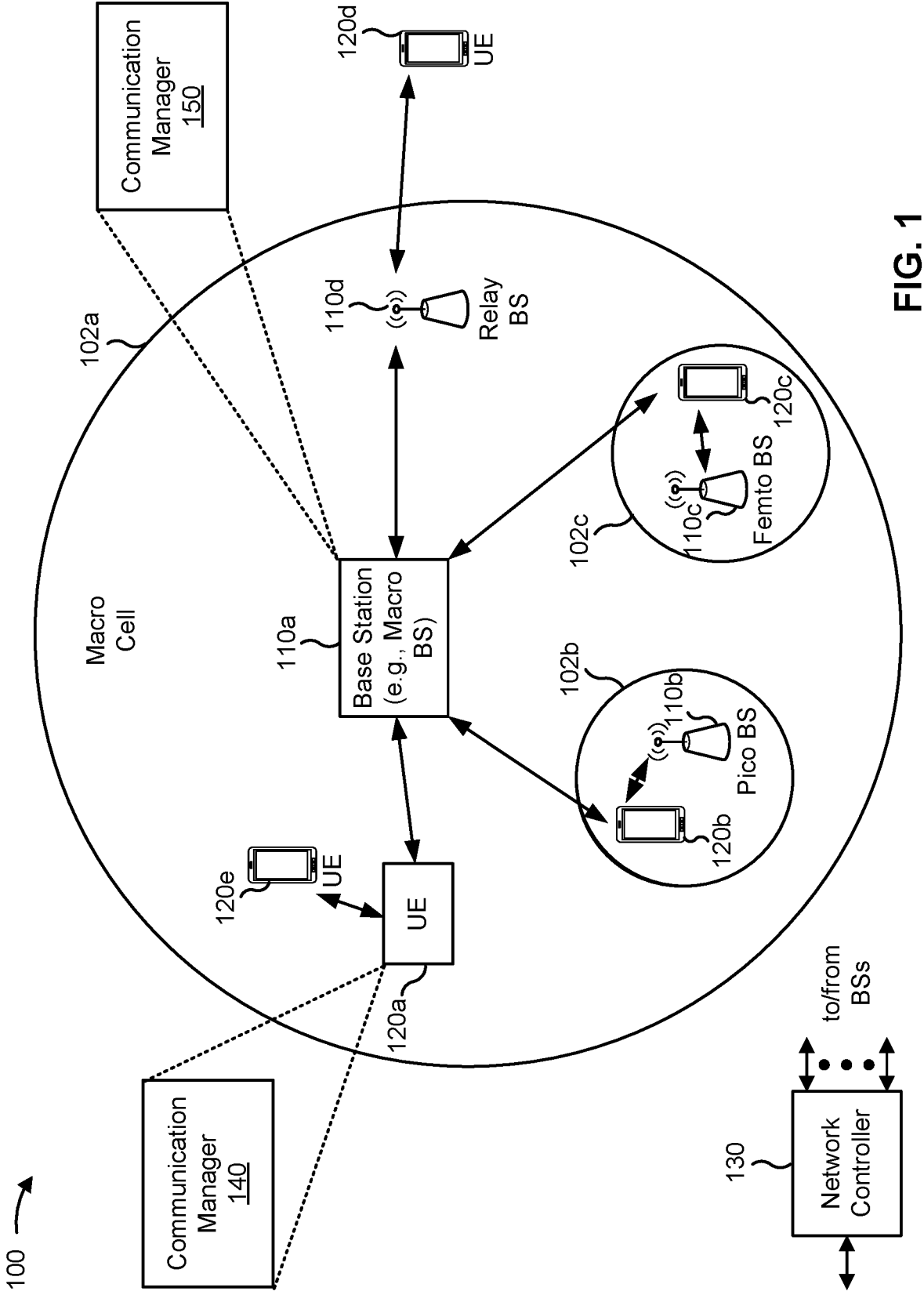
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE 120 may include a communication manager 140. As described in more detail elsewhere herein, the communication manager 140 may receive an indication of a plurality of first scheduling cycles that are based at least in part on a second scheduling cycle, wherein the second scheduling cycle is based at least in part on a periodicity of multimedia traffic associated with the UE 120; and communicate with a network entity such as a base station 110 based at least in part on the plurality of first scheduling cycles.

As described in more detail elsewhere herein, the communication manager 140 may obtain a scheduling cadence value that corresponds to a periodicity of multimedia traffic associated with the UE 120; and communicate with a network entity such as a base station 110 based at least in part on the scheduling cadence value.

As described in more detail elsewhere herein, the communication manager 140 may determine a time domain resource based at least in part on a periodicity of multimedia traffic associated with the UE 120, wherein the periodicity comprises a non-integer value; and communicate with a network entity, such as a base station 110, in the time domain resource.

Additionally, or alternatively, the communication manager 140 may perform one or more other operations described herein.

In some aspects, a base station 110 or another network entity in the wireless network 100 may include a communication manager 150. As described in more detail elsewhere herein, the communication manager 150 may transmit, to a UE 120, an indication of a plurality of first scheduling cycles that are based at least in part on a second scheduling cycle, wherein the second scheduling cycle is based at least in part on a periodicity of multimedia traffic associated with the UE 120; and communicate with the UE 120 based at least in part on the plurality of first scheduling cycles.

As described in more detail elsewhere herein, the communication manager 150 may obtain a scheduling cadence value that corresponds to a periodicity of multimedia traffic associated with a UE 120; and communicate with the UE 120 in a subframe based at least in part on the scheduling cadence value.

As described in more detail elsewhere herein, the communication manager 150 may determine a time domain resource based at least in part on a periodicity of multimedia traffic associated with a UE 120, wherein the periodicity comprises a non-integer value; and communicate with the UE 120 in the time domain resource.

Additionally, or alternatively, the communication manager 150 may perform one or more other operations described herein.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (MC), or a Non-Real Time (Non-RT) MC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

As indicated above, FIG. 1 is provided as an example. Other examples may differ from what is described with regard to FIG. 1.

Figure 2:
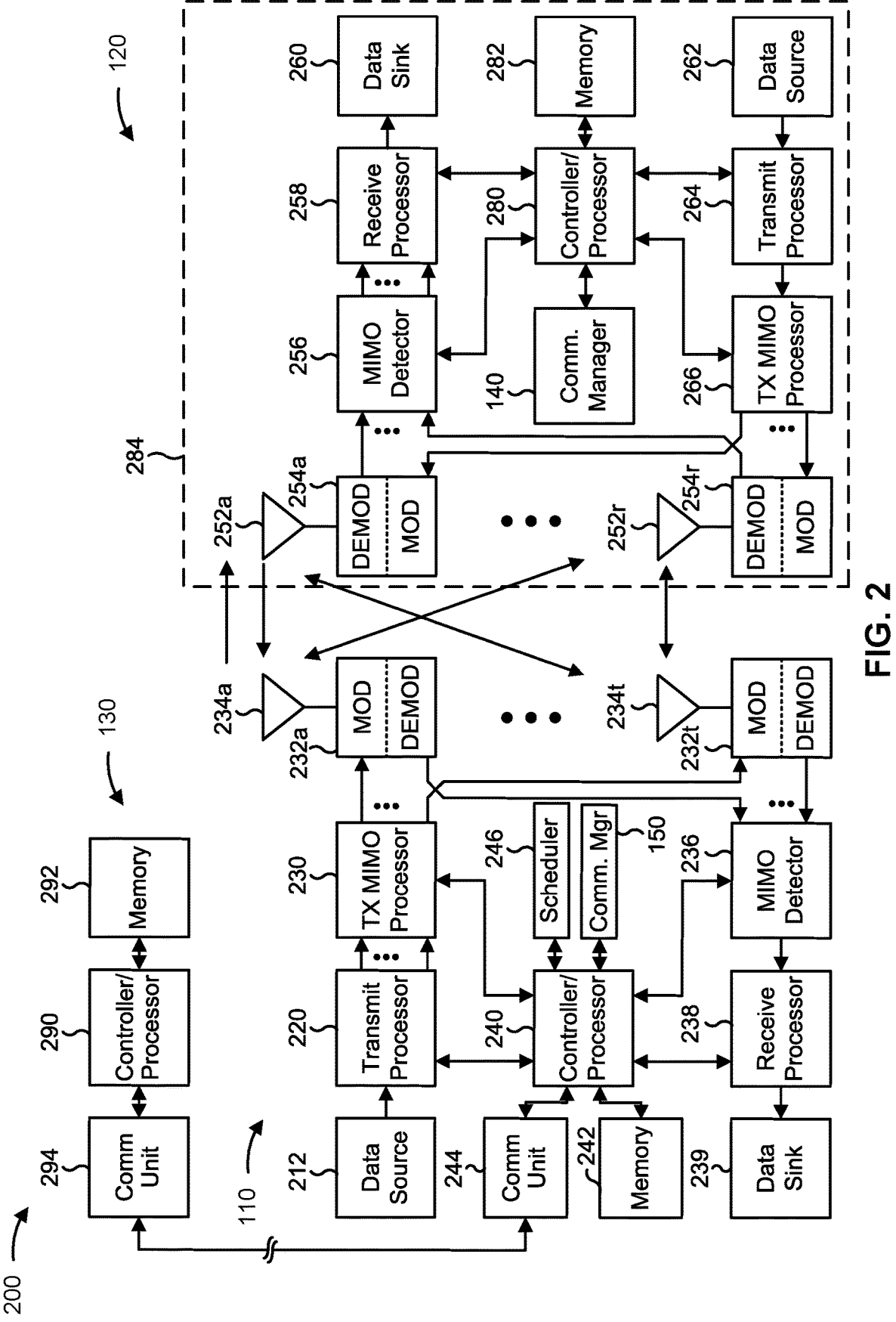
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-17).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-17).

The controller/processor 240 of the base station 110, the controller/processor 280 of the UE 120, and/or any other component(s) of FIG. 2 may perform one or more techniques associated with uplink and/or downlink scheduling alignment for periodic multimedia traffic, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, process 1300 of FIG. 13, process 1400 of FIG. 14, process 1500 of FIG. 15, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, process 1300 of FIG. 13, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, a UE 120 includes means for receiving an indication of a plurality of first scheduling cycles that are based at least in part on a second scheduling cycle, wherein the second scheduling cycle is based at least in part on a periodicity of multimedia traffic associated with the UE 120; and/or means for communicating with a network entity based at least in part on the plurality of first scheduling cycles. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station 110 and/or another type of network entity includes means for transmitting, to a UE 120, an indication of a plurality of first scheduling cycles that are based at least in part on a second scheduling cycle, wherein the second scheduling cycle is based at least in part on a periodicity of multimedia traffic associated with the UE 120; and/or means for communicating with the UE 120 based at least in part on the plurality of first scheduling cycles. In some aspects, the means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE 120 includes means for obtaining a scheduling cadence value that corresponds to a periodicity of multimedia traffic associated with the UE 120; and/or means for communicating with a network entity based at least in part on the scheduling cadence value. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station 110 and/or another type of network entity includes means for obtaining a scheduling cadence value that corresponds to a periodicity of multimedia traffic associated with a UE 120; and/or means for communicating with the UE 120 in a subframe based at least in part on the scheduling cadence value. In some aspects, the means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE 120 includes means for determining a time domain resource based at least in part on a periodicity of multimedia traffic associated with the UE 120, wherein the periodicity comprises a non-integer value; and/or means for communicating with a network entity in the time domain resource. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station 110 and/or another type of network entity includes means for determining a time domain resource based at least in part on a periodicity of multimedia traffic associated with a UE 120, wherein the periodicity comprises a non-integer value; and/or means for communicating with the UE 120 in the time domain resource. In some aspects, the means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
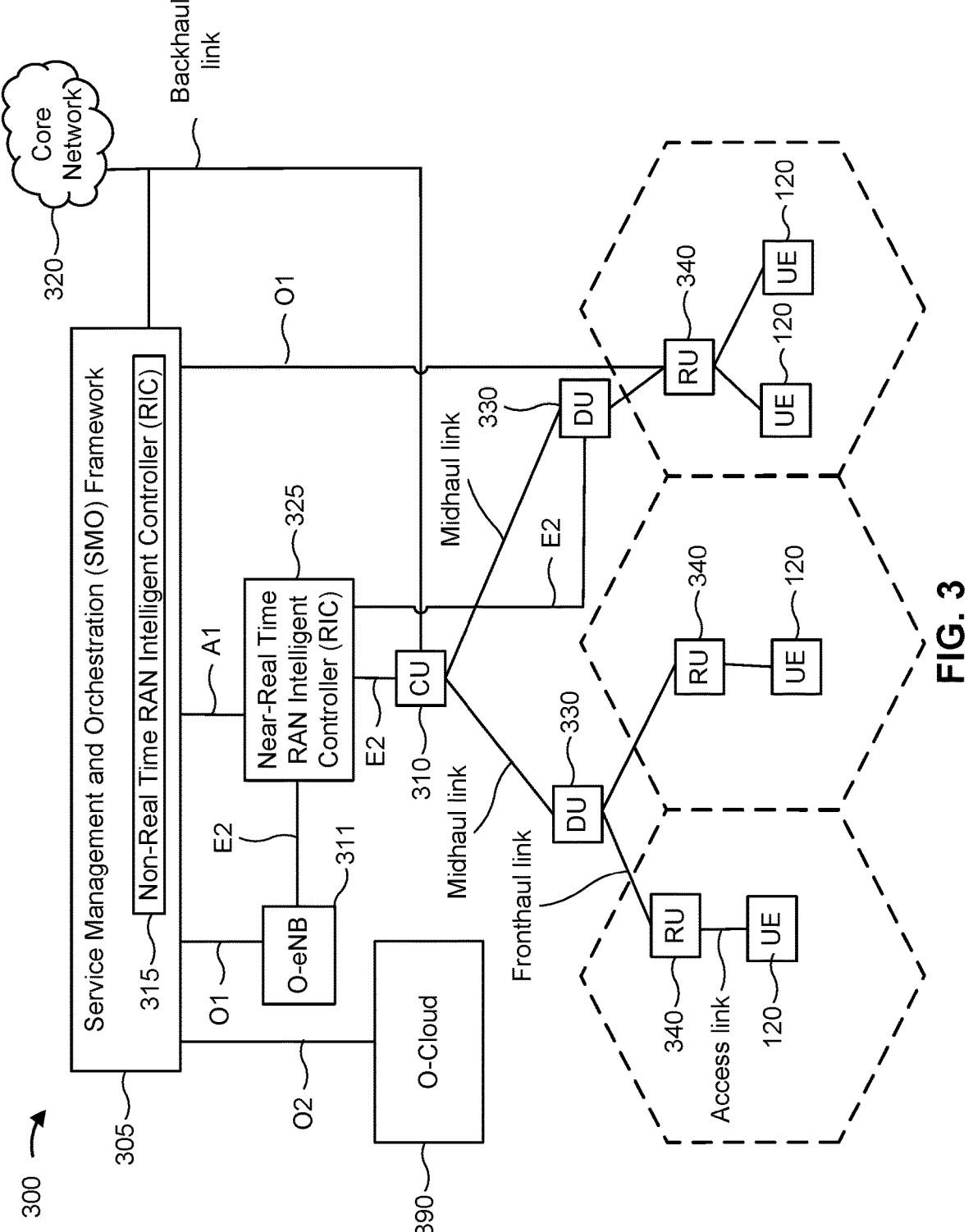
FIG. 3 is a diagram illustrating an example 300 of an open radio access network (O-RAN) architecture, in accordance with the present disclosure.

FIG. 3 is a diagram illustrating an example of a disaggregated base station architecture 300. The disaggregated base station architecture 300 may include a plurality of network entities, such as one or more central units (CUs) 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) MC 315 associated with a Service Management and Orchestration (SMO) Framework 305, or both). A CU 310 may communicate with one or more network entities such as distributed units (DUs) 330 via respective midhaul links, such as an F1 interface. The DUs 330 may communicate with one or more network entities, such as radio units (RUs) 340 via respective fronthaul links. The RUs 340 may communicate with respective UEs 120 via one or more radio frequency (RF) access links. In some aspects, the UE 120 may be simultaneously served by multiple RUs 340. In some aspects, a UE 120 may include an extended reality (XR) device and/or may be associated with an XR device.

Each of the units (i.e., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter, or a transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
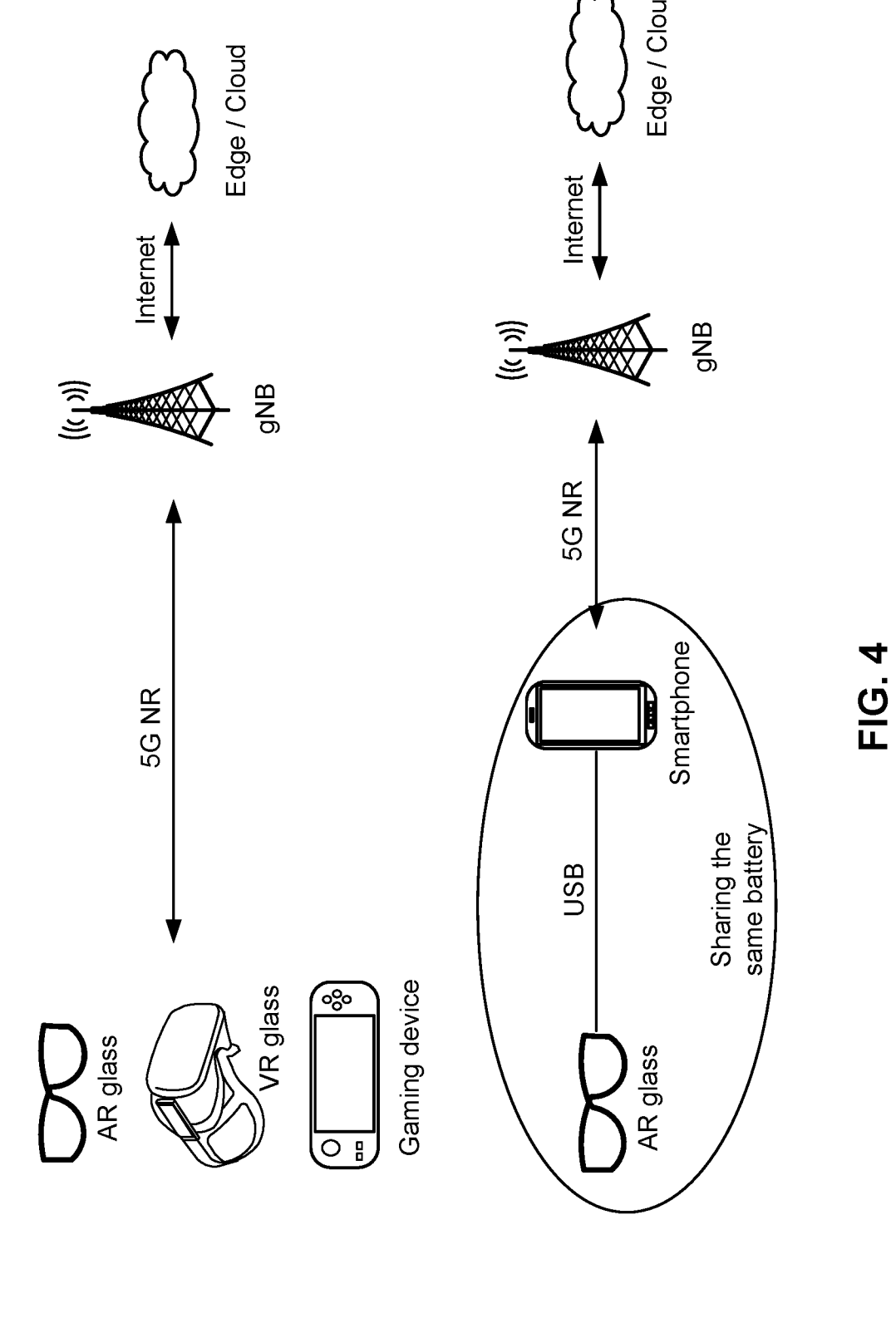
FIG. 4 is a diagram illustrating an example of devices designed for periodic multimedia traffic applications, in accordance with the present disclosure.

FIG. 4 is a diagram illustrating an example 400 of devices designed for periodic multimedia traffic applications, in accordance with the present disclosure.

Some devices, including devices for XR and/or gaming, may require low-latency traffic to and from an edge server or a cloud environment. The traffic to and from the edge server or the cloud environment may be periodic, to support a particular frame rate (e.g., 120 frames per second (FPS), 90 FPS, 60 FPS) and/or a particular refresh rate (e.g., 500 Hertz (Hz), 120 (Hz)) for multimedia traffic applications such as XR and/or gaming.

Example 400 shows communications between an XR device and the edge server or the cloud environment, via a base station (e.g., a gNB, a base station 110, and/or another type of network entity described in connection with FIG. 3). The XR device may be an augmented reality (AR) glasses device, a virtual reality (VR) glass device, or other gaming device. XR devices may have limited battery capacity while being expected to have a battery life of a smartphone (e.g., full day of use). Battery power is an issue even when the XR device is tethered to a smartphone and uses the same smartphone battery. XR device power dissipation may be limited and may lead to an uncomfortable user experience and/or a short battery life.

An XR device may include a UE 120 or may be associated with a UE 120. Multimedia traffic applications for an XR device (or for another type of gaming device such as a UE 120) may include a video game (e.g., where multimedia traffic is transferred to and from an edge server or a cloud environment at a particular frame rate to support audio and/or video rendering) and/or a VR environment (e.g., where multimedia traffic is transferred to and from an edge server or a cloud environment at a particular polling rate to support sensor (e.g., 6 degrees of freedom (6DOF) sensor input and feedback)), among other examples.

As indicated above, FIG. 4 is provided as an example. Other examples may differ from what is described with regard to FIG. 4.

Figure 5A:
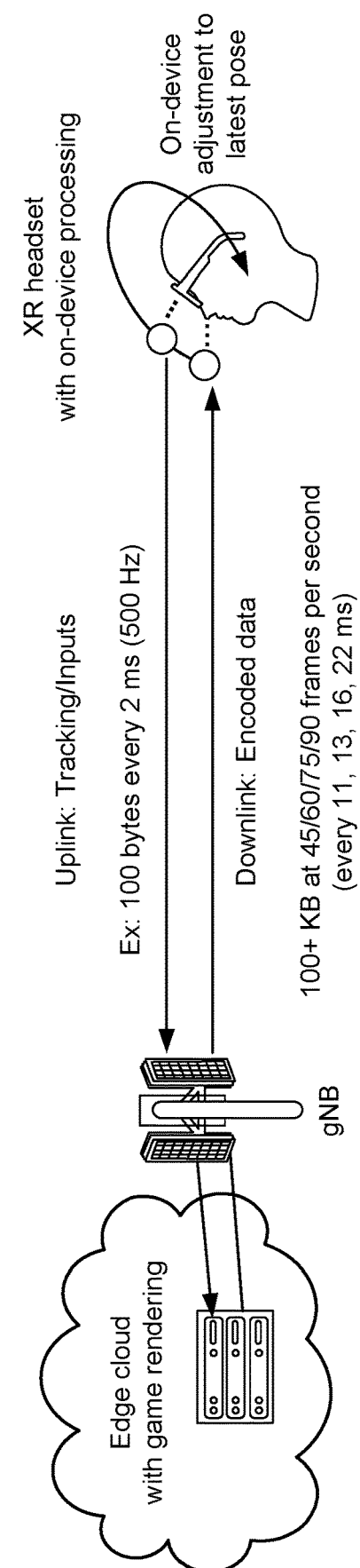
FIGS. 5A and 5B are diagrams illustrating examples of periodic multimedia traffic and associated scheduling techniques, in accordance with the present disclosure.
Figure 5B:
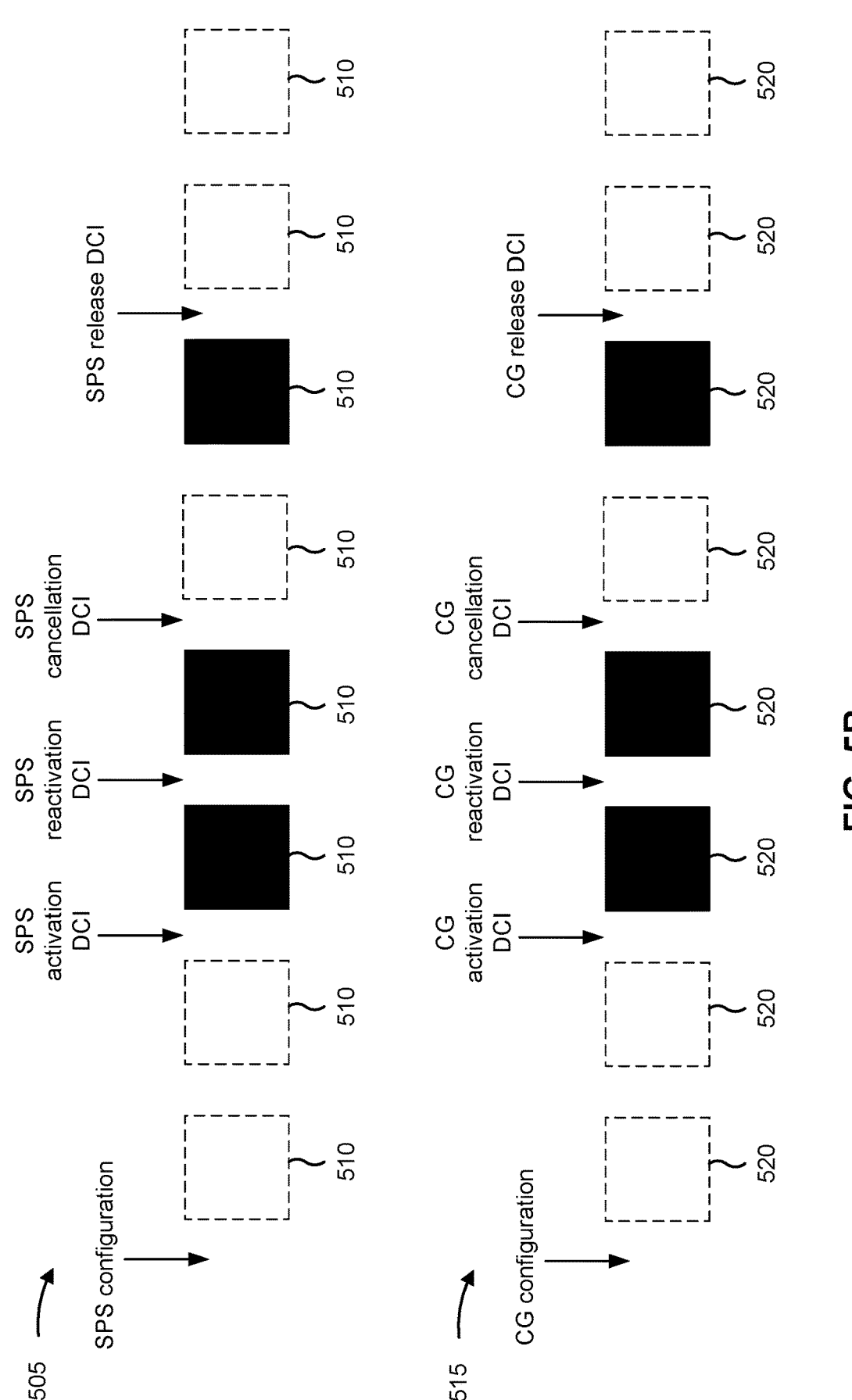

FIGS. 5A and 5B are diagrams illustrating examples of periodic multimedia traffic and associated scheduling techniques, in accordance with the present disclosure.

Turning to FIG. 5A, in an example 500, power dissipation may be reduced by limiting an amount of time that processing resources of the XR device are active for computations and power consumption. Some wireless communications systems may a support a UE 120, such as the XR device, that operates based at least in part on periodic multimedia traffic, as described above in connection with FIG. 4.

By offloading some computations to an edge server, an XR device may conserve processing resources. Moreover, this may enable an XR device to provide graphic fidelity (e.g., texture detail, anti-aliasing, ray tracing) that might not otherwise be achievable using the memory and processing resources of the XR device to perform video rendering, as the video rendering may performed by the edge server (which typically has more powerful memory and processing resources).

Example 500 shows a scenario where an XR device may split computations for an application with the edge server on the other side of a base station (e.g., a base station 110 and/or another type of network entity described above in connection with FIG. 3). The edge server may render video frames, such as intra-coded (I) frames and predicted (P) frames, encode the video frames, align the video frames with user pose information, and perform other related computations. However, this means there may be more traffic between the XR device and the edge server, which will cause the XR device to consume more power and signaling resources.

Periodic multimedia traffic for an XR device (or another type of UE 120 or gaming device) may include downlink traffic (e.g., video frames) that has a periodic pattern corresponding to a frame rate of transmitted video data (e.g., H.264/H.265 encoded video). Such downlink traffic may be quasi-periodic with a data burst every frame at one frame-per-second (1/fps), or two possibly staggered "eye-buffers" per frame at 1/(2*fps). For example, downlink traffic for an XR device may include 100+ kilobytes (KB) of data for 45, 60, 75, or 90 frames per second (e.g., every 11 milli-seconds (ms), 13 ms, 16 ms, or 22 ms). Periodic multimedia traffic for an XR device (or another type of UE 120 or gaming device) may also include uplink traffic that is periodic. For example, controller information for gaming, information for VR split rendering, and/or the user pose information may be polled (e.g., by an associated UE 120, by an edge cloud) at a particular rate (e.g., 500 Hz, 1000 Hz) to determine input updates (which may correspond to movement or actions in a video game or movement of a VR headset, for example). The uplink traffic may include 100 bytes every 2 ms (500 Hz), for example. However, other examples are within the scope of the present disclosure.

FIG. 5B is a diagram illustrating an example 505 of downlink semi-persistent scheduling (SPS) communication and an example 515 of uplink configured grant (CG) communication, in accordance with the present disclosure. CG communication and SPS communication may be implemented in a wireless network (e.g., the wireless network 100) to support periodic multimedia traffic described herein for XR use cases, gaming use cases, and/or other types of use cases.

SPS communications may include periodic downlink communications that are configured for a UE (e.g., a UE 120, an XR device, a gaming device), such that a network entity (e.g., a base station 110, a CU 310, a DU 330, an RU 340) does not need to send separate downlink control information (DCI) to schedule each downlink communication, thereby conserving signaling overhead. CG communications may include periodic uplink communications that are configured for a UE, such that a network entity does not need to send separate DCI to schedule each uplink communication, thereby conserving signaling overhead and reducing latency.

As shown in the example 505, a UE may be configured with an SPS configuration for SPS communications. For example, the UE may receive the SPS configuration via a radio resource control (RRC) communication transmitted by a network entity. The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 510 for the UE. The SPS configuration may also configure hybrid automatic repeat request (HARQ)-acknowledgement (ACK) (HARQ-ACK) feedback resources for the UE to transmit HARQ-ACK feedback for SPS physical downlink shared channel (PDSCH) communications received in the SPS occasions 510. For example, the SPS configuration may indicate a PDSCH-to-HARQ feedback timing value, which may be referred to as a K1 value in a wireless communication standard (e.g., a 3GPP standard).

The network entity may transmit SPS activation DCI to the UE to activate the SPS configuration for the UE. The network entity may indicate, in the SPS activation DCI, communication parameters, such as an MCS, a resource block (RB) allocation, and/or antenna ports, for the SPS PDSCH communications to be transmitted in the scheduled SPS occasions 510. The UE may begin monitoring the SPS occasions 510 based at least in part on receiving the SPS activation DCI. For example, beginning with a next scheduled SPS occasion 510 subsequent to receiving the SPS activation DCI, the UE may monitor the scheduled SPS occasions 510 to decode PDSCH communications using the communication parameters indicated in the SPS activation DCI. The UE may refrain from monitoring configured SPS occasions 510 prior to receiving the SPS activation DCI.

The network entity may transmit SPS reactivation DCI to the UE to change the communication parameters for the SPS PDSCH communications. Based at least in part on receiving the SPS reactivation DCI, the UE may begin monitoring the scheduled SPS occasions 510 using the communication parameters indicated in the SPS reactivation DCI. For example, beginning with a next scheduled SPS occasion 510 subsequent to receiving the SPS reactivation DCI, the UE may monitor the scheduled SPS occasions 510 to decode PDSCH communications based on the communication parameters indicated in the SPS reactivation DCI.

In some cases, such as when the network entity does not have downlink traffic to transmit to the UE, the network entity may transmit SPS cancellation DCI to the UE to temporarily cancel or deactivate one or more subsequent SPS occasions 510 for the UE. The SPS cancellation DCI may deactivate only a subsequent one SPS occasion 510 or a subsequent N SPS occasions 510 (where N is an integer).

SPS occasions 510 after the one or more (e.g., N) SPS occasions 510 subsequent to the SPS cancellation DCI may remain activated. Based at least in part on receiving the SPS cancellation DCI, the UE may refrain from monitoring the one or more (e.g., N) SPS occasions 510 subsequent to receiving the SPS cancellation DCI. As shown in example 505, the SPS cancellation DCI cancels one subsequent SPS occasion 510 for the UE. After the SPS occasion 510 (or N SPS occasions) subsequent to receiving the SPS cancellation DCI, the UE may automatically resume monitoring the scheduled SPS occasions 510.

The network entity may transmit SPS release DCI to the UE to deactivate the SPS configuration for the UE. The UE may stop monitoring the scheduled SPS occasions 510 based at least in part on receiving the SPS release DCI. For example, the UE may refrain from monitoring any scheduled SPS occasions 510 until another SPS activation DCI is received from the network entity. Whereas the SPS cancellation DCI may deactivate only a subsequent one SPS occasion 510 or a subsequent N SPS occasions 510, the SPS release DCI deactivates all subsequent SPS occasions 510 for a given SPS configuration for the UE until the given SPS configuration is activated again by a new SPS activation DCI.

As shown in example 515, a UE may be configured with a CG configuration for CG communications. For example, the UE may receive the CG configuration via an RRC communication transmitted by a network entity. The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 520 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

In some aspects, the RRC communication also functions as the activation for the CG configuration. This is referred to as Type 1 configured grant. In some aspects, the network entity may further transmit CG activation DCI to the UE to activate the CG configuration for the UE. This is referred to as Type 2 configured grant. The network entity may indicate, in the CG activation DCI, communication parameters, such as an MCS, an RB allocation, and/or antenna ports, for the CG physical uplink shared channel (PUSCH) communications to be transmitted in the scheduled CG occasions 520. The UE may begin transmitting in the CG occasions 520 based at least in part on receiving the CG activation DCI. For example, beginning with a next scheduled CG occasion 520 subsequent to receiving the CG activation DCI, the UE may transmit a PUSCH communication in the scheduled CG occasions 520 using the communication parameters indicated in the CG activation DCI. The UE may refrain from transmitting in configured CG occasions 520 prior to receiving the CG activation DCI.

The network entity may transmit CG reactivation DCI to the UE to change the communication parameters for the CG PUSCH communications. Based at least in part on receiving the CG reactivation DCI, and the UE may begin transmitting in the scheduled CG occasions 520 using the communication parameters indicated in the CG reactivation DCI. For example, beginning with a next scheduled CG occasion 520 subsequent to receiving the CG reactivation DCI, the UE may transmit PUSCH communications in the scheduled CG occasions 520 based at least in part on the communication parameters indicated in the CG reactivation DCI.

In some cases, such as when the network entity needs to override a scheduled CG communication for a higher priority communication, the network entity may transmit CG cancellation DCI to the UE to temporarily cancel or deactivate one or more subsequent CG occasions 520 for the UE. The CG cancellation DCI may deactivate only a subsequent one CG occasion 515 or a subsequent N CG occasions 520 (where N is an integer). CG occasions 520 after the one or more (e.g., N) CG occasions 520 subsequent to the CG cancellation DCI may remain activated. Based at least in part on receiving the CG cancellation DCI, the UE may refrain from transmitting in the one or more (e.g., N) CG occasions 520 subsequent to receiving the CG cancellation DCI. As shown in example 515, the CG cancellation DCI cancels one subsequent CG occasion 520 for the UE. After the CG occasion 520 (or N CG occasions) subsequent to receiving the CG cancellation DCI, the UE may automatically resume transmission in the scheduled CG occasions 520.

The network entity may transmit CG release DCI to the UE to deactivate the CG configuration for the UE. The UE may stop transmitting in the scheduled CG occasions 520 based at least in part on receiving the CG release DCI. For example, the UE may refrain from transmitting in any scheduled CG occasions 520 until another CG activation DCI is received from the network entity. Whereas the CG cancellation DCI may deactivate only a subsequent one CG occasion 515 or a subsequent N CG occasions 520, the CG release DCI deactivates all subsequent CG occasions 520 for a given CG configuration for the UE until the given CG configuration is activated again by a new CG activation DCI.

As indicated above, FIGS. 5A and 5B are provided as examples. Other examples may differ from what is described with regard to FIGS. 5A and 5B.

As described above, CG and/or SPS techniques may be implemented in a wireless network to support periodic multimedia traffic for XR use cases, gaming use cases, and/or other types of use cases. However, CG and/or SPS techniques may have limitations that reduce their effectiveness in supporting periodic multimedia traffic. For example, in 3GPP Release 17, CG and/or SPS techniques do not support non-integer value scheduling cycles. "Scheduling cycle," as described herein, refers to a time duration between consecutive occasions, which may correspond to the periodicity of periodic multimedia traffic or may correspond to time durations between SPS occasions or between CG occasions.

Often, the period of periodic multimedia traffic corresponds to a non-integer value. For example, a video game that operates at 120 Hz corresponds to periodic multimedia traffic having a period of approximately 8.33 ms. Thus, a network entity and a UE may be unable to align periodic multimedia traffic with CG and/or SPS integer value CG/SPS scheduling cycles supported in the wireless network. This may result in drift for periodic multimedia traffic (e.g., the divergence of the period for the periodic multimedia traffic and the CG/SPS scheduling cycles configured/scheduled for the UE), which may increase latency for a multimedia application for the UE, may increase lag for the multimedia application for the UE, may increase the quantity of dropped video frames for a multimedia application for the UE, may reduce a frame rate for a multimedia application for the UE, and/or may reduce responsiveness of controller inputs for a multimedia application for the UE, among other examples.

Some aspects described herein provide various techniques for uplink and/or downlink scheduling alignment for periodic multimedia traffic. The techniques described herein enable a network entity (e.g., a base station 110, a CU 310, a DU 330, an RU 340, and/or another type of network entity) and a UE (e.g., a UE 120) to align CG scheduling cycles and/or SPS scheduling cycles (e.g., a plurality of first scheduling cycles) with the scheduling cycle (e.g., a second scheduling cycle) associated with periodic multimedia traffic for a multimedia application of the UE, such as a VR application, a gaming application, an XR application, and/or another type of multimedia application in which bursts of periodic multimedia traffic are used. In particular, the scheduling cycle associated with the periodic multimedia traffic is based at least in part on a periodicity of the periodic multimedia traffic, and therefore basing the CG scheduling cycles and/or SPS scheduling cycles on the scheduling cycle associated with the periodic multimedia traffic enables the CG scheduling cycles and/or SPS scheduling cycles to be closely aligned with the periodicity of the periodic multimedia traffic. The network entity may transmit (e.g., to the UE) an indication of the indication of the CG scheduling cycles and/or SPS scheduling cycles (e.g., a plurality of first scheduling cycles), that are based at least in part on the scheduling cycle (e.g., a second scheduling cycle) associated with the periodic multimedia traffic, so that the UE can use the CG scheduling cycles and/or SPS scheduling cycles to identify uplink and/or downlink resources that closely align with the periodicity of the periodic multimedia traffic. This may reduce drift of periodic multimedia traffic and may increase alignment of the periodic multimedia traffic with CG scheduling cycles and/or SPS scheduling cycles configured/scheduled for the UE, which may reduce latency for a multimedia application for the UE, may reduce lag for the multimedia application for the UE, may reduce the quantity of dropped video frames for a multimedia application for the UE, may increase a frame rate for a multimedia application for the UE, and/or may increase responsiveness of controller inputs for a multimedia application for the UE, among other examples.

Figure 6:
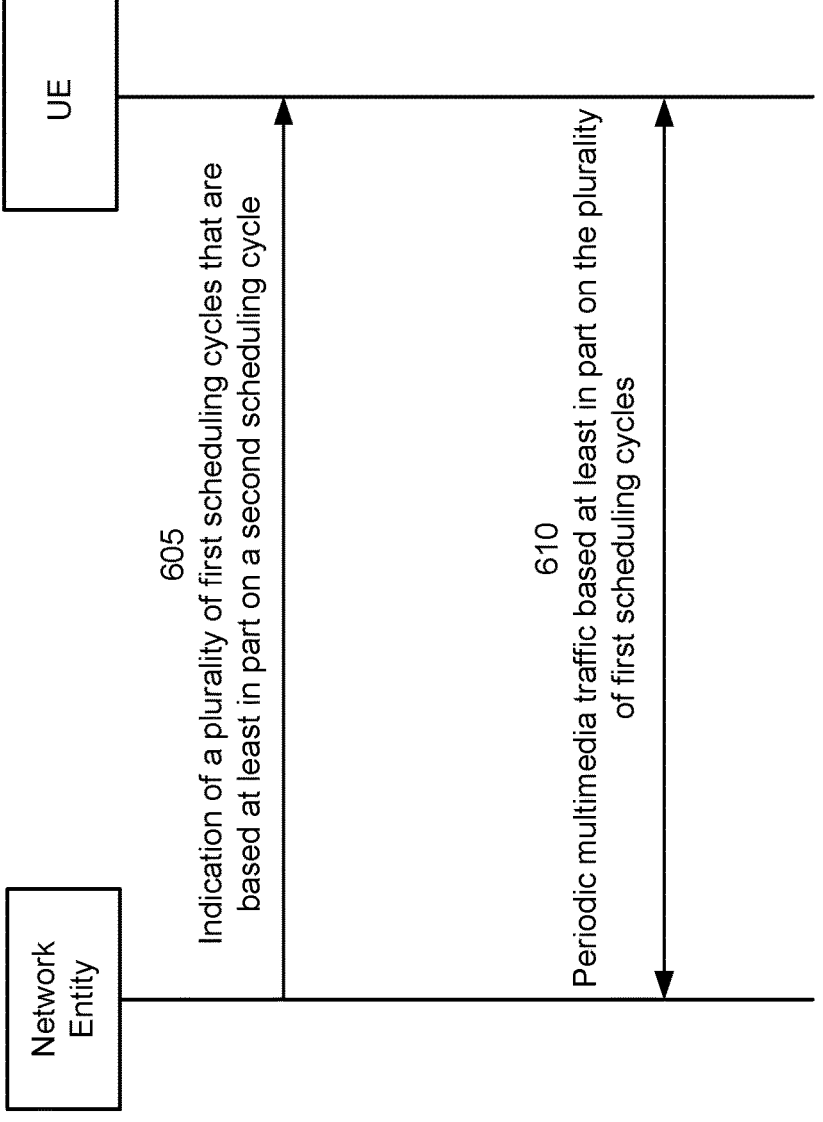
FIGS. 6-9 are diagrams illustrating examples associated with uplink and/or downlink scheduling alignment for periodic multimedia traffic, in accordance with the present disclosure.

FIG. 6 is a diagram illustrating an example 600 of uplink and/or downlink scheduling alignment for periodic multimedia traffic, in accordance with the present disclosure. As shown in FIG. 6, the example 600 may include communication between a network entity (e.g., a base station 110, a CU 310, a DU 330, an RU 340, and/or another type of network entity) and a UE (e.g., a UE 120). The network entity and the UE may be included in a wireless network such as the wireless network 100. The network entity and the UE may communicate on an uplink and on a downlink in the wireless network. The UE may include or may be associated with an XR device, a gaming device, and/or another type of device that is configured to operate according to a periodic multimedia traffic application, as described herein.

The example 600 of FIG. 6 includes an example in which the network entity and the UE determine and/or adapt a plurality of non-uniform CG scheduling cycles and/or a plurality of non-uniform SPS scheduling cycles to support periodic multimedia traffic having a non-integer value periodicity for the UE. In particular, the network entity (and in some cases, the UE) uses a two-level scheduling cycle technique to determine and/or adapt a plurality of non-uniform CG scheduling cycles and/or a plurality of non-uniform SPS scheduling cycles to support periodic multimedia traffic having a non-integer value periodicity for the UE.

As shown in FIG. 6, and at 605 in the example 600, the network entity transmits (and the UE receives) an indication of a plurality of first scheduling cycles that are based at least in part on a second scheduling cycle. The second scheduling cycle includes and/or refers to one or more periods of the periodic multimedia traffic. The network entity determines and/or selects the duration of the second scheduling cycle to correspond to an integer value that is a multiple of the periodicity of the periodic multimedia traffic.

As an example, for a video game that operates at 120 fps, the periodicity for the periodic multimedia traffic associated with the video game may be approximately 8.33 ms. The network entity may determine the second scheduling cycle to be 25 ms (e.g., an integer value that is a multiple of 3 of the periodicity of the periodic multimedia traffic). In some aspects, the network entity determines the second scheduling cycle to be an integer value that is the lowest multiple of the periodicity of the periodic multimedia traffic.

In some aspects, the network entity determines the second scheduling cycle to be an integer value that is other than the lowest multiple of the periodicity of the periodic multimedia traffic. This may occur, for example, where the network entity is to align the second scheduling cycle with a system periodicity in the wireless network. For example, the network entity may determine the second scheduling cycle such that an ending time of the second scheduling cycle is aligned with a time division duplexing (TDD) system periodicity in the wireless network. As an example, the network entity may determine an initial time duration for the second scheduling cycle as 125 ms. However, if the initial time duration results in misalignment of the ending time of the second scheduling cycle and the TDD system periodicity (e.g., a 2 ms periodicity), the network entity may increase the time duration of the second scheduling cycle until the ending time of the second scheduling cycle aligns with the TDD system periodicity and is still a multiple of the periodicity of the periodic multimedia traffic for the UE (e.g., 250 ms for a 20.833 ms periodicity corresponding to a 48 Hz sampling rate).

The TTD system alignment may be implicit, or the available uplink/downlink resource pattern for SPS/CG may be explicitly indicated in an RRC communication, such that the ending time of the second scheduling cycle may be aligned with the TDD system. Such an alignment technique may be included in a wireless standard, such as 3GPP TS 38.321 Release 18. Supporting signaling may be included in a wireless standard, such as 3GPP TS 38.331 Release 18. For example, a TDD resource pattern periodicity for CG/SPS transmission may be defined (e.g., DDDSU cgTddPattern-Periodicity=2.5 ms, spsTddPatternPeriodicity=2.5 ms), where the sum of dl-UL-TransmissionPeriodicity of pattern 1 and pattern 2 in TDD-UL-DL-ConfigCommon dl-UL-TransmissionPeriodicity ENUMERATED {ms0p5, ms0p625, ms1, ms1p25, ms2, ms2p5, ms5, ms10. As another example, a TDD resource bitmap may be used to indicate which slots are available for CG/SPS transmission (e.g., DDDSU cgBitmap=[00001], spsBitmap=[11110]).

The second scheduling cycle may also be referred to as an outer scheduling cycle in that the second scheduling cycle defines a starting time and an ending time to which the network entity is to timing-align the plurality of first scheduling cycles. For example, if the network entity determines the second scheduling cycle to be 50 ms, the network entity is to timing-align a starting time of the second scheduling cycle (e.g., 0 ms) and starting time of a beginning scheduling cycle of the plurality of first scheduling cycles, and the network entity is to timing-align an ending time of the second scheduling cycle (e.g., 50 ms) and a starting time of an ending scheduling cycle of the plurality of first scheduling cycles.

The plurality of first scheduling cycles may be referred to as inner scheduling cycles in that they occur between the starting time and the ending time of the second scheduling cycle (e.g., the outer scheduling cycle).

The plurality of first scheduling cycles refer to time durations between CG occasions 520, or refer to time durations between SPS occasions 510. For example, where the network entity determines or selects the plurality of first scheduling cycles to be a plurality of CG scheduling cycles, each CG scheduling cycle includes a time duration between CG occasions 520 that are configured for the UE. These CG occasions 520 include configured uplink resources (e.g., configured PUSCH resources) that the UE may use to transmit (and the network entity may use to receive) uplink transmissions for the periodic multimedia traffic.

As another example, where the network entity determines or selects the plurality of first scheduling cycles to be a plurality of SPS scheduling cycles, each SPS scheduling cycle includes a time duration between SPS occasions 510 that are scheduled for the UE. These SPS occasions 510 include scheduled resources (e.g., scheduled PDSCH resources) that the UE may use to receive (and the network entity may use to transmit) downlink transmissions for the periodic multimedia traffic.

The time duration of each of the plurality of first scheduling cycles may be an integer value. Moreover, the time durations for the plurality of first scheduling cycles may be non-uniform. The ability to schedule non-uniform scheduling cycles for the UE enables the network entity to align the plurality of first scheduling cycles with the starting time and the ending time of the second scheduling cycle while still using integer values for the plurality of first scheduling cycles (e.g., where non-integer values are not permitted to be used). Moreover, the ability to schedule non-uniform scheduling cycles for the UE enables the network entity to align the time duration of the second scheduling cycle with the sum (e.g., an integer value sum) of the plurality of first scheduling cycles. This enables the network entity to closely align the CG scheduling cycles and/or SPS scheduling cycles with the periods of the periodic multimedia traffic associated with the UE, which reduces and/or minimizes drifting of CG occasions 520 and/or SPS occasions 510 away from the periodicity of the periodic multimedia traffic for the UE.

As an example, and for a 25 ms second scheduling cycle that encompasses 3 periods of periodic multimedia traffic having an approximate 8.33 ms period, the network entity may determine the plurality of first scheduling cycles to include 3 corresponding scheduling cycles: a 9 ms scheduling cycle, an 8 ms scheduling cycle, and another 8 ms scheduling cycle (9+8+8=25 ms). The arrangement of the scheduling cycles may be selected to best align with (or to minimize drift from) the 3 8.33 ms periods of the periodic multimedia traffic. For example, for a 9/8/8 scheduling cycle arrangement, the CG occasions 520 or the SPS occasion 510 may occur at 0 ms, 9 ms, 17 ms, and 25 ms, whereas the periods of the periodic multimedia traffic may occur at 0 ms, 8.33 ms, 16.67 ms, and 25 ms. In this way, the starting time of the second scheduling cycle and a beginning scheduling cycle of the first plurality of scheduling cycles are timing aligned, and the ending time of the second scheduling cycle and an ending scheduling cycle of the first plurality of scheduling cycles are timing aligned. However, other examples are within the scope of the present disclosure.

In some aspects, the network entity and/or the UE may adapt the plurality of first scheduling cycles to further align the plurality of first scheduling cycles (and thus, the periodic multimedia traffic for the UE) with a resource alignment on the uplink and/or on the downlink. The resource alignment may include a TDD uplink/downlink alignment, a frequency division duplexing (FDD) uplink/downlink alignment, and/or a combination thereof. The network entity and/or the UE may adapt the plurality of first scheduling cycles to align the plurality of first scheduling cycles with the starting time and ending time of the second scheduling cycle (with minimizing drift from the periods of the second scheduling cycle) and with the resource alignment on the uplink and/or on the downlink.

As an example, uplink resources in a TDD system may be available every 2.5 ms. Accordingly, uplink resources may be available at 2 ms, 4.5 ms, 7 ms, 9.5 ms, 12 ms, 14.5 ms, 17 ms, 19.5 ms, 22 ms, 24.5 ms, and 25+2 ms based at least in part on a TDD pattern. The network entity and/or the UE may identify and/or select the uplink resources in the TDD pattern that most closely conform to the plurality of first scheduling cycles. For example, where the plurality of first scheduling cycles include a 9 ms scheduling cycle, an 8 ms scheduling cycle, and another 8 ms scheduling cycle, the UE may identify uplink resources for uplink transmission for the periodic multimedia traffic at 2 ms (instead of 0 ms), 9.5 ms (instead of 9 ms), 17 ms, and 27 ms (instead of 25 ms).

The network entity may transmit the indication of the plurality of first scheduling cycles in one or more downlink communications to the UE. The one or more downlink communications may include one or more RRC communications, one or more MAC control element (MAC-CE) communications, one or more DCI communications, and/or one or more of another type of downlink communication. Each of the plurality of first scheduling cycles may be indicated in the one or more downlink communications in a respective information element (IE). For example, each of the plurality of first scheduling cycles may be indicated in respective time domain offset (timeDomainOffset) IEs indicating timeDomainOffset(i) total first scheduling cycles.

The network entity may transmit (or signal) an indication (e.g., to the UE) of the periodicity of the periodic multimedia traffic (which may correspond or be associated with the second/outer scheduling cycle) and the timeDomainOffset IEs for the first plurality/inner scheduling cycles. Both of the periodicity and timeDomainOffset IEs may be signaled, since the periodicity cannot be estimated from the set of timeDomainOffset IEs. The first plurality/inner scheduling cycles and timeDomainOffset IEs may be different in that the first plurality/inner scheduling cycles may include a set of non-uniform resource intervals within the second/outer scheduling cycle, whereas the timeDomainOffset IEs may be the offset values from a reference timing.

For Type 1 configured grant, the reference timing may be indicated by a timeReferenceSFN parameter. A timeDomainOffset IEs is counted from the timeReferenceSFN. The timeReferenceSFN is a fixed position (e.g., SFN=0 or SFN=512), so timeDomainOffset(0) can be non-zero. For Type 2 configured grant, a PDCCH DCI communication may indicate the reference time. Since the PDCCH DCI indicates the first resource which is the reference time (e.g., $SFN_{start\ time}$, $slot_{start\ time}$), timeDomainOffset(0) is always 0.

For SPS on the downlink, the network entity may indicate i SPS scheduling cycles as the first plurality of scheduling cycles in an RRC communication, where the i SPS scheduling cycles are indicated in an SPS configuration for the UE. The network entity may further transmit a DCI communication to the UE to selectively activate or deactivate the SPS configuration (and thus, the i SPS scheduling cycles). The UE (and the network entity) may use the i SPS scheduling cycles indicated in the RRC communication to determine the starting times of respective PDSCH resources that are scheduled for the periodic multimedia traffic for the UE. For example, a MAC entity of the UE (and/or a MAC entity of the network entity) may determine that the Nth downlink assignment for the periodic multimedia traffic occurs in the slot for which:

$$
\begin{aligned}
&(\text{numberOfSlotsPerFrame} \times \text{SFN} + \text{slot number in the} \\
&\quad \text{frame}) = [(\text{numberOfSlotsPerFrame} \times \\
&\quad \text{SFN}_{start\ time} \pm \text{slot}_{start\ time} + \text{timeDomainOffset}(i)) + \\
&\quad N \times \text{periodicity} \times \text{numberOfSlotsPerFrame}/10] \\
&\quad \text{modulo}(1024 \times \text{numberOfSlotsPerFrame}),
\end{aligned}
$$

where numberOfSlotsPerFrame corresponds to a quantity of slots in a frame on the downlink, SFN corresponds to the system frame number in which the slot is included, the $\text{SFN}_{start\ time}$ corresponds to a starting time of the SFN, slots tart time corresponds to a starting time of the slot, periodicity corresponds to an integer value periodicity selected for the periodic multimedia traffic (e.g., and not to the actual non-integer value of the periodic multimedia traffic), and timeDomainOffset(i) corresponds to the ith SPS scheduling cycle indicated in the RRC communication.

For CG on the uplink, the network entity may indicate i CG scheduling cycles as the first plurality of scheduling cycles in an RRC communication, where the i CG scheduling cycles are indicated in a CG configuration in the RRC communication for the UE. For Type 1 configured grant (e.g., RRC configuration and activation), the UE and/or the network entity may use the i CG scheduling cycles indicated in the RRC communication to determine (based at least in part on receiving and transmitting the RRC communication, respectively) the starting times of respective PUSCH resources that are scheduled for the periodic multimedia traffic for the UE. For example, a MAC entity of the UE (and/or a MAC entity of the network entity) may determine that the Nth uplink assignment for the periodic multimedia traffic occurs in the symbol for which:

$$
\begin{aligned}
&[(\text{SFN} \times \text{numberOfSlotsPerFrame} \times \text{numberOfSymbol-} \\
&\quad \text{sPerSlot}) + (\text{slot number in the frame} \times \text{num-} \\
&\quad \text{berOfSymbolsPerSlot}) + \text{symbol number in the} \\
&\quad \text{slot}] = (\text{timeReferenceSFN} \times \text{numberOfSlotsPer-} \\
&\quad \text{Frame} \times \text{numberOfSymbolsPerSlot} + \text{timeDomain-} \\
&\quad \text{Offset}(i) \times \text{numberOfSymbolsPerSlot} + S + N \times \text{peri-} \\
&\quad \text{odicity}) \text{modulo}(1024 \times \text{numberOfSlotsPerFrame} \times \\
&\quad \text{numberOfSymbolsPerSlot}),
\end{aligned}
$$

where numberOfSlotsPerFrame corresponds to a quantity of slots in a frame on the uplink, numberOfSymbolsPerSlot corresponds to the quantity of symbols in a slot on the uplink, SFN corresponds to the system frame number in which the symbol is included, timeReferenceSFN corresponds to an SFN time reference value, S corresponds to a starting symbol, periodicity corresponds to an integer value periodicity selected for the periodic multimedia traffic (e.g., and not to the actual non-integer value of the periodic multimedia traffic), and timeDomainOffset(i) corresponds to the ith CG scheduling cycle indicated in the RRC communication. The SFN time reference value includes an SFN that is used for determination of an offset of a resource in time domain. The closest SFN with the indicated number preceding the reception of the CG configuration is used.

For Type 2 configured grant (e.g., RRC configuration+DCI activation), the network entity may further transmit a DCI communication to the UE to selectively activate or deactivate the CG configuration (and thus, the i CG scheduling cycles). The UE and/or the network entity may use the i CG scheduling cycles indicated in the RRC communication to determine (based at least in part on receiving and transmitting the DCI communication, respectively) the starting times of respective PUSCH resources that are scheduled for the periodic multimedia traffic for the UE. For example, a MAC entity of the UE (and/or a MAC entity of the network entity) may determine that the Nth uplink assignment for the periodic multimedia traffic occurs in the symbol for which:

$$
\begin{aligned}
&[(\text{SFN} \times \text{numberOfSlotsPerFrame} \times \text{numberOfSymbol-} \\
&\quad \text{sPerSlot}) + (\text{slot number in the frame} \times \text{num-} \\
&\quad \text{berOfSymbolsPerSlot}) + \text{symbol number in the} \\
&\quad \text{slot}] = [(\text{SFN}_{start\ time} \times \text{numberOfSlotsPerFrame} \times \\
&\quad \text{numberOfSymbolsPerSlot} + \text{slot}_{start\ time} \times \text{num-} \\
&\quad \text{berOfSymbolsPerSlot} + \text{symbol}_{start\ time} + \text{timeDo-} \\
&\quad \text{mainOffset}(i) \times \text{numberOfSymbolsPerSlot}) + N \times \\
&\quad \text{periodicity}] \text{modulo}(1024 \times \\
&\quad \text{numberOfSlotsPerFrame} \times \\
&\quad \text{numberOfSymbolsPerSlot}),
\end{aligned}
$$

where numberOfSlotsPerFrame corresponds to a quantity of slots in a frame on the uplink, numberOfSymbolsPerSlot corresponds to the quantity of symbols in a slot on the uplink, SFN corresponds to the system frame number in which the symbol is included, the $\text{SFN}_{start\ time}$ corresponds to a starting time of the SFN, $\text{slot}_{start\ time}$ corresponds to a starting time of the slot, periodicity corresponds to an integer value periodicity selected for the periodic multimedia traffic (e.g., and not to the actual non-integer value of the periodic multimedia traffic), and timeDomainOffset(i) corresponds to the ith CG scheduling cycle indicated in the RRC communication.

Additionally and/or alternatively to the RRC signaling and/or DCI signaling described above for indicating the plurality of first scheduling cycles, the network entity may transmit (and the UE may receive, a plurality of DCI communications indicating the plurality of first scheduling cycles. Here, each DCI communication may indicate a respective scheduling cycle (e.g., a respective CG scheduling cycle, a respective SPS scheduling cycle) of the plurality of first scheduling cycles. For example, each DCI communication may include a timeDomainOffset IE indicating the respective scheduling cycle. This enables scheduled/configured resources to have different resource configurations that are scheduled by DCI, such as different time-domain resource allocations, different frequency domain resource allocations, different reference signal configurations, and/or different MCS, among other examples.

At 610, the UE and/or the network entity may communicate by transmitting and/or receiving periodic multimedia traffic based at least in part on the plurality of first scheduling cycles. As an example, the UE may transmit (and the network entity may monitor for and receive) one or more uplink transmissions in one or more CG occasions 520 that are configured based at least in part on a plurality of CG scheduling cycles of the plurality of first scheduling cycles. As another example, the UE may monitor for and receive (and the network entity may transmit) one or more downlink transmissions in one or more SPS occasions 510 that are configured based at least in part on a plurality of SPS scheduling cycles of the plurality of first scheduling cycles.

As indicated above, FIG. 6 is provided as an example. Other examples may differ from what is described with regard to FIG. 6.

Figure 7:
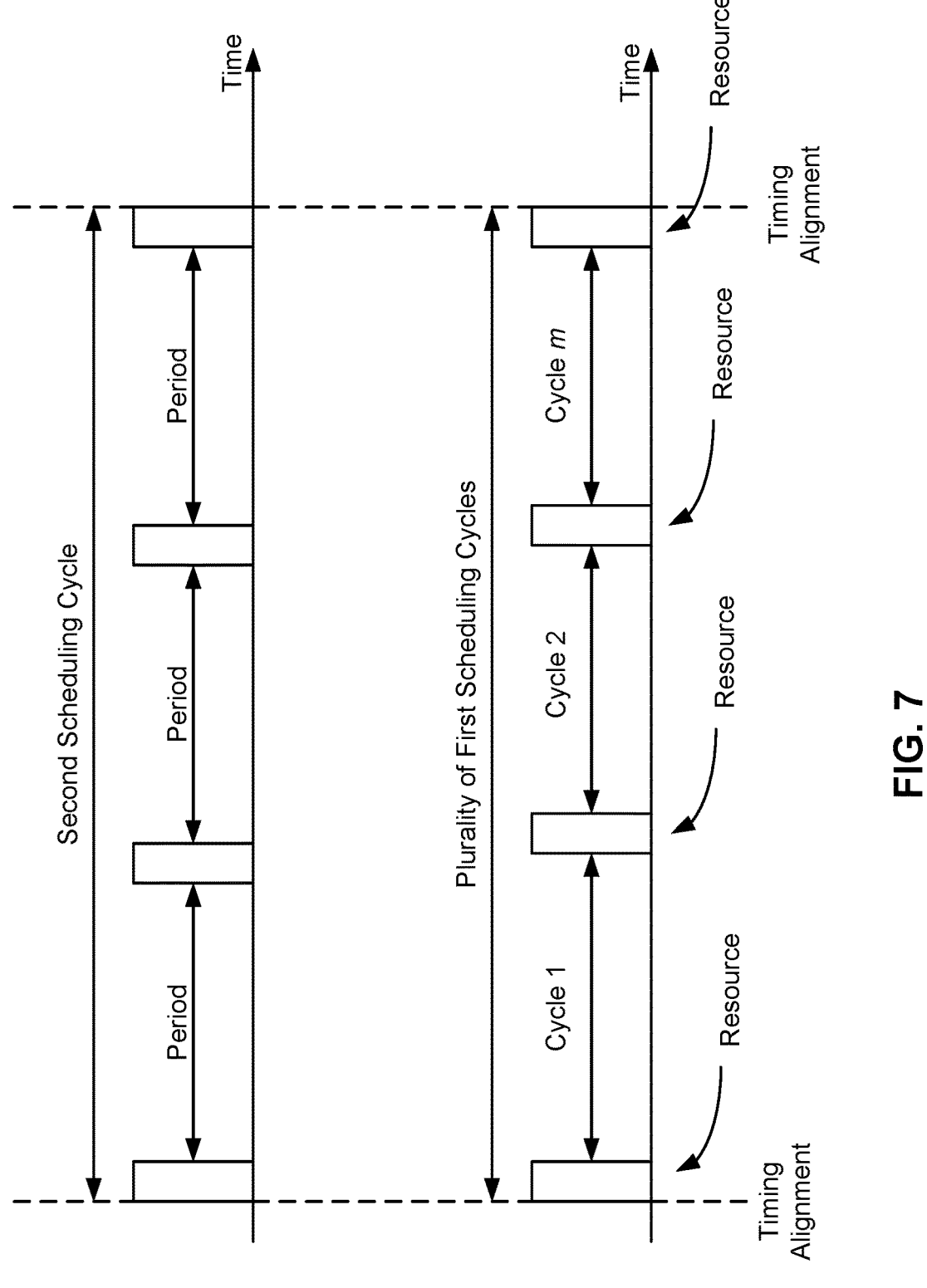

FIG. 7 is a diagram illustrating an example 700 of uplink and/or downlink scheduling alignment for periodic multimedia traffic, in accordance with the present disclosure. In particular, the example 700 includes an example of timing alignment of a plurality of first scheduling cycles and a second scheduling cycle. As described herein, the second scheduling cycle may correspond to a time duration that includes a plurality of periods of periodic multimedia traffic for a UE. As also described herein, the plurality of first scheduling cycles (e.g., Cycle 1 through Cycle m) may correspond to CG scheduling cycles and/or SPS scheduling cycles for respectively determining PUSCH resources and/or PDSCH resources for the periodic multimedia traffic.

As further shown in FIG. 7, the starting time of the second scheduling cycle and a beginning resource (e.g., uplink resource, downlink resource) for the periodic multimedia traffic are timing aligned. An ending time of the second scheduling cycle and an ending resource for the periodic multimedia traffic are timing aligned as a result of the plurality of first scheduling cycles. Moreover, the resources between the beginning resource and the ending resource are closely aligned with the periods of the periodic multimedia traffic as a result of the plurality of first scheduling cycles.

As indicated above, FIG. 7 is provided as an example. Other examples may differ from what is described with regard to FIG. 7.

Figure 8:
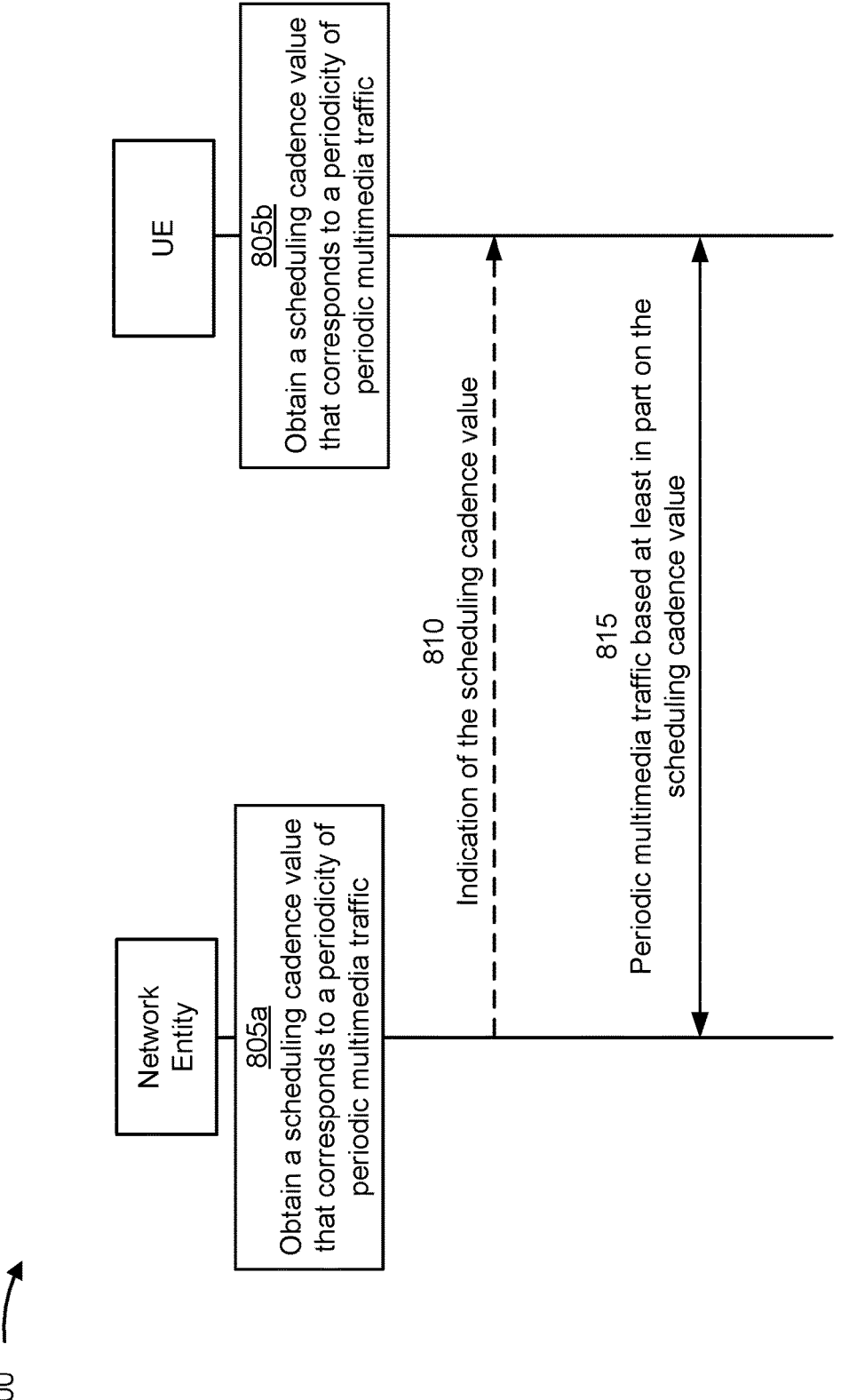

FIG. 8 is a diagram illustrating an example 800 of uplink and/or downlink scheduling alignment for periodic multimedia traffic, in accordance with the present disclosure. As shown in FIG. 8, the example 800 may include communication between a network entity (e.g., a base station 110, a CU 310, a DU 330, an RU 340, and/or another type of network entity) and a UE (e.g., a UE 120). The network entity and the UE may be included in a wireless network such as the wireless network 100. The network entity and the UE may communicate on an uplink and on a downlink in the wireless network. The UE may include or may be associated with an XR device, a gaming device, and/or another type of device that is configured to operate according to a periodic multimedia traffic application, as described herein.

The example 800 of FIG. 8 includes an example in which the network entity and the UE determine and/or adapt a plurality of non-uniform CG scheduling cycles and/or a plurality of non-uniform SPS scheduling cycles to support periodic multimedia traffic having a non-integer value periodicity for the UE. In particular, the network entity and the UE use a scheduling cadence value to determine resources (e.g., uplink resources, downlink resources) that closely align with the periodicity of periodic multimedia traffic in a wireless network in which non-integer value CG scheduling cycles and/or non-integer SPS scheduling cycles are not permitted. The scheduling cadence value corresponds to the multimedia cadence of the periodic multimedia traffic. Examples for the scheduling cadence value include 45 Hz, 60 Hz, 120 fps, 144 fps, and/or 1000 Hz. However, other values for the scheduling cadence value are within the scope of the present disclosure.

As shown in FIG. 8, and at 805a in the example 800, the network entity may obtain a scheduling cadence value that corresponds to a periodicity of periodic multimedia traffic for the UE. At 805b in the example 800, the UE may obtain the scheduling cadence value that corresponds to the periodicity of periodic multimedia traffic for the UE. At 810 the network entity may optionally transmit an indication of the scheduling cadence value to the UE, and the UE may obtain the scheduling cadence value from the communication from the network entity. However, the UE may alternatively be configured with the scheduling cadence value without signaling from the network entity. For example, the UE may alternatively determine the scheduling cadence value based at least in part on an application associated with the periodic multimedia traffic that is executed on the UE.

The scheduling cadence value may be for CG on the uplink and/or for SPS on the downlink. In some aspects, a scheduling cadence value for CG on the uplink may be referred to as CgCadence, whereas a scheduling cadence value for SPS on the downlink may be referred to as SPSCadence. The scheduling cadence value enables the network entity and/or the UE to identify PUSCH resources and/or PDSCH resources using other units such as Hz and fps as opposed to slot quantities. This may provide more accurate alignment of resource selection and periodic multimedia traffic. The CgCadence and the SPSCadence parameters may be included in a wireless communication standard, such as TS 38.331 for Release 18 and/or beyond.

At 815, the UE and/or the network entity may communicate by transmitting and/or receiving periodic multimedia traffic based at least in part on the scheduling cadence value. As an example, the UE may transmit (and the network entity may monitor for and receive) one or more uplink transmissions in one or more CG occasions 520 that are determined based at least in part on the scheduling cadence value. As another example, the UE may monitor for and receive (and the network entity may transmit) one or more downlink transmissions in one or more SPS occasions 510 that are determined based at least in part on the scheduling cadence value.

In some aspects, the UE and/or the network entity uses a conditional technique for determining whether a time domain resource includes a CG occasion 520. As an example, the UE (and/or the network entity) may determine, based at least in part on the scheduling cadence value (e.g., CgCadence), whether a slot includes a CG occasion 520 for an uplink transmission associated with the periodic multimedia traffic. The determined slot may occur after a time domain offset (timeDomainOffset) after a start of subframe n. The UE (and/or the network entity) may determine that the slot is a candidate slot for the CG occasion 520 if:

$$\text{ceil}(n*\text{CgCadence}/1000)+1=\text{ceil}((n+1)*\text{CgCadence}/1000),$$

where ceiling operations are used to determine the slot, and the subframe n corresponds to [(SFN×10)+subframe number]. Such a technique may be included in a wireless standard, such as TS 38.321 Release 18.

In some aspects, the UE and/or the network entity uses a conditional technique for determining whether a time domain resource includes a CG occasion 520. As an example, the UE (and/or the network entity) may determine, based at least in part on the scheduling cadence value (e.g., SpsCadence), whether a slot and/or a symbol in the slot include an SPS occasion 510 for a downlink transmission associated with the periodic multimedia traffic. The determined slot may occur after a time domain offset (timeDomainOffset) after a start of subframe n. The UE (and/or the network entity) may determine that the slot is a candidate slot for the SPS occasion 510 if:

$$\text{ceil}(n*\text{SpsCadence}/1000)+1=\text{ceil}((n+1)*\text{SpSCadence}/1000).$$

Such a technique may be included in a wireless standard, such as TS 38.321 Release 18.

Additionally and/or alternatively, the UE and/or the network entity may use a sequential technique for determining resources for periodic multimedia traffic based at least in part on a scheduling cadence value. For SPS on the downlink, a wireless standard (e.g., TS 38.331 Release 18) may include a cadence-r18 parameter that corresponds to the SpsCadence. The UE and/or the network entity may communicate with each other in each resource (e.g., slot, symbol) for which:

(numberOfSlotsPerFrame×SFN+slot number in the frame)=[(numberOfSlotsPerFrame× SFN$_{start\ time}$+slot$_{start\ time}$)+Ceiling($N$×(numberOfSlotsPerFrame*100/cadence)]modulo (1024×numberOfSlotsPerFrame)), and/or for which:

(numberOfSlotsPerFrame×SFN+slot number in the frame)=[(numberOfSlotsPerFrame× SFN$_{start\ time}$+slot$_{start\ time}$)+Floor($N$×(numberOfSlotsPerFrame*100/cadence)]modulo (1024×numberOfSlotsPerFrame)), where numberOfSlotsPerFrame corresponds to a quantity of slots per frame for the UE and the network entity, SFN$_{start\ time}$ corresponds to an SFN start time, slot$_{start\ time}$ corresponds to a slot start time, SFN corresponds to a system frame number, N corresponds to an Nth resource allocation, and cadence corresponds to the scheduling cadence value (e.g., CgCadence, SpsCadence). SFN$_{start\ time}$ and slot$_{start\ time}$ are the SFN and slot, respectively, of the first transmission of PDSCH where the configured downlink assignment was (re-)initialized with DCI. Such a technique may be included in a wireless standard, such as TS 38.321 Release 18. The scheduling cadence value may be indicated in an RRC communication that includes the SPS configuration for the UE.

For Type 1 CG on the uplink, a wireless standard (e.g., TS 38.331 Release 18) may include a cadence-r18 parameter that corresponds to the CgCadence. The UE and/or the network entity may communicate with each other in each resource (e.g., slot, symbol) for which:

[(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+$S$+Ceiling($N$×(numberOfSlotsPerFrame× numberOfSymbolsPerSlot/10/cadence)))modulo (1024×numberOfSlotsPerFrame× numberOfSymbolsPerSlot), and/or for which:

[(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+$S$+Floor($N$×(numberOfSlotsPerFrame× numberOfSymbolsPerSlot/10/cadence)))modulo (1024×numberOfSlotsPerFrame× numberOfSymbolsPerSlot), where numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and cadence corresponds to the scheduling cadence value. Such a technique may be included in a wireless standard, such as TS 38.321 Release 18. The scheduling cadence value may be indicated in an RRC communication that includes the CG configuration for the UE.

For Type 2 CG on the uplink, a wireless standard (e.g., TS 38.331 Release 18) may include a cadence-r18 parameter that corresponds to the CgCadence. The UE and/or the network entity may communicate with each other in each resource (e.g., slot, symbol) for which:

[(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame× numberOfSymbolsPerSlot+slot$_{start\ time}$×numberOfSymbolsPerSlot+symbol$_{start\ time}$)+Ceiling ($N$×(numberOfSlotsPerFrame× numberOfSymbolsPerSlot/10/cadence)))]modulo (1024×numberOfSlotsPerFrame× numberOfSymbolsPerSlot), and/or for which:

[(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame× numberOfSymbolsPerSlot+slot$_{start\ time}$×numberOfSymbolsPerSlot+symbol$_{start\ time}$)+Floor ($N$×(numberOfSlotsPerFrame× numberOfSymbolsPerSlot/10/cadence)))]modulo (1024×numberOfSlotsPerFrame× numberOfSymbolsPerSlot), where numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, cadence corresponds to the scheduling cadence value, SFN$_{start\ time}$ corresponds to an SFN start time, slot$_{start\ time}$ corresponds to a slot start time, and symbol start time corresponds to a symbol start time. Such a technique may be included in a wireless standard, such as TS 38.321 Release 18. The scheduling cadence value may be indicated in an RRC communication that includes the CG configuration for the UE.

As indicated above, FIG. 8 is provided as an example. Other examples may differ from what is described with regard to FIG. 8.

Figure 9:
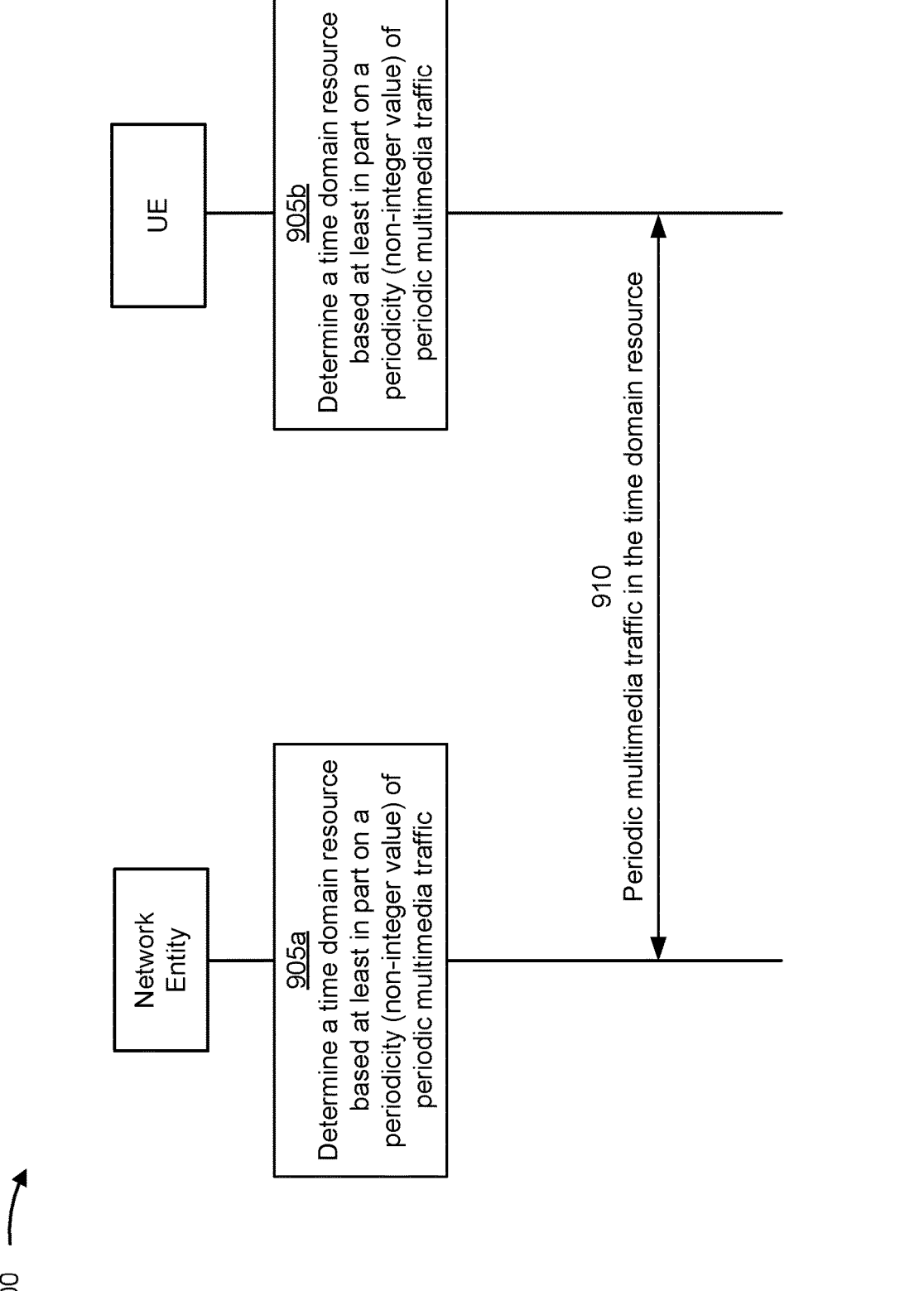

FIG. 9 is a diagram illustrating an example 900 of uplink and/or downlink scheduling alignment for periodic multimedia traffic, in accordance with the present disclosure. As shown in FIG. 9, the example 900 may include communication between a network entity (e.g., a base station 110, a CU 310, a DU 330, an RU 340, and/or another type of network entity) and a UE (e.g., a UE 120). The network entity and the UE may be included in a wireless network such as the wireless network 100. The network entity and the UE may communicate on an uplink and on a downlink in the wireless network. The UE may include or may be associated with an XR device, a gaming device, and/or another type of device that is configured to operate according to a periodic multimedia traffic application, as described herein.

The example 900 of FIG. 9 includes an example in which the network entity and the UE determine and/or adapt a plurality of non-uniform CG scheduling cycles and/or a plurality of non-uniform SPS scheduling cycles to support periodic multimedia traffic having a non-integer value periodicity for the UE. In particular, in some aspects, the wireless network 100 may be configured to support rational (e.g., non-integer periodicities) for CG and SPS, and the network entity and the UE may directly use the non-integer value periodicity of periodic multimedia traffic in the wireless network for CG and/or SPS. The non-integer periodicity corresponds to the multimedia cadence of the periodic multimedia traffic. Examples of non-integer periodicities for associated multimedia cadences include:

TABLE 1

| Multimedia Cadence (Hz) | Rational Number for Non-Integer Value Periodicity (ms) |
|---|---|
| 24 | 41 + 2/3 |
| 30 | 33 + 1/3 |
| 45 | 22 + 2/9 |
| 48 | 20 + 5/6 |
| 60 | 16 + 2/3 |
| 80 | 12 + 1/2 |
| 90 | 11 + 1/9 |
| 120 | 8 + 1/3 |

However, other values for the scheduling cadence value are within the scope of the present disclosure.

As shown in FIG. 9, and at 905a in the example 900, the network entity may determine a time domain resource based at least in part on a periodicity (e.g., a non-integer value periodicity) of periodic multimedia traffic for the UE. At 905b in the example 900, the UE may determine a time domain resource based at least in part on a periodicity (e.g., a non-integer value periodicity) of periodic multimedia traffic for the UE.

The time domain resource may be for CG on the uplink (e.g., an uplink time domain resource) and/or for SPS on the downlink (e.g., a downlink time domain resource). The non-integer value periodicity enables the network entity and/or the UE to identify PUSCH resources and/or PDSCH resources that align with units such as Hz and fps as opposed to slot quantities. This may provide more accurate alignment of resource selection and periodic multimedia traffic. The non-integer value periodicity may be included in a wireless communication standard (e.g., as a periodicity-r18 parameter), such as TS 38.331 for Release 18 and/or beyond.

At 910, the UE and/or the network entity may communicate by transmitting and/or receiving periodic multimedia traffic in the time domain resource. As an example, the UE may transmit (and the network entity may monitor for and receive) one or more uplink transmissions in one or more CG occasions 520 in the time domain resource. As another example, the UE may monitor for and receive (and the network entity may transmit) one or more downlink transmissions in one or more SPS occasions 510 in the time domain resource.

The UE and/or the network entity may use a sequential technique for determining time domain resources for periodic multimedia traffic based at least in part on an associated non-integer value periodicity. For SPS on the downlink, the UE and/or the network entity may identify the time domain resource(s) (e.g., slot, symbol for the periodic multimedia traffic) for which:

> (numberOfSlotsPerFrame×SFN+slot number in the frame)=[(numberOfSlotsPerFrame× $SFN_{start\ time}$±$slot_{start\ time}$)+Ceil($N$×periodicity× numberOfSlotsPerFrame/10)]modulo(1024× numberOfSlotsPerFrame)), and/or for which:

> (numberOfSlotsPerFrame×SFN+slot number in the frame)=[(numberOfSlotsPerFrame× $SFN_{start\ time}$±$slot_{start\ time}$)+Floor($N$×periodicity× numberOfSlotsPerFrame/10)]modulo(1024× numberOfSlotsPerFrame)), where numberOfSlotsPerFrame corresponds to a quantity of slots per frame for the UE and the network entity, SFN corresponds to a system frame number, $SFN_{start\ time}$ corresponds to an SFN start time, $slot_{start\ time}$ corresponds to a slot start time, N corresponds to an Nth resource allocation, and periodicity corresponds to the periodicity of the periodic multimedia traffic. Such a technique may be included in a wireless standard, such as TS 38.321 Release 18.

The periodicity value (periodicity-r18) may be indicated in an RRC communication that includes the SPS configuration for the UE. In some aspects, a wireless standard (e.g., 3GPP TS 38.331) may enumerate a plurality of candidate periodicities as:

```
SPS-config ::= SEQUENCE {
...
periodicity-r18     ENUMERATED {
...,
ms8and1Over3, ms11and1Over9, ms12and1Over2, ms16and2Over3,
ms20and5Over6, ms22and2Over9, ms33and1Over3, ms41and2Over3,
spare },
...,
} OPTIONAL
...
}
```

However, other candidate periodicities are within the scope of the present disclosure.

For Type 1 CG on the uplink, the UE and/or the network entity may identify the time domain resource(s) (e.g., slot, symbol for the periodic multimedia traffic) for which:

> [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+$S$+Ceil($N$×periodicity))modulo(1024×numberOfSlotsPerFrame×numberOfSymbolsPerSlot), and/or for which:

> [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+$S$+Floor($N$×periodicity))modulo(1024×numberOfSlotsPerFrame×numberOfSymbolsPerSlot), where numberOfSlotsPerFrame corresponds to a quantity of slots per frame for the UE and the network entity, SFN corresponds to a system frame number, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and periodicity corresponds to the periodicity for the multimedia traffic. Such a technique may be included in a wireless standard, such as TS 38.321 Release 18.

The periodicity value (periodicity-r18) may be indicated in an RRC communication that includes the SPS configuration for the UE. In some aspects, a wireless standard (e.g., 3GPP TS 38.331) may enumerate a plurality of candidate periodicities as:

```
ConfiguredGrantConfig :=   SEQUENCE {
...
periodicity-r18      ENUMERATED {
...,
sym8and1Over3x14, sym11and1Over9x14, sym12and1Over2x14,
sym16and2Over3x14,
sym20and5Over6x14, sym22and2Over9x14, sym33and1Over3x14,
sym41and2Over3x14,sym8and1Over3x12, sym11and1Over9x12,
sym12and1Over2x12,
sym16and2Over3x12,
sym20and5Over6x12, sym22and2Over9x12, sym33and1Over3x12,
sym41and2Over3x12,
spare },
...,
} OPTIONAL
...
}
```

However, other candidate periodicities are within the scope of the present disclosure.

For Type 2 CG on the uplink, the UE and/or the network entity may identify the time domain resource(s) (e.g., slot, symbol for the periodic multimedia traffic) for which:

$$[(SFN \times numberOfSlotsPerFrame \times numberOfSymbolsPerSlot) + (slot\ number\ in\ the\ frame \times numberOfSymbolsPerSlot) + symbol\ number\ in\ the\ slot] = [(SFN_{start\ time} \times numberOfSlotsPerFrame \times numberOfSymbolsPerSlot + slot_{start\ time} \times numberOfSymbolsPerSlot + symbol_{start\ time}) + Ceil(N \times periodicity)]modulo(1024 \times numberOfSlotsPerFrame \times numberOfSymbolsPerSlot),$$

and/or for which:

$$[(SFN \times numberOfSlotsPerFrame \times numberOfSymbolsPerSlot) + (slot\ number\ in\ the\ frame \times numberOfSymbolsPerSlot) + symbol\ number\ in\ the\ slot] = [(SFN_{start\ time} \times numberOfSlotsPerFrame \times numberOfSymbolsPerSlot + slot_{start\ time} \times numberOfSymbolsPerSlot + symbol_{start\ time}) + Floor(N \times periodicity)]modulo(1024 \times numberOfSlotsPerFrame \times numberOfSymbolsPerSlot),$$

where numberOfSlotsPerFrame corresponds to a quantity of slots per frame for the UE and the network entity, SFN corresponds to a system frame number, numberOfSymbolsPerSlot corresponds to a quantity of symbols per slot, $SFN_{start\ time}$ corresponds to an SFN start time, $slot_{start\ time}$ corresponds to a slot start time, $symbol_{start\ time}$ corresponds to a symbol start time, N corresponds to an Nth resource allocation, and periodicity corresponds to the periodicity of the multimedia traffic. Such a technique may be included in a wireless standard, such as TS 38.321 Release 18.

As indicated above, FIG. 9 is provided as an example. Other examples may differ from what is described with regard to FIG. 9.

Figure 10:
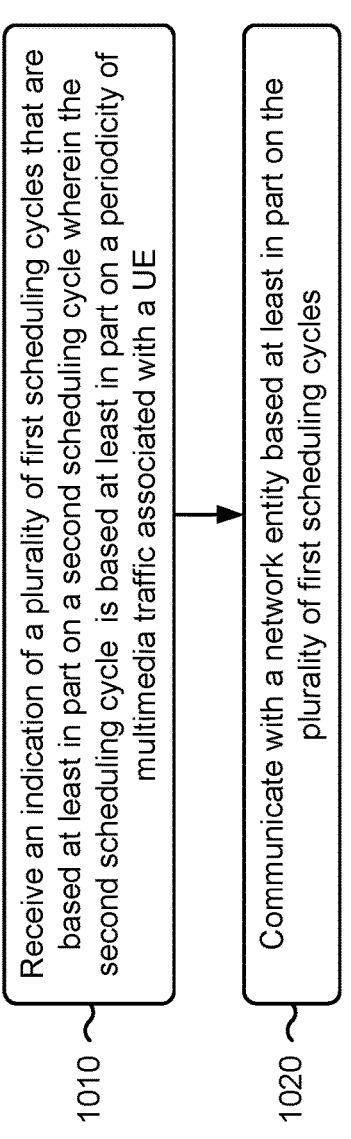
FIGS. 10-15 are diagrams illustrating example processes associated with uplink and/or downlink scheduling alignment for periodic multimedia traffic, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with uplink and/or downlink scheduling alignment for periodic multimedia traffic.

As shown in FIG. 10, in some aspects, process 1000 may include receiving an indication of a plurality of first scheduling cycles that are based at least in part on a second scheduling cycle, wherein the second scheduling cycle is based at least in part on a periodicity of multimedia traffic associated with the UE (block 1010). For example, the UE (e.g., using communication manager 140, communication manager 1608, and/or reception component 1602, depicted in FIG. 16) may receive an indication of a plurality of first scheduling cycles that are based at least in part on a second scheduling cycle, as described above. In some aspects, the second scheduling cycle is based at least in part on a periodicity of multimedia traffic associated with the UE.

As further shown in FIG. 10, in some aspects, process 1000 may include communicating with a network entity based at least in part on the plurality of first scheduling cycles (block 1020). For example, the UE (e.g., using communication manager 140, communication manager 1608, reception component 1602, and/or transmission component 1604, depicted in FIG. 16) may communicate with a network entity based at least in part on the plurality of first scheduling cycles, as described above.

Process 1000 may include additional aspects, such as any single aspect or any combination of aspects described below and/or in connection with one or more other processes described elsewhere herein.

In a first aspect, a duration of a third scheduling cycle of the plurality of first scheduling cycles, and a duration of a fourth scheduling cycle of the plurality of first scheduling cycles, are different durations. In a second aspect, alone or in combination with the first aspect, a starting time of a third scheduling cycle of the plurality of first scheduling cycles is aligned with a starting time of the second scheduling cycle, and an ending time of a fourth scheduling cycle of the plurality of first scheduling cycles is aligned with an ending time of the second scheduling cycle.

In a third aspect, alone or in combination with one or more of the first and second aspects, a sum of respective durations of each of the plurality of first scheduling cycles is equal to a duration of the second scheduling cycle. In a fourth aspect, alone or in combination with one or more of the first through third aspects, the duration of the second scheduling cycle corresponds to an integer value sum of a plurality of periods of the multimedia traffic. In a fifth aspect, alone or in combination with one or more of the first through fourth aspects, a quantity of the plurality of first scheduling cycles corresponds to a quantity of the plurality of periods of the multimedia traffic.

In a sixth aspect, alone or in combination with one or more of the first through fifth aspects, the respective durations of each of the plurality of first scheduling cycles comprise respective integer value durations, and durations of the plurality of periods of the multimedia traffic comprise non-integer value durations. In a seventh aspect, alone or in combination with one or more of the first through sixth aspects, receiving the indication of the plurality of first scheduling cycles comprises receiving the indication of the plurality of first scheduling cycles in a plurality of time domain offset information elements. In an eighth aspect, alone or in combination with one or more of the first through seventh aspects, respective starting times of each of the plurality of first scheduling cycles are aligned with a time division duplexing resource configuration for a wireless connection on which the UE communicates with the network entity.

In a ninth aspect, alone or in combination with one or more of the first through eighth aspects, a duration of the second scheduling cycle is based at least in part on a time division duplexing resource configuration for a wireless connection on which the UE communicates with the network entity, and the duration of the second scheduling cycle and a sum of respective durations of each of the plurality of first scheduling cycles are approximately equal. In a tenth aspect, alone or in combination with one or more of the first through ninth aspects, the plurality of first scheduling cycles comprise a plurality of SPS cycles for downlink communication with the network entity, and communicating with the network entity based at least in part on the plurality of first scheduling cycles comprises receiving one or more downlink communications from the network entity based at least in part on the plurality of SPS cycles.

In an eleventh aspect, alone or in combination with one or more of the first through tenth aspects, receiving the indication of the plurality of first scheduling cycles comprises receiving, in an RRC communication, an indication of the plurality of SPS cycles, wherein each of the plurality of SPS cycles schedules a PDSCH resource. In a twelfth aspect, alone or in combination with one or more of the first through eleventh aspects, process 1000 includes receiving a DCI communication that activates the plurality of SPS cycles indicated in the RRC communication, and receiving the one or more downlink communications from the network entity comprises receiving the one or more downlink communications in at least one of the respective PDSCH resources based at least in part on the DCI communication.

In a thirteenth aspect, alone or in combination with one or more of the first through twelfth aspects, process 1000 includes determining the respective PDSCH resources for which (numberOfSlotsPerFrame×SFN+slot number in a frame)=[(numberOfSlotsPerFrame×$SFN_{start\ time}$+ $slot_{start\ time}$+timeDomainOffset(i))+N×periodicity×numberOfSlotsPerFrame/10] modulo (1024×numberOfSlotsPerFrame)), wherein numberOfSlotsPerFrame corresponds to a quantity of slots in a frame, SFN corresponds to a system frame number in which a slot is included, $SFN_{start\ time}$ corresponds to a starting time of the SFN, $slot_{start\ time}$ corresponds to a starting time of the slot, periodicity corresponds to an integer value periodicity selected for the periodic multimedia traffic, N corresponds to an Nth resource allocation, and timeDomainOffset(i) corresponds to an ith SPS scheduling cycle of the plurality of SPS cycles. In a fourteenth aspect, alone or in combination with one or more of the first through thirteenth aspects, receiving the indication of the plurality of first scheduling cycles comprises receiving respective indications of each of the plurality of SPS cycles in respective DCI communications, wherein each of the plurality of SPS cycles schedules a respective PDSCH resource.

In a fifteenth aspect, alone or in combination with one or more of the first through fourteenth aspects, the plurality of first scheduling cycles comprise a plurality of CG cycles for uplink communication with the network entity, and communicating with the network entity based at least in part on the plurality of first scheduling cycles comprises transmitting one or more uplink communications to the network entity based at least in part on the plurality of CG cycles. In a sixteenth aspect, alone or in combination with one or more of the first through fifteenth aspects, receiving the indication of the plurality of first scheduling cycles comprises receiving, in an RRC communication, an indication of the plurality of CG cycles, wherein each of the plurality of CG cycles schedules a respective PUSCH resource.

In a seventeenth aspect, alone or in combination with one or more of the first through sixteenth aspects, transmitting the one or more uplink communications to the network entity comprises transmitting the one or more uplink communications in at least one of the respective PUSCH resources based at least in part on the RRC communication. In an eighteenth aspect, alone or in combination with one or more of the first through seventeenth aspects, process 1000 includes receiving a DCI communication that activates the plurality of CG cycles indicated in the RRC communication, and transmitting the one or more uplink communications to the network entity comprises transmitting the one or more uplink communications in at least one of the respective PUSCH resources based at least in part on the DCI communication.

In a nineteenth aspect, alone or in combination with one or more of the first through eighteenth aspects, process 1000 includes determining the respective PUSCH resources for which [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset(i)×numberOfSymbolsPerSlot+S+N×periodicity) modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number, numberOfSymbolsPerSlot corresponds to a quantity of symbols per slot, timeReferenceSFN corresponds to an SFN time reference value, timeDomainOffset(i) corresponds to an ith CG cycles of the plurality of CG cycles, S corresponds to a starting symbol, N corresponds to an Nth resource allocation, and periodicity corresponds to an integer value periodicity selected for the periodic multimedia traffic. In a twentieth aspect, alone or in combination with one or more of the first through nineteenth aspects, receiving the indication of the plurality of first scheduling cycles comprises receiving respective indications of each of the plurality of CG cycles in respective DCI communications, wherein each of the plurality of CG cycles schedules a respective PUSCH resource.

In a twenty-first aspect, along or in combination with one or more of the first through twentieth aspects, process 1000 includes determining the respective PUSCH resources for which [(SFN×numberOfSlotsPerFrame×numberOfSymbolsPerSlot)+(slot number in a frame×numberOfSymbolsPerSlot)+symbol number in a slot]=[(SFN$_{start\ time}$×numberOfSlotsPerFrame×numberOfSymbolsPerSlot+$slot_{start\ time}$ numberOfSymbolsPerSlot+symbol$_{start\ time}$+timeDomainOffset(i)×numberOfSymbolsPerSlot)+N×periodicity] modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number, numberOfSymbolsPerSlot corresponds to a quantity of symbols per slot, timeDomainOffset(i) corresponds to an ith CG cycles of the plurality of CG cycles, $SFN_{start\ time}$ corresponds to a starting time of the SFN, $slot_{start\ time}$ corresponds to a starting time of the slot, N corresponds to an Nth resource allocation, and periodicity corresponds to an integer value periodicity selected for the periodic multimedia traffic.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
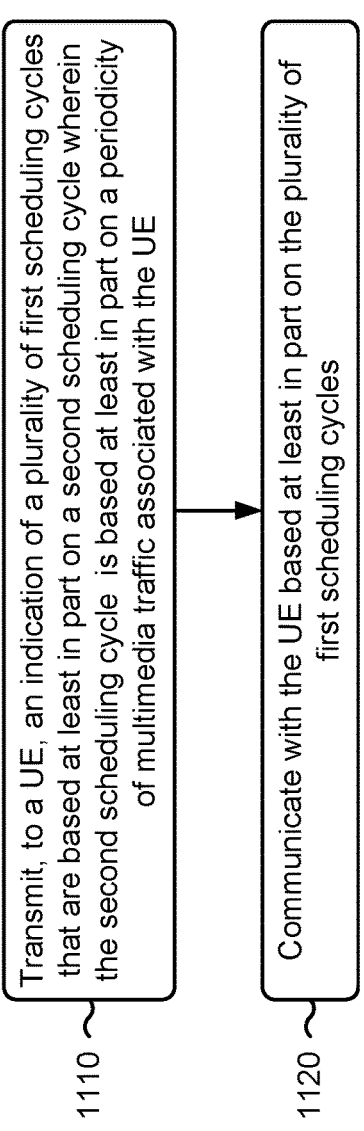

FIG. 11 is a diagram illustrating an example process 1100 performed, for example, by a network entity, in accordance with the present disclosure. Example process 1100 is an example where the network entity (e.g., a base station 110, a CU 310, a DU 330, an RU 340) performs operations associated with uplink and/or downlink scheduling alignment for periodic multimedia traffic.

As shown in FIG. 11, in some aspects, process 1100 may include transmitting, to a UE, an indication of a plurality of first scheduling cycles that are based at least in part on a second scheduling cycle, wherein the second scheduling cycle is based at least in part on a periodicity of multimedia traffic associated with the UE (block 1110). For example, the network entity (e.g., using communication manager 150, communication manager 1708, and/or transmission component 1704, depicted in FIG. 17) may transmit, to a UE, an indication of a plurality of first scheduling cycles that are based at least in part on a second scheduling cycle, as described above. In some aspects, the second scheduling cycle is based at least in part on a periodicity of multimedia traffic associated with the UE.

As further shown in FIG. 11, in some aspects, process 1100 may include communicating with the UE based at least in part on the plurality of first scheduling cycles (block 1120). For example, the network entity (e.g., using communication manager 150, communication manager 1708, reception component 1702, and/or transmission component 1704, depicted in FIG. 17) may communicate with the UE based at least in part on the plurality of first scheduling cycles, as described above.

Process 1100 may include additional aspects, such as any single aspect or any combination of aspects described below and/or in connection with one or more other processes described elsewhere herein.

In a first aspect, a duration of a third scheduling cycle of the plurality of first scheduling cycles, and a duration of a fourth scheduling cycle of the plurality of first scheduling cycles, are different durations. In a second aspect, alone or in combination with the first aspect, a starting time of a third scheduling cycle of the plurality of first scheduling cycles is aligned with a starting time of the second scheduling cycle, and an ending time of a fourth scheduling cycle of the plurality of first scheduling cycles is aligned with an ending time of the second scheduling cycle. In a third aspect, alone or in combination with one or more of the first and second aspects, a sum of respective durations of each of the plurality of first scheduling cycles is equal to a duration of the second scheduling cycle.

In a fourth aspect, alone or in combination with one or more of the first through third aspects, the duration of the second scheduling cycle corresponds to an integer value sum of a plurality of periods of the multimedia traffic. In a fifth aspect, alone or in combination with one or more of the first through fourth aspects, a quantity of the plurality of first scheduling cycles corresponds to a quantity of a plurality of periods of the multimedia traffic. In a sixth aspect, alone or in combination with one or more of the first through fifth aspects, durations of the plurality of periods of the multimedia traffic comprise non-integer value durations. In a seventh aspect, alone or in combination with one or more of the first through sixth aspects, transmitting the indication of the plurality of first scheduling cycles comprises transmitting the indication of the plurality of first scheduling cycles in a plurality of time domain offset information elements.

In an eighth aspect, alone or in combination with one or more of the first through seventh aspects, respective starting times of each of the plurality of first scheduling cycles are aligned with a time division duplexing resource configuration for a wireless connection on which the UE communicates with the network entity. In a ninth aspect, alone or in combination with one or more of the first through eighth aspects, a duration of the second scheduling cycle is based at least in part on a time division duplexing resource configuration for a wireless connection on which the network entity communicates with the UE, and the duration of the second scheduling cycle and a sum of respective durations of each of the plurality of first scheduling cycles are approximately equal.

In a tenth aspect, alone or in combination with one or more of the first through ninth aspects, the plurality of first scheduling cycles comprise a plurality of SPS cycles for downlink communication with the network entity, and process 1100 includes transmitting one or more downlink communications to the UE based at least in part on the plurality of SPS cycles. In an eleventh aspect, alone or in combination with one or more of the first through tenth aspects, transmitting the indication of the plurality of first scheduling cycles comprises transmitting, in an RRC communication, an indication of the plurality of SPS cycles, wherein each of the plurality of SPS cycles schedules a respective PDSCH resource.

In a twelfth aspect, alone or in combination with one or more of the first through eleventh aspects, process 1100 includes transmitting a DCI communication that activates the plurality of SPS cycles indicated in the RRC communication. In a thirteenth aspect, alone or in combination with one or more of the first through twelfth aspects, process 1100 includes determining the respective PDSCH resources for which (numberOfSlotsPerFrame×SFN+slot number in a frame)=[(numberOfSlotsPerFrame×SFN$_{start}$ $_{time}$+slot$_{start}$ $_{time}$+timeDomainOffset(i))+N×periodicity×numberOfSlotsPerFrame/10] modulo (1024×numberOfSlotsPerFrame)), wherein numberOfSlotsPerFrame corresponds to a quantity of slots in a frame, SFN corresponds to a system frame number in which a slot is included, SFN$_{start\ time}$ corresponds to a starting time of the SFN, slot$_{start\ time}$ corresponds to a starting time of the slot, periodicity corresponds to an integer value periodicity selected for the periodic multimedia traffic, N corresponds to an Nth resource allocation, and timeDomainOffset(i) corresponds to an ith SPS scheduling cycle of the plurality of SPS cycle. In a fourteenth aspect, alone or in combination with one or more of the first through thirteenth aspects, transmitting the indication of the plurality of first scheduling cycles comprises transmitting respective indications of each of the plurality of SPS cycles in respective DCI communications, wherein each of the plurality of SPS cycles schedules a respective PDSCH resource.

In a fifteenth aspect, alone or in combination with one or more of the first through fourteenth aspects, the plurality of first scheduling cycles comprise a plurality of CG cycles for uplink communication with the network entity, and process 1100 includes receiving one or more uplink communications from the UE based at least in part on the plurality of CG cycles. In a sixteenth aspect, alone or in combination with one or more of the first through fifteenth aspects, transmitting the indication of the plurality of first scheduling cycles comprises transmitting, in an RRC communication, an indication of the plurality of CG cycles, wherein each of the plurality of CG cycles schedules a respective PUSCH resource.

In a seventeenth aspect, alone or in combination with one or more of the first through sixteenth aspects, receiving the one or more uplink communications comprises receiving the one or more uplink communications in at least one of the respective PUSCH resources based at least in part on the RRC communication. In an eighteenth aspect, alone or in combination with one or more of the first through seventeenth aspects, process 1100 includes transmitting a DCI communication that activates the plurality of CG cycles indicated in the RRC communication, and receiving the one or more uplink communications comprises receiving the one or more uplink communications in at least one of the respective PUSCH resources based at least in part on the DCI communication. In a nineteenth aspect, alone or in combination with one or more of the first through eighteenth aspects, process 1100 includes determining the respective PUSCH resources for which [(SFN×numberOfSlotsPer-Frame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset(i)×numberOfSymbolsPerSlot+S+N×periodicity) modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number, numberOfSymbolsPerSlot corresponds to a quantity of symbols per slot, timeReferenceSFN corresponds to an SFN time reference value, timeDomainOffset(i) corresponds to an ith CG cycles of the plurality of CG cycles, S corresponds to a starting symbol, N corresponds to an Nth resource allocation, and periodicity corresponds to an integer value periodicity selected for the periodic multimedia traffic.

In a twentieth aspect, alone or in combination with one or more of the first through nineteenth aspects, transmitting the indication of the plurality of first scheduling cycles comprises transmitting respective indications of each of the plurality of CG cycles in respective DCI communications, wherein each of the plurality of CG cycles schedules a respective PUSCH resource.

In a twenty-first aspect, along or in combination with one or more of the first through twentieth aspects, process 1100 includes determining the respective PUSCH resources for which [(SFN×numberOfSlotsPerFrame×numberOfSymbolsPerSlot)+(slot number in a frame×numberOfSymbolsPerSlot)+symbol number in a slot]=[(SFN$_{start\ time}$×numberOfSlotsPerFrame×numberOfSymbolsPerSlot+slot$_{start\ time}$ numberOfSymbolsPerSlot+symbol$_{start\ time}$+timeDomainOffset(i)×numberOfSymbolsPerSlot)+N×periodicity] modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number, numberOfSymbolsPerSlot corresponds to a quantity of symbols per slot, timeDomainOffset(i) corresponds to an ith CG cycles of the plurality of CG cycles, SFN$_{start\ time}$ corresponds to a starting time of the SFN, slot$_{start\ time}$ corresponds to a starting time of the slot, N corresponds to an Nth resource allocation, and periodicity corresponds to an integer value periodicity selected for the periodic multimedia traffic.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
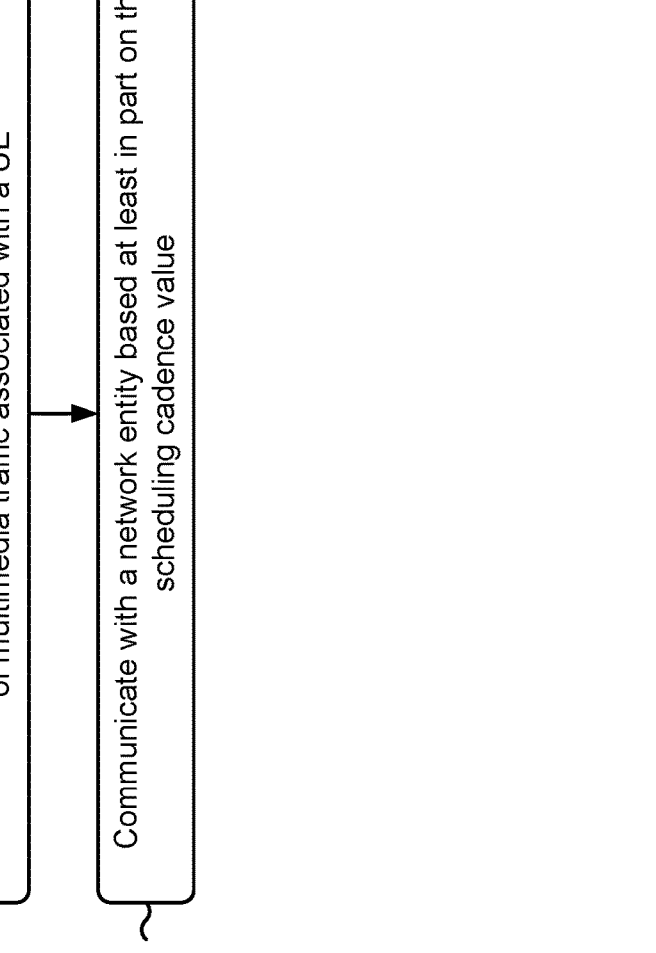

FIG. 12 is a diagram illustrating an example process 1200 performed, for example, by a UE, in accordance with the present disclosure. Example process 1200 is an example where the UE (e.g., UE 120) performs operations associated with uplink and/or downlink scheduling alignment for periodic multimedia traffic.

As shown in FIG. 12, in some aspects, process 1200 may include obtaining a scheduling cadence value that corresponds to a periodicity of multimedia traffic associated with the UE (block 1210). For example, the UE (e.g., using communication manager 140, communication manager 1608, and/or obtaining component 1612, depicted in FIG. 16) may obtain a scheduling cadence value that corresponds to a periodicity of multimedia traffic associated with the UE, as described above.

As further shown in FIG. 12, in some aspects, process 1200 may include communicating with a network entity based at least in part on the scheduling cadence value (block 1220). For example, the UE (e.g., using communication manager 140, communication manager 1608, reception component 1602, and/or transmission component 1604, depicted in FIG. 16) may communicate with a network entity based at least in part on the scheduling cadence value, as described above.

Process 1200 may include additional aspects, such as any single aspect or any combination of aspects described below and/or in connection with one or more other processes described elsewhere herein.

In a first aspect, obtaining the scheduling cadence value comprises receiving an indication of the scheduling cadence value from the network entity. In a second aspect, alone or in combination with the first aspect, the scheduling cadence value comprises a configured grant cadence value, or a semi-persistent scheduling cadence value. In a third aspect, alone or in combination with one or more of the first and second aspects, communicating with the network entity comprises communicating with the network entity in a subframe based at least in part on determining that a first ceiling value of (a subframe identifier n associated with the subframe*the scheduling cadence value/1000)+1 is equal to a second ceiling value of (n+1)*(the scheduling cadence value/1000).

In a fourth aspect, alone or in combination with one or more of the first through third aspects, the subframe identifier n is equal to (10*a system frame number of a frame comprising the subframe)+a subframe number of the subframe within the frame. In a fifth aspect, alone or in combination with one or more of the first through fourth aspects, communicating with the network entity in the subframe comprises communicating with the network entity in a slot, in the subframe, after a time domain offset from a starting time of the subframe. In a sixth aspect, alone or in combination with one or more of the first through fifth aspects, communicating with the network entity in the slot comprises communicating with the network entity in a symbol in the slot.

In a seventh aspect, alone or in combination with one or more of the first through sixth aspects, communicating with the network entity comprises communicating with the network entity in a symbol for which a value of (numberOfSlotsPerFrame×SFN+slot number in the frame)=[(numberOfSlotsPerFrame×SFN$_{start\ time}$+slot$_{start\ time}$) Ceil (N (numberOfSlotsPerFrame*100/cadence)] modulo (1024× numberOfSlotsPerFrame)), wherein numberOfSlotsPerFrame corresponds to a quantity of slots per frame for the UE and the network entity, SFN corresponds to a system frame number, N corresponds to an Nth resource allocation, and cadence corresponds to the scheduling cadence value.

In an eighth aspect, alone or in combination with one or more of the first through seventh aspects, communicating with the network entity comprises communicating with the network entity in a symbol for which a value of (numberOfSlotsPerFrame×SFN+slot number in the frame)= [(numberOfSlotsPerFrame×SFN$_{start\ time}$+slot$_{start\ time}$)+Floor (N×(numberOfSlotsPerFrame*100/cadence)] modulo (1024×numberOfSlotsPerFrame)), wherein numberOfSlotsPerFrame corresponds to a quantity of slots per frame for the UE and the network entity, SFN corresponds to a system frame number, N corresponds to an Nth resource allocation, and cadence corresponds to the scheduling cadence value.

In a ninth aspect, alone or in combination with one or more of the first through eighth aspects, communicating with the network entity comprises communicating with the network entity in a symbol for which a value of [(SFN× numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset× numberOfSymbolsPerSlot+S+Ceil(N×(numberOfSlotsPerFrame×numberOfSymbolsPerSlot/10/cadence))) modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and cadence corresponds to the scheduling cadence value.

In a tenth aspect, alone or in combination with one or more of the first through ninth aspects, communicating with the network entity comprises communicating with the network entity in a symbol for which a value of [(SFN× numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset× numberOfSymbolsPerSlot+S+Floor(N×(numberOfSlotsPerFrame×numberOfSymbolsPerSlot/10/cadence))) modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and cadence corresponds to the scheduling cadence value.

In an eleventh aspect, alone or in combination with one or more of the first through tenth aspects, communicating with the network entity comprises communicating with the network entity in a symbol for which a value of [(SFN× numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame×numberOfSymbolsPerSlot+slot$_{start\ time}$×numberOfSymbolsPerSlot+symbol$_{start\ time}$)+Ceil(N×(numberOfSlotsPerFrame×numberOfSymbolsPerSlot/10/cadence)))] modulo (1024×numberOfSlotsPerFrame× numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, N corresponds to an Nth resource allocation, cadence corresponds to the scheduling cadence value, SFN$_{start\ time}$ corresponds to an SFN start time, slot$_{start\ time}$ corresponds to a slot start time, and symbol$_{start\ time}$ corresponds to a symbol start time.

In a twelfth aspect, alone or in combination with one or more of the first through eleventh aspects, communicating with the network entity comprises communicating with the network entity in a symbol for which a value of [(SFN× numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame×numberOfSymbolsPerSlot+slot$_{start\ time}$×numberOfSymbolsPerSlot+symbol$_{start\ time}$)+Floor(N×(numberOfSlotsPerFrame×numberOfSymbolsPerSlot/10/cadence)))] modulo (1024×numberOfSlotsPerFrame× numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, N corresponds to an Nth resource allocation, cadence corresponds to the scheduling cadence value, SFN$_{start\ time}$ corresponds to an SFN start time, slots tart time corresponds to a slot start time, and symbol$_{start\ time}$ corresponds to a symbol start time.

In a thirteenth aspect, alone or in combination with one or more of the first through twelfth aspects, process 1200 includes determining a slot within a subframe based at least in part on a time division duplexing configuration pattern, and communicating with the network entity in the subframe comprises communicating with the network entity in the slot. In a fourteenth aspect, alone or in combination with one or more of the first through thirteenth aspects, process 1200 includes receiving an indication of an available slot within a subframe for the multimedia traffic, wherein the available slot is based at least in part on a time division duplexing configuration pattern, and wherein communicating with the network entity in the subframe comprises communicating with the network entity in the slot.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
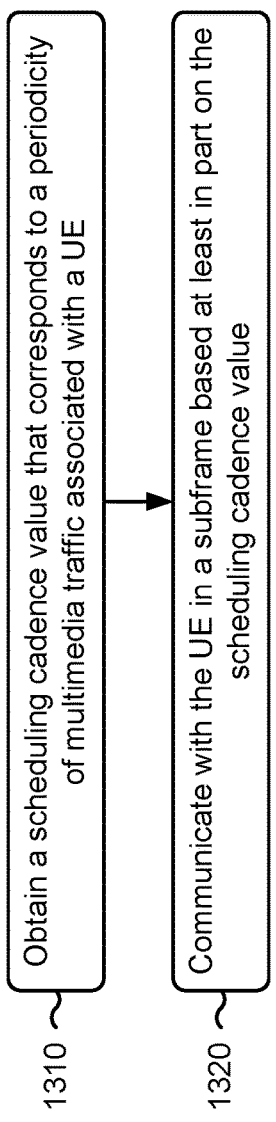

FIG. 13 is a diagram illustrating an example process 1300 performed, for example, by a network entity, in accordance with the present disclosure. Example process 1300 is an example where the network entity (e.g., a base station 110, a CU 310, a DU 330, an RU 340) performs operations associated with uplink and/or downlink scheduling alignment for periodic multimedia traffic.

As shown in FIG. 13, in some aspects, process 1300 may include obtaining a scheduling cadence value that corresponds to a periodicity of multimedia traffic associated with a UE (block 1310). For example, the network entity (e.g., using communication manager 150, communication manager 1708, and/or obtaining component 1712, depicted in FIG. 17) may obtain a scheduling cadence value that corresponds to a periodicity of multimedia traffic associated with a UE, as described above.

As further shown in FIG. 13, in some aspects, process 1300 may include communicating with the UE in a subframe based at least in part on the scheduling cadence value (block 1320). For example, the network entity (e.g., using communication manager 150, communication manager 1708, reception component 1702, and/or transmission component 1704, depicted in FIG. 17) may communicate with the UE in a subframe based at least in part on the scheduling cadence value, as described above.

Process 1300 may include additional aspects, such as any single aspect or any combination of aspects described below and/or in connection with one or more other processes described elsewhere herein.

In a first aspect, process 1300 includes transmitting an indication of the scheduling cadence value to the UE. In a second aspect, alone or in combination with the first aspect, the scheduling cadence value comprises a configured grant cadence value, or a semi-persistent scheduling cadence value. In a third aspect, alone or in combination with one or more of the first and second aspects, communicating with the UE comprises communicating with the UE in a subframe based at least in part on determining that a first ceiling value of (a subframe identifier n associated with the subframe*the scheduling cadence value/1000)+1 is equal to a second ceiling value of (n+1)*(the scheduling cadence value/1000).

In a fourth aspect, alone or in combination with one or more of the first through third aspects, the subframe identifier n is equal to (10*a system frame number of a frame comprising the subframe)+a subframe number of the subframe within the frame. In a fifth aspect, alone or in combination with one or more of the first through fourth aspects, communicating with the UE in the subframe comprises communicating with the UE in a slot, in the subframe, after a time domain offset from a starting time of the subframe. In a sixth aspect, alone or in combination with one or more of the first through fifth aspects, communicating with the UE in the slot comprises communicating with the UE in a symbol in the slot.

In a seventh aspect, alone or in combination with one or more of the first through sixth aspects, communicating with the UE comprises communicating with the UE in a symbol for which a value of (numberOfSlotsPerFrame×SFN+slot number in the frame)=[(numberOfSlotsPerFrame× $SFN_{start\ time}$+slot$_{start\ time}$)+Ceil (N×(numberOfSlotsPerFrame*100/cadence)] modulo (1024×numberOfSlotsPerFrame)), wherein numberOfSlotsPerFrame corresponds to a quantity of slots per frame for the UE and the network entity, SFN corresponds to a system frame number, N corresponds to an Nth resource allocation, and cadence corresponds to the scheduling cadence value.

In an eighth aspect, alone or in combination with one or more of the first through seventh aspects, communicating with the UE comprises communicating with the UE in a symbol for which a value of (numberOfSlotsPerFrame× SFN+slot number in the frame)=[(numberOfSlotsPer-Frame×SFN$_{start\ time}$+slot$_{start\ time}$)+Floor (N×(num-berOfSlotsPerFrame*100/cadence)] modulo (1024× numberOfSlotsPerFrame)), wherein numberOfSlots-PerFrame corresponds to a quantity of slots per frame for the UE and the network entity, SFN corresponds to a system frame number, N corresponds to an Nth resource allocation, and cadence corresponds to the scheduling cadence value.

In a ninth aspect, alone or in combination with one or more of the first through eighth aspects, communicating with the UE comprises communicating with the UE in a symbol for which a value of [(SFN×numberOfSlotsPer-Frame×numberOfSymbolsPerSlot)+(slot number in the frame×numberOfSymbolsPerSlot)+symbol number in the slot]=(timeReferenceSFN×numberOfSlotsPerFrame×num-berOfSymbolsPerSlot+timeDomainOffset×numberOfSym-bolsPerSlot+S+Ceil(N×(numberOfSlotsPerFrame×num-berOfSymbolsPerSlot/10/cadence))) modulo (1024× numberOfSlotsPerFrame×numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corre-sponds to an SFN time reference value, timeDomainOffset corresponds to a time domain offset value, S corresponds to a starting symbol, N corresponds to an Nth resource allo-cation, and cadence corresponds to the scheduling cadence value.

In a tenth aspect, alone or in combination with one or more of the first through ninth aspects, communicating with the UE comprises communicating with the UE in a symbol for which a value of [(SFN×numberOfSlotsPerFrame×num-berOfSymbolsPerSlot)+(slot number in the frame×num-berOfSymbolsPerSlot)+symbol number in the slot]=(tim-eReferenceSFN×numberOfSlotsPerFrame×numberOf-SymbolsPerSlot+timeDomainOffset×numberOfSymbol-sPerSlot+S+Floor(N×(numberOfSlotsPerFrame×num-berOfSymbolsPerSlot/10/cadence))) modulo (1024×num-berOfSlotsPerFrame×numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corre-sponds to an SFN time reference value, timeDomainOffset corresponds to a time domain offset value, S corresponds to a starting symbol, N corresponds to an Nth resource allo-cation, and cadence corresponds to the scheduling cadence value.

In an eleventh aspect, alone or in combination with one or more of the first through tenth aspects, communicating with the UE comprises communicating with the UE in a symbol for which a value of [(SFN×numberOfSlotsPerFrame×num-berOfSymbolsPerSlot)+(slot number in the frame×num-berOfSymbolsPerSlot)+symbol number in the slot]= [(SFN$_{start\ time}$×numberOfSlotsPerFrame×numberOfSym-bolsPerSlot+slot$_{start\ time}$×numberOfSymbolsPerSlot+sym-bol$_{start\ time}$)+Ceil(N×(numberOfSlotsPerFrame×num-berOfSymbolsPerSlot/10/cadence)))] modulo (1024× numberOfSlotsPerFrame×numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corre-sponds to an SFN time reference value, timeDomainOffset corresponds to a time domain offset value, N corresponds to an Nth resource allocation, cadence corresponds to the scheduling cadence value, SFN$_{start\ time}$ corresponds to an SFN start time, slot$_{start\ time}$ corresponds to a slot start time, and symbol$_{start\ time}$ corresponds to a symbol start time.

In a twelfth aspect, alone or in combination with one or more of the first through eleventh aspects, communicating with the UE comprises communicating with the UE in a symbol for which a value of [(SFN×numberOfSlotsPer-Frame×numberOfSymbolsPerSlot)+(slot number in the frame×numberOfSymbolsPerSlot)+symbol number in the slot]=[(SFN$_{start\ time}$×numberOfSlotsPerFrame×numberOfS-ymbolsPerSlot+slot$_{start\ time}$×numberOfSymbolsPerSlot+ symbol$_{start\ time}$)+Floor(N×(numberOfSlotsPerFrame×num-berOfSymbolsPerSlot/10/cadence)))] modulo (1024× numberOfSlotsPerFrame×numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, N corresponds to an Nth resource allocation, cadence corresponds to the scheduling cadence value, $SFN_{start\ time}$ corresponds to an SFN start time, $slot_{start\ time}$ corresponds to a slot start time, and $symbol_{start\ time}$ corresponds to a symbol start time.

In a thirteenth aspect, alone or in combination with one or more of the first through twelfth aspects, process 1300 includes determining a slot within a subframe based at least in part on a time division duplexing configuration pattern, and communicating with the UE in the subframe comprises communicating with the UE in the slot. In a fourteenth aspect, alone or in combination with one or more of the first through thirteenth aspects, process 1300 includes transmitting, to the UE, an indication of an available slot within a subframe for the multimedia traffic, wherein the available slot is based at least in part on a time division duplexing configuration pattern, and wherein communicating with the UE in the subframe comprises communicating with the UE in the slot.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
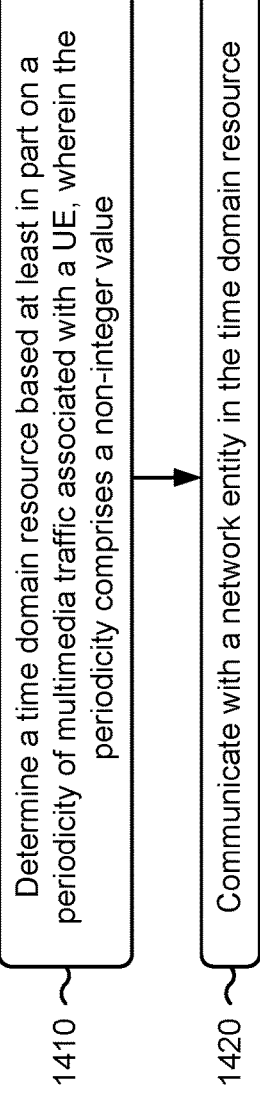
Figure 14:

FIG. 14 is a diagram illustrating an example process 1400 performed, for example, by a UE, in accordance with the present disclosure. Example process 1400 is an example where the UE (e.g., UE 120) performs operations associated with uplink and/or downlink scheduling alignment for periodic multimedia traffic.

As shown in FIG. 14, in some aspects, process 1400 may include determining a time domain resource based at least in part on a periodicity of multimedia traffic associated with the UE, wherein the periodicity comprises a non-integer value (block 1410). For example, the UE (e.g., using communication manager 140, communication manager 1608, and/or determination component 1610, depicted in FIG. 16) may determine a time domain resource based at least in part on a periodicity of multimedia traffic associated with the UE, as described above. In some aspects, the periodicity comprises a non-integer value.

As further shown in FIG. 14, in some aspects, process 1400 may include communicating with a network entity in the time domain resource (block 1420). For example, the UE (e.g., using communication manager 140, communication manager 1608, reception component 1602, and/or transmission component 1604, depicted in FIG. 16) may communicate with a network entity in the time domain resource, as described above.

Process 1400 may include additional aspects, such as any single aspect or any combination of aspects described below and/or in connection with one or more other processes described elsewhere herein.

In a first aspect, determining the time domain resource comprises determining the time domain resource for which a value of (numberOfSlotsPerFrame×SFN+slot number in the frame)=[(numberOfSlotsPerFrame×$SFN_{start\ time}$+$slot_{start\ time}$)+Ceil(N×periodicity×numberOfSlotsPerFrame/10)] modulo (1024×numberOfSlotsPerFrame)), wherein numberOfSlotsPerFrame corresponds to a quantity of slots per frame for the UE and the network entity, SFN corresponds to a system frame number, $SFN_{start\ time}$ corresponds to an SFN start time, $slot_{start\ time}$ corresponds to a slot start time, N corresponds to an Nth resource allocation, and periodicity corresponds to the periodicity of the multimedia.

In a second aspect, alone or in combination with the first aspect, determining the time domain resource comprises determining the time domain resource for which a value of (numberOfSlotsPerFrame×SFN+slot number in the frame)=[(numberOfSlotsPerFrame×$SFN_{start\ time}$+$slot_{start\ time}$)+Floor (N×periodicity×numberOfSlotsPerFrame/10)] modulo (1024×numberOfSlotsPerFrame)), wherein numberOfSlotsPerFrame corresponds to a quantity of slots per frame for the UE and the network entity, SFN corresponds to a system frame number, $SFN_{start\ time}$ corresponds to an SFN start time, $slot_{start\ time}$ corresponds to a slot start time, N corresponds to an Nth resource allocation, and periodicity corresponds to the periodicity of the multimedia.

In a third aspect, alone or in combination with one or more of the first and second aspects, determining the time domain resource comprises determining the time domain resource for which a value of [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+Ceil(N×periodicity)) modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and periodicity corresponds to the periodicity for the multimedia traffic.

In a fourth aspect, alone or in combination with one or more of the first through third aspects, determining the time domain resource comprises determining the time domain resource for which a value of [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+Floor(N×periodicity)) modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and periodicity corresponds to the periodicity for the multimedia traffic.

In a fifth aspect, alone or in combination with one or more of the first through fourth aspects, determining the time domain resource comprises determining the time domain resource for which a value of [(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame×numberOfSymbolsPerSlot+$slot_{start\ time}$×numberOfSymbolsPerSlot+$symbol_{start\ time}$)+Ceil(N×periodicity)] modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, $SFN_{start\ time}$ corresponds to an SFN start time, $slot_{start\ time}$ corresponds to a slot start time, $symbol_{start\ time}$ corresponds to a symbol start time, N corresponds to an Nth resource allocation, and periodicity corresponds to the periodicity of the multimedia traffic.

In a sixth aspect, alone or in combination with one or more of the first through fifth aspects, determining the time domain resource comprises determining the time domain resource for which a value of [(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame×numberOfSymbolsPerSlot+slot$_{start\ time}$×numberOfSymbolsPerSlot+symbol$_{start\ time}$)+Floor(N×periodicity)] modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, $SFN_{start\ time}$ corresponds to an SFN start time, $slot_{start\ time}$ corresponds to a slot start time, $symbol_{start\ time}$ corresponds to a symbol start time, N corresponds to an Nth resource allocation, and periodicity corresponds to the periodicity of the multimedia traffic.

In a seventh aspect, alone or in combination with one or more of the first through sixth aspects, determining the time domain resource comprises determining a slot based at least in part on a time division duplexing configuration pattern, and communicating with the network entity in the time domain resource comprises communicating with the network entity in the slot. In an eighth aspect, alone or in combination with one or more of the first through seventh aspects, process 1400 includes receiving an indication of an available slot within a subframe for the multimedia traffic, wherein the available slot is based at least in part on a time division duplexing configuration pattern, and wherein communicating with the network entity in the time domain resource comprises communicating with the network entity in the slot.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
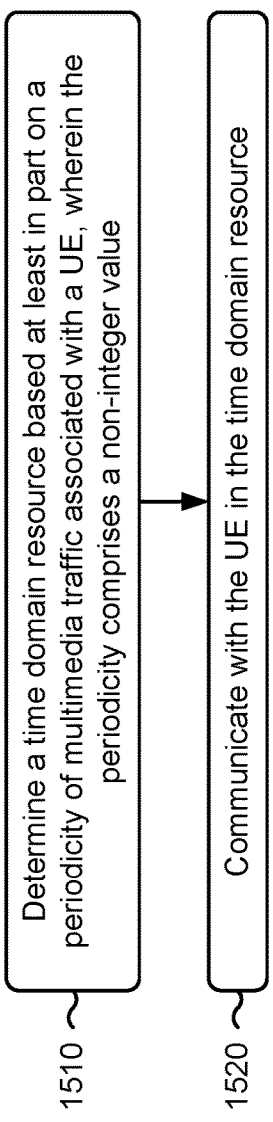

FIG. 15 is a diagram illustrating an example process 1500 performed, for example, by a network entity, in accordance with the present disclosure. Example process 1500 is an example where the network entity (e.g., a base station 110, a CU 310, a DU 330, an RU 340) performs operations associated with uplink and/or downlink scheduling alignment for periodic multimedia traffic.

As shown in FIG. 15, in some aspects, process 1500 may include determining a time domain resource based at least in part on a periodicity of multimedia traffic associated with a UE, wherein the periodicity comprises a non-integer value (block 1510). For example, the network entity (e.g., using communication manager 140, communication manager 1708, and/or determination component 1710, depicted in FIG. 17) may determine a time domain resource based at least in part on a periodicity of multimedia traffic associated with a UE, as described above. In some aspects, the periodicity comprises a non-integer value.

As further shown in FIG. 15, in some aspects, process 1500 may include communicating with the UE in the time domain resource (block 1520). For example, the network entity (e.g., using communication manager 150, communication manager 1708, reception component 1702, and/or transmission component 1704, depicted in FIG. 17) may communicate with the UE in the time domain resource, as described above.

Process 1500 may include additional aspects, such as any single aspect or any combination of aspects described below and/or in connection with one or more other processes described elsewhere herein.

In a first aspect, determining the time domain resource comprises determining the time domain resource for which a value of (numberOfSlotsPerFrame×SFN+slot number in the frame)=[(numberOfSlotsPerFrame×SFN$_{start\ time}$+slot$_{start\ time}$)+Ceil(N×periodicity×numberOfSlotsPerFrame/10)] modulo (1024×numberOfSlotsPerFrame)), wherein numberOfSlotsPerFrame corresponds to a quantity of slots per frame for the UE and the network entity, SFN corresponds to a system frame number, $SFN_{start\ time}$ corresponds to an SFN start time, $slot_{start\ time}$ corresponds to a slot start time, N corresponds to an Nth resource allocation, and periodicity corresponds to the periodicity of the multimedia.

In a second aspect, alone or in combination with the first aspect, determining the time domain resource comprises determining the time domain resource for which a value of (numberOfSlotsPerFrame×SFN+slot number in the frame)= [(numberOfSlotsPerFrame×SFN$_{start\ time}$+slot$_{start\ time}$)+Floor (N×periodicity×numberOfSlotsPerFrame/10)] modulo (1024×numberOfSlotsPerFrame)), wherein numberOfSlotsPerFrame corresponds to a quantity of slots per frame for the UE and the network entity, SFN corresponds to a system frame number, $SFN_{start\ time}$ corresponds to an SFN start time, $slot_{start\ time}$ corresponds to a slot start time, N corresponds to an Nth resource allocation, and periodicity corresponds to the periodicity of the multimedia.

In a third aspect, alone or in combination with one or more of the first and second aspects, determining the time domain resource comprises determining the time domain resource for which a value of [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+Ceil(N×periodicity)) modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and periodicity corresponds to the periodicity for the multimedia traffic.

In a fourth aspect, alone or in combination with one or more of the first through third aspects, determining the time domain resource comprises determining the time domain resource for which a value of [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+Floor(N×periodicity)) modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and periodicity corresponds to the periodicity for the multimedia traffic.

In a fifth aspect, alone or in combination with one or more of the first through fourth aspects, determining the time domain resource comprises determining the time domain resource for which a value of [(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame×numberOfSymbolsPerSlot+slot$_{start\ time}$×numberOfSymbolsPerSlot+symbol$_{start\ time}$)+Ceil(N×periodicity)] modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, SFN$_{start\ time}$ corresponds to an SFN start time, slot$_{start\ time}$ corresponds to a slot start time, symbol$_{start\ time}$ corresponds to a symbol start time, N corresponds to an Nth resource allocation, and periodicity corresponds to the periodicity of the multimedia traffic.

In a sixth aspect, alone or in combination with one or more of the first through fifth aspects, determining the time domain resource comprises determining the time domain resource for which a value of [(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame×numberOfSymbolsPerSlot+slot$_{start\ time}$×numberOfSymbolsPerSlot+symbol$_{start\ time}$)+Floor(N×periodicity)] modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, SFN$_{start\ time}$ corresponds to an SFN start time, slot$_{start\ time}$ corresponds to a slot start time, symbol$_{start\ time}$ corresponds to a symbol start time, N corresponds to an Nth resource allocation, and periodicity corresponds to the periodicity of the multimedia traffic.

In a seventh aspect, alone or in combination with one or more of the first through sixth aspects, determining the time domain resource comprises determining a slot based at least in part on a time division duplexing configuration pattern, and communicating with the UE in the time domain resource comprises communicating with the UE in the slot. In an eighth aspect, alone or in combination with one or more of the first through seventh aspects, process 1500 includes transmitting, to the UE, an indication of an available slot within a subframe for the multimedia traffic, wherein the available slot is based at least in part on a time division duplexing configuration pattern, and wherein communicating with the UE in the time domain resource comprises communicating with the UE in the slot.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
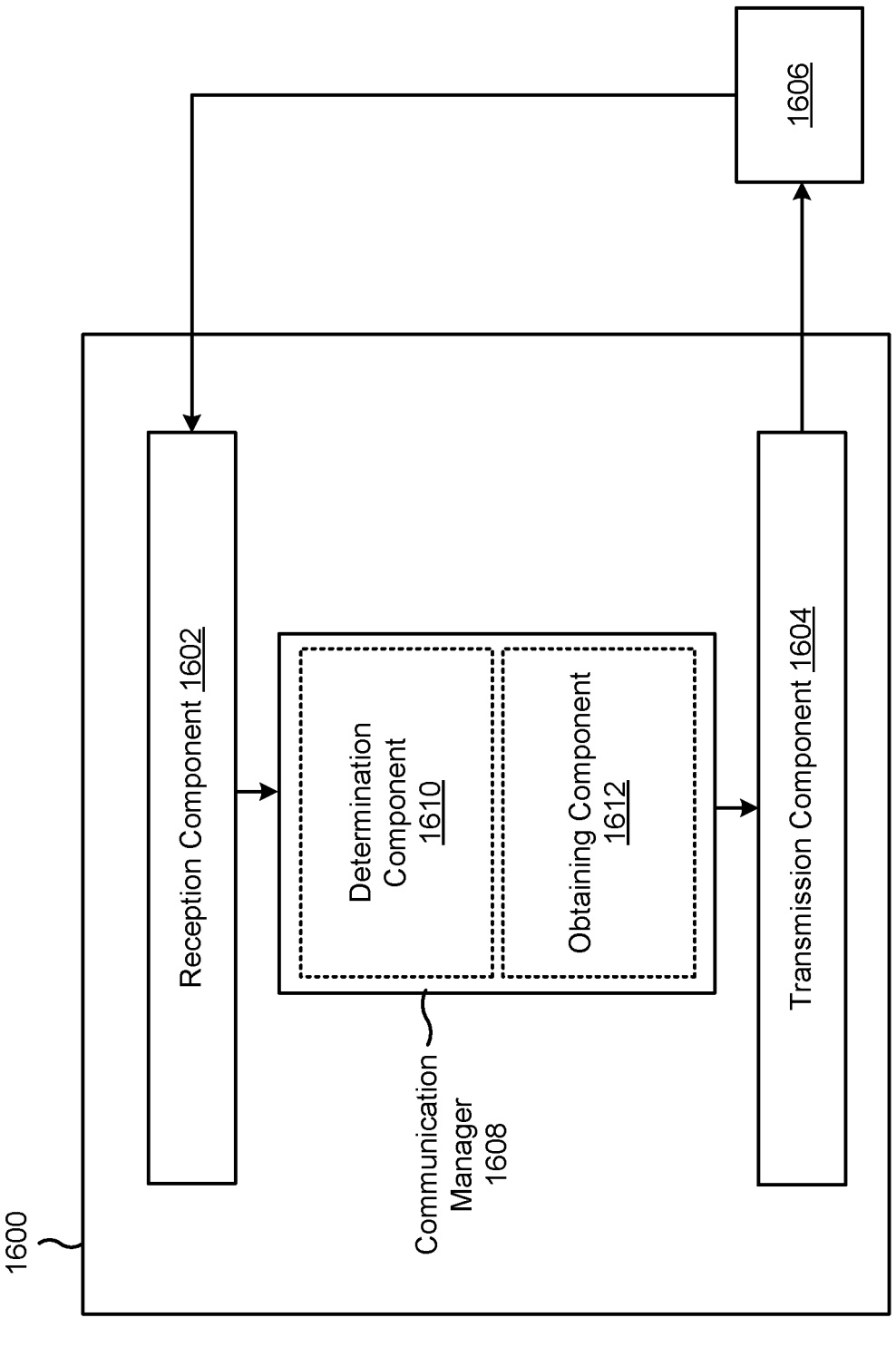
FIGS. 16 and 17 are diagrams of example apparatuses for wireless communication, in accordance with the present disclosure.

FIG. 16 is a diagram of an example apparatus 1600 for wireless communication. The apparatus 1600 may be a UE (e.g., a UE 120), or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a communication manager 1608, which may include one or more communication managers 140 or may be included in one or more communication managers 140. The communication manager 1608 may include one or more of a determination component 1610 and/or an obtaining component 1612, among other examples.

In some aspects, the apparatus 1600 may be configured to perform one or more operations described herein in connection with FIGS. 6-9. Additionally, or alternatively, the apparatus 1600 may be configured to perform one or more processes described herein, such as process 1000 of FIG. 10, process 1200 of FIG. 12, process 1400 of FIG. 14, or a combination thereof. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

In some aspects, the reception component 1602 may receive (e.g., from the apparatus 1606) an indication of a plurality of first scheduling cycles that are based at least in part on a second scheduling cycle. The second scheduling cycle may be based at least in part on a periodicity of multimedia traffic associated with the apparatus 1600. In some aspects, the reception component 1602, the transmission component 1604, and/or the communication manager 1608 may communicate with the apparatus 1606 based at least in part on the plurality of first scheduling cycles.

In some aspects, the reception component 1602 may receive (e.g., from the apparatus 1606) an RRC communication that includes an indication of a plurality of SPS cycles (e.g., the plurality of first cycles). In some aspects, the reception component 1602 may receive (e.g., from the apparatus 1606) a DCI communication that activates the plurality of SPS cycles indicated in the RRC communication.

In some aspects, each of the plurality of SPS cycles schedules a respective PDSCH resource, and the determination component 1610 may determine respective starting times for the respective PDSCH resources based at least in part on the plurality of SPS cycles and the periodicity of the multimedia traffic.

In some aspects, the reception component 1602 may receive (e.g., from the apparatus 1606) an RRC communication that includes an indication of a plurality of CG cycles (e.g., the plurality of first cycles). In some aspects, the reception component 1602 may receive (e.g., from the apparatus 1606) a DCI communication that activates the plurality of CG cycles indicated in the RRC communication.

In some aspects, each of the plurality of CG cycles schedules a respective PUSCH resource, and the determination component 1610 may determine respective starting times for the respective PUSCH resources based at least in part on the plurality of CG cycles and the periodicity of the multimedia traffic.

In some aspects, the obtaining component 1612 may obtain a scheduling cadence value that corresponds to a periodicity of multimedia traffic associated with the apparatus 1606. In some aspects, the reception component 1602, the transmission component 1604, and/or the communication manager 1608 may communicate with the apparatus 1606 based at least in part on the scheduling cadence value.

In some aspects, the determination component 1610 may determine a slot within a subframe based at least in part on a time division duplexing configuration pattern.

In some aspects, the reception component 1602 may receive (e.g., from the apparatus 1606) an indication of an available slot within a subframe for the multimedia traffic, wherein the available slot is based at least in part on a time division duplexing configuration pattern.

In some aspects, the determination component 1610 may determine a time domain resource based at least in part on a periodicity of multimedia traffic associated with the apparatus 1606, where the periodicity comprises a non-integer value. In some aspects, reception component 1602, the transmission component 1604, and/or the communication manager 1608 may communicate with the apparatus 1606 in the time domain resource.

In some aspects, the reception component 1602 may receive (e.g., from the apparatus 1606) an indication of an available slot within a subframe for the multimedia traffic, where the available slot is based at least in part on a time division duplexing configuration pattern.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
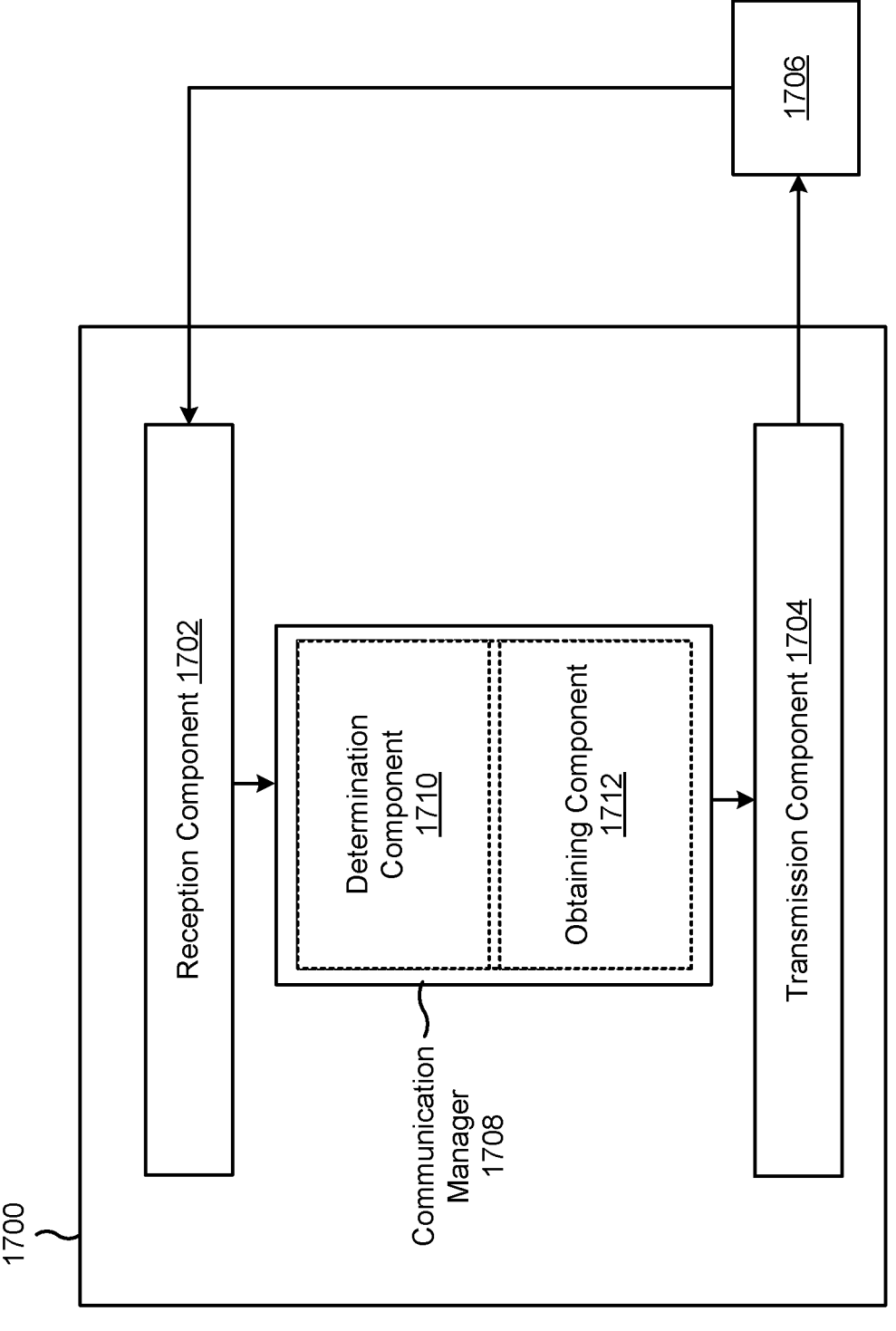

FIG. 17 is a diagram of an example apparatus 1700 for wireless communication. The apparatus 1700 may be a network entity (e.g., a base station 110, one or more network entities described above in connection with FIG. 3 such as a CU 310, a DU 330, and/or an RU 340), or a network entity may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include a communication manager 1708, which may include one or more communication managers 150 and/or may be included in one or more communication managers 150. The communication manager 1708 may include one or more of a determination component 1710 and/or an obtaining component 1712, among other examples.

In some aspects, the apparatus 1700 may be configured to perform one or more operations described herein in connection with FIGS. 6-9. Additionally, or alternatively, the apparatus 1700 may be configured to perform one or more processes described herein, such as process 1100 of FIG. 10, process 1300 of FIG. 13, process 1500 of FIG. 15, or a combination thereof. In some aspects, the apparatus 1700 and/or one or more components shown in FIG. 17 may include one or more components of the base station described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the base station described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the base station described in connection with FIG. 2. In some aspects, the transmission component 1704 may be co-located with the reception component 1702 in a transceiver.

In some aspects, the transmission component 1704 may transmit, to the apparatus 1706, an indication of a plurality of first scheduling cycles that are based at least in part on a second scheduling cycle. The second scheduling cycle may be based at least in part on a periodicity of multimedia traffic associated with the apparatus 1706. The reception component 1702, the transmission component 1704, and/or the communication manager 1708 may communicate with the apparatus 1706 based at least in part on the plurality of first scheduling cycles.

In some aspects, the plurality of first cycles include a plurality of SPS cycles. In some aspects, the transmission component 1704 may transmit an RRC communication that includes an indication of the plurality of SPS cycles. In some aspects, the transmission component 1704 may transmit (e.g., to the apparatus 1706) a DCI communication that activates the plurality of SPS cycles indicated in the RRC communication.

In some aspects, each of the plurality of SPS cycles schedules a respective PDSCH resource. In some aspects, the determination component 1710 may determine respective starting times for the respective PDSCH resources based at least in part on the plurality of SPS cycles and the periodicity of the multimedia traffic.

In some aspects, the plurality of first scheduling cycles include a plurality of CG cycles for uplink communication. In some aspects, the reception component 1702 may receive (e.g., from the apparatus 1706) one or more uplink communications based at least in part on the CG cycles.

In some aspects, the transmission component 1704 may transmit (e.g., to the apparatus 1706) an RRC communication that includes an indication of the plurality of CG cycles. In some aspects, transmission component 1704 may transmit (e.g., to the apparatus 1706) a DCI communication that activates the plurality of CG cycles indicated in the RRC communication.

In some aspects, each of the plurality of CG cycles may schedule a respective PUSCH resource. In some aspects, the determination component 1710 may determine respective starting times for the respective PUSCH resources based at least in part on the plurality of CG cycles and the periodicity of the multimedia traffic.

In some aspects, the obtaining component 1712 may obtain a scheduling cadence value that corresponds to a periodicity of multimedia traffic associated with the apparatus 1706. In some aspects, the reception component 1702, the transmission component 1704, and/or the communication manager 1708 may communicate with the apparatus 1706 in a subframe based at least in part on the scheduling cadence value.

In some aspects, the transmission component 1704 may transmit an indication of the scheduling cadence value to the apparatus 1706.

In some aspects, the determination component 1710 may determine a slot within a subframe based at least in part on a time division duplexing configuration pattern.

In some aspects, the transmission component 1704 may transmit, to the apparatus 1706, an indication of an available slot within a subframe for the multimedia traffic, wherein the available slot is based at least in part on a time division duplexing configuration pattern.

In some aspects, the determination component 1710 may determine a time domain resource based at least in part on a periodicity of multimedia traffic associated with the apparatus 1706, where the periodicity comprises a non-integer value. In some aspects, the reception component 1702, the transmission component 1704, and/or the communication manager 1708 may communicate with the apparatus 1706 in the time domain resource.

In some aspects, the transmission component 1704 may transmit, to the apparatus 1706, an indication of an available slot within a subframe for the multimedia traffic, wherein the available slot is based at least in part on a time division duplexing configuration pattern.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: receiving an indication of a plurality of first scheduling cycles that are based at least in part on a second scheduling cycle, wherein the second scheduling cycle is based at least in part on a periodicity of multimedia traffic associated with the UE; and communicating with a network entity based at least in part on the plurality of first scheduling cycles.

Aspect 2: The method of Aspect 1, wherein a duration of a third scheduling cycle of the plurality of first scheduling cycles, and a duration of a fourth scheduling cycle of the plurality of first scheduling cycles, are different durations.

Aspect 3: The method of Aspect 1 or 2, wherein a starting time of a third scheduling cycle of the plurality of first scheduling cycles is aligned with a starting time of the second scheduling cycle; and wherein an ending time of a fourth scheduling cycle of the plurality of first scheduling cycles is aligned with an ending time of the second scheduling cycle.

Aspect 4: The method of one or more of Aspects 1-3, wherein a sum of respective durations of each of the plurality of first scheduling cycles is equal to a duration of the second scheduling cycle.

Aspect 5: The method of Aspect 4, wherein the duration of the second scheduling cycle corresponds to an integer value sum of a plurality of periods of the multimedia traffic.

Aspect 6: The method of Aspect 5, wherein a quantity of the plurality of first scheduling cycles corresponds to a quantity of the plurality of periods of the multimedia traffic.

Aspect 7: The method of Aspect 6, wherein the respective durations of each of the plurality of first scheduling cycles comprise respective integer value durations; and wherein durations of the plurality of periods of the multimedia traffic comprise non-integer value durations.

Aspect 8: The method of one or more of Aspects 1-7, wherein receiving the indication of the plurality of first scheduling cycles comprises: receiving the indication of the plurality of first scheduling cycles in a plurality of time domain offset information elements.

Aspect 9: The method of one or more of Aspects 1-8, wherein respective starting times of each of the plurality of first scheduling cycles are aligned with a time division duplexing resource configuration for a wireless connection on which the UE communicates with the network entity.

Aspect 10: The method of one or more of Aspects 1-9, wherein a duration of the second scheduling cycle is based at least in part on a time division duplexing resource configuration for a wireless connection on which the UE communicates with the network entity, and wherein the duration of the second scheduling cycle and a sum of respective durations of each of the plurality of first scheduling cycles are approximately equal.

Aspect 11: The method of one or more of Aspects 1-10, wherein the plurality of first scheduling cycles comprise a plurality of semi-persistent scheduling (SPS) cycles for downlink communication with the network entity; and wherein communicating with the network entity based at least in part on the plurality of first scheduling cycles comprises: receiving one or more downlink communications from the network entity based at least in part on the plurality of SPS cycles.

Aspect 12: The method of Aspect 11, wherein receiving the indication of the plurality of first scheduling cycles comprises: receiving, in a radio resource control (RRC) communication, an indication of the plurality of SPS cycles, wherein each of the plurality of SPS cycles schedules a respective physical downlink shared channel (PDSCH) resource.

Aspect 13: The method of Aspect 12, further comprising: receiving a downlink control information (DCI) communication that activates the plurality of SPS cycles indicated in the RRC communication; and wherein receiving the one or more downlink communications from the network entity comprises: receiving the one or more downlink communications in at least one of the respective PDSCH resources based at least in part on the DCI communication. wherein receiving the one or more downlink communications from the network entity comprises: receiving the one or more downlink communications in at least one of the respective PDSCH resources based at least in part on the DCI communication.

Aspect 14: The method of Aspect 12 or 13, further comprising: determining the respective PDSCH resources for which (numberOfSlotsPerFrame×SFN+slot number in a frame)=[(numberOfSlotsPerFrame×SFN$_{start\ time}$+slot$_{start\ time}$+timeDomainOffset(i))+N×periodicity×numberOfSlotsPerFrame/10] modulo (1024×numberOfSlotsPerFrame)), wherein numberOfSlotsPerFrame corresponds to a quantity of slots in a frame, SFN corresponds to a system frame number in which a slot is included, SFN$_{start\ time}$ corresponds to a starting time of the SFN, slot$_{start\ time}$ corresponds to a starting time of the slot, periodicity corresponds to an integer value periodicity selected for the periodic multimedia traffic, N corresponds to an Nth resource allocation, and timeDomainOffset(i) corresponds to an ith SPS scheduling cycle of the plurality of SPS cycles.

Aspect 15: The method of one or more of Aspects 11-14, wherein receiving the indication of the plurality of first scheduling cycles comprises: receiving respective indications of each of the plurality of SPS cycles in respective downlink control information (DCI) communications, wherein each of the plurality of SPS cycles schedules a respective physical downlink shared channel (PDSCH) resource.

Aspect 16: The method of one or more of Aspects 1-15, wherein the plurality of first scheduling cycles comprise a plurality of configured grant (CG) cycles for uplink communication with the network entity; and wherein communicating with the network entity based at least in part on the plurality of first scheduling cycles comprises: transmitting one or more uplink communications to the network entity based at least in part on the plurality of CG cycles.

Aspect 17: The method of Aspect 16, wherein receiving the indication of the plurality of first scheduling cycles comprises: receiving, in a radio resource control (RRC) communication, an indication of the plurality of CG cycles, wherein each of the plurality of CG cycles schedules a respective physical uplink shared channel (PUSCH) resource.

Aspect 18: The method of Aspect 17, wherein transmitting the one or more uplink communications to the network entity comprises: transmitting the one or more uplink communications in at least one of the respective PUSCH resources based at least in part on the RRC communication.

Aspect 19: The method of Aspect 17 or 18, further comprising: receiving a downlink control information (DCI) communication that activates the plurality of CG cycles indicated in the RRC communication; and wherein transmitting the one or more uplink communications to the network entity comprises: transmitting the one or more uplink communications in at least one of the respective PUSCH resources based at least in part on the DCI communication. wherein transmitting the one or more uplink communications to the network entity comprises: transmitting the one or more uplink communications in at least one of the respective PUSCH resources based at least in part on the DCI communication.

Aspect 20: The method of one or more of Aspects 17-19, further comprising: determining the respective PUSCH resources for which [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset(i)×numberOfSymbolsPerSlot+S+N×periodicity) modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number, numberOfSymbolsPerSlot corresponds to a quantity of symbols per slot, timeReferenceSFN corresponds to an SFN time reference value, timeDomainOffset(i) corresponds to an ith CG cycles of the plurality of CG cycles, S corresponds to a starting symbol, N corresponds to an Nth resource allocation, and periodicity corresponds to an integer value periodicity selected for the periodic multimedia traffic.

Aspect 21: The method of one or more of Aspects 17-20, further comprising: determining the respective PUSCH resources for which [(SFN×numberOfSlotsPerFrame×numberOfSymbolsPerSlot)+(slot number in a frame×numberOfSymbolsPerSlot)+symbol number in a slot]= [(SFN$_{start\ time}$×numberOfSlotsPerFrame×numberOfSymbolsPerSlot+slot$_{start\ time}$ numberOfSymbolsPerSlot+symbol$_{start\ time}$+timeDomainOffset(i)×numberOfSymbolsPerSlot)+N×periodicity] modulo (1024× numberOfSlotsPerFrame×numberOfSymbolsPerSlot), wherein numberOfSlotsPerFrame corresponds to a quantity of slots per frame for the UE and the network entity, the SFN correspond to a system frame number, numberOfSymbolsPerSlot corresponds to a quantity of symbols per slot, timeDomainOffset(i) corresponds to an ith CG cycles of the plurality of CG cycles, SFN$_{start\ time}$ corresponds to a starting time of the SFN, slot$_{start\ time}$ corresponds to a starting time of the slot, N corresponds to an Nth resource allocation, and periodicity corresponds to an integer value periodicity selected for the periodic multimedia traffic.

Aspect 22: The method of one or more of Aspects 16-21, wherein receiving the indication of the plurality of first scheduling cycles comprises: receiving respective indications of each of the plurality of CG cycles in respective downlink control information (DCI) communications, wherein each of the plurality of CG cycles schedules a respective physical uplink shared channel (PUSCH) resource.

Aspect 23: A method of wireless communication performed by a network entity, comprising: transmitting, to a user equipment (UE), an indication of a plurality of first scheduling cycles that are based at least in part on a second scheduling cycle, wherein the second scheduling cycle is based at least in part on a periodicity of multimedia traffic associated with the UE; and communicating with the UE based at least in part on the plurality of first scheduling cycles.

Aspect 24: The method of Aspect 23, wherein a duration of a third scheduling cycle of the plurality of first scheduling cycles, and a duration of a fourth scheduling cycle of the plurality of first scheduling cycles, are different durations.

Aspect 25: The method of Aspect 23 or 24, wherein a starting time of a third scheduling cycle of the plurality of first scheduling cycles is aligned with a starting time of the second scheduling cycle; and wherein an ending time of a fourth scheduling cycle of the plurality of first scheduling cycles is aligned with an ending time of the second scheduling cycle.

Aspect 26: The method of one or more of Aspects 22-25, wherein a sum of respective durations of each of the plurality of first scheduling cycles is equal to a duration of the second scheduling cycle.

Aspect 27: The method of Aspect 26, wherein the duration of the second scheduling cycle corresponds to an integer value sum of a plurality of periods of the multimedia traffic.

Aspect 28: The method of Aspect 26 or 27, wherein a quantity of the plurality of first scheduling cycles corresponds to a quantity of a plurality of periods of the multimedia traffic.

Aspect 29: The method of Aspect 28, wherein the respective durations of each of the plurality of second scheduling cycles comprise respective integer value durations; and wherein durations of the plurality of periods of the multimedia traffic comprise non-integer value durations.

Aspect 30: The method of one or more of Aspects 23-29, wherein transmitting the indication of the plurality of first scheduling cycles comprises: transmitting the indication of the plurality of first scheduling cycles in a plurality of time domain offset information elements.

Aspect 31: The method of one or more of Aspects 23-30, wherein respective starting times of each of the plurality of first scheduling cycles are aligned with a time division duplexing resource configuration for a wireless connection on which the UE communicates with the network entity.

Aspect 32: The method of one or more of Aspects 23-31, wherein a duration of the second scheduling cycle is based at least in part on a time division duplexing resource configuration for a wireless connection on which the network entity communicates with the UE, and wherein the duration of the second scheduling cycle and a sum of respective durations of each of the plurality of first scheduling cycles are approximately equal.

Aspect 33: The method of one or more of Aspects 23-32, wherein the plurality of first scheduling cycles comprise a plurality of semi-persistent scheduling (SPS) cycles for downlink communication with the network entity; and wherein the method further comprises: transmitting one or more downlink communications to the UE based at least in part on the plurality of SPS cycles.

Aspect 34: The method of one or more of Aspects 23-33, wherein transmitting the indication of the plurality of first scheduling cycles comprises: transmitting, in a radio resource control (RRC) communication, an indication of the plurality of SPS cycles, wherein each of the plurality of SPS cycles schedules a respective physical downlink shared channel (PDSCH) resource.

Aspect 35: The method of Aspect 34, further comprising: transmitting a downlink control information (DCI) communication that activates the plurality of SPS cycles indicated in the RRC communication.

Aspect 36: The method of Aspect 34 or 35, further comprising: determining the respective PDSCH resources for which (numberOfSlotsPerFrame×SFN+slot number in a frame)=[(numberOfSlotsPerFrame×SFN$_{start\ time}$+ slot$_{start\ time}$+timeDomainOffset(i))+N×periodicity×numberOfSlotsPerFrame/10] modulo (1024×numberOfSlotsPerFrame)), wherein numberOfSlotsPerFrame corresponds to a quantity of slots in a frame, SFN corresponds to a system frame number in which a slot is included, SFN$_{start\ time}$ corresponds to a starting time of the SFN, slot$_{start\ time}$ corresponds to a starting time of the slot, periodicity corresponds to an integer value periodicity selected for the periodic multimedia traffic, N corresponds to an Nth resource allocation, and timeDomainOffset(i) corresponds to an ith SPS scheduling cycle of the plurality of SPS cycles.

Aspect 37: The method of one or more of Aspects 33-36, wherein transmitting the indication of the plurality of first scheduling cycles comprises: transmitting respective indications of each of the plurality of SPS cycles in respective downlink control information (DCI) communications, wherein each of the plurality of SPS cycles schedules a respective physical downlink shared channel (PDSCH) resource.

Aspect 38: The method of one or more of Aspects 23-37, wherein the plurality of first scheduling cycles comprise a plurality of configured grant (CG) cycles for uplink communication with the network entity; and wherein the method further comprises: receiving one or more uplink communications from the UE based at least in part on the plurality of CG cycles.

Aspect 39: The method of Aspect 38, wherein transmitting the indication of the plurality of first scheduling cycles comprises: transmitting, in a radio resource control (RRC) communication, an indication of the plurality of CG cycles, wherein each of the plurality of CG cycles schedules a respective physical uplink shared channel (PUSCH) resource.

Aspect 40: The method of Aspect 39, wherein receiving the one or more uplink communications comprises: receiving the one or more uplink communications in at least one of the respective PUSCH resources based at least in part on the RRC communication.

Aspect 41: The method of Aspect 39 or 40, further comprising: transmitting a downlink control information (DCI) communication that activates the plurality of CG cycles indicated in the RRC communication; and wherein receiving the one or more uplink communications comprises: receiving the one or more uplink communications in at least one of the respective PUSCH resources based at least in part on the DCI communication. wherein receiving the one or more uplink communications comprises: receiving the one or more uplink communications in at least one of the respective PUSCH resources based at least in part on the DCI communication.

Aspect 42: The method of one or more of Aspects 39-41, further comprising: determining the respective PUSCH resources for which [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset(i)×numberOfSymbolsPerSlot+S+N×periodicity) modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number, numberOfSymbolsPerSlot corresponds to a quantity of symbols per slot, timeReferenceSFN corresponds to an SFN time reference value, timeDomainOffset(i) corresponds to an ith CG cycles of the plurality of CG cycles, S corresponds to a starting symbol, N corresponds to an Nth resource allocation, and periodicity corresponds to an integer value periodicity selected for the periodic multimedia traffic.

Aspect 43: The method of one or more of Aspects 39-42, further comprising: determining the respective PUSCH resources for which [(SFN×numberOfSlotsPerFrame×numberOfSymbolsPerSlot)+(slot number in a frame×numberOfSymbolsPerSlot)+symbol number in a slot]= [(SFN$_{start\ time}$×numberOfSlotsPerFrame×numberOfSymbolsPerSlot+slot$_{start\ time}$ numberOfSymbolsPerSlot+symbol$_{start\ time}$+timeDomainOffset(i)×numberOfSymbolsPerSlot)+N×periodicity] modulo (1024×numberOfSlotsPerFrame×number-OfSymbolsPerSlot), wherein numberOfSlotsPerFrame corresponds to a quantity of slots per frame for the UE and the network entity, the SFN correspond to a system frame number, numberOfSymbolsPerSlot corresponds to a quantity of symbols per slot, timeDomainOffset(i) corresponds to an ith CG cycles of the plurality of CG cycles, SFN$_{start\ time}$ corresponds to a starting time of the SFN, slot$_{start\ time}$ corresponds to a starting time of the slot, N corresponds to an Nth resource allocation, and periodicity corresponds to an integer value periodicity selected for the periodic multimedia traffic.

Aspect 44: The method of one or more of Aspects 38-43, wherein transmitting the indication of the plurality of first scheduling cycles comprises: transmitting respective indications of each of the plurality of CG cycles in respective downlink control information (DCI) communications, wherein each of the plurality of CG cycles schedules a respective physical uplink shared channel (PUSCH) resource.

Aspect 45: A method of wireless communication performed by a user equipment (UE), comprising: obtaining a scheduling cadence value that corresponds to a periodicity of multimedia traffic associated with the UE; and communicating with a network entity based at least in part on the scheduling cadence value.

Aspect 46: The method of Aspect 45, wherein obtaining the scheduling cadence value comprises: receiving an indication of the scheduling cadence value from the network entity.

Aspect 47: The method of Aspect 45 or 46, wherein the scheduling cadence value comprises: a configured grant cadence value, or a semi-persistent scheduling cadence value.

Aspect 48: The method of one or more of Aspects 45-47, wherein communicating with the network entity comprises: communicating with the network entity in a subframe based at least in part on determining that a first ceiling value of (a subframe identifier n associated with the subframe*the scheduling cadence value/1000)+1 is equal to a second ceiling value of (n+1)*(the scheduling cadence value/1000).

Aspect 49: The method of Aspect 48, wherein the subframe identifier n is equal to (10*a system frame number of a frame comprising the subframe)+a subframe number of the subframe within the frame.

Aspect 50: The method of Aspect 48 or 49, wherein communicating with the network entity in the subframe comprises: communicating with the network entity in a slot, in the subframe, after a time domain offset from a starting time of the subframe.

Aspect 51: The method of Aspect 50, wherein communicating with the network entity in the slot comprises: communicating with the network entity in a symbol in the slot.

Aspect 52: The method of one or more of Aspects 45-51, wherein communicating with the network entity comprises: communicating with the network entity in a symbol for which a value of (numberOfSlotsPerFrame×SFN+slot number in the frame)=[(numberOfSlotsPerFrame×SFN$_{start\ time}$+slot$_{start\ time}$)+Ceil (N×(numberOfSlotsPerFrame*100/cadence)] modulo (1024×numberOfSlotsPerFrame)), wherein numberOfSlotsPerFrame corresponds to a quantity of slots per frame for the UE and the network entity, SFN corresponds to a system frame number, N corresponds to an Nth resource allocation, and cadence corresponds to the scheduling cadence value.

Aspect 53: The method of one or more of Aspects 45-52, wherein communicating with the network entity comprises: communicating with the network entity in a symbol for which a value of (numberOfSlotsPerFrame×SFN+slot number in the frame)=[(numberOfSlotsPerFrame×SFN$_{start\ time}$+slot$_{start\ time}$)+Floor (N×(numberOfSlotsPerFrame*100/cadence)] modulo (1024×numberOfSlotsPerFrame)), wherein numberOfSlotsPerFrame corresponds to a quantity of slots per frame for the UE and the network entity, SFN corresponds to a system frame number, N corresponds to an Nth resource allocation, and cadence corresponds to the scheduling cadence value.

Aspect 54: The method of one or more of Aspects 45-53, wherein communicating with the network entity comprises: communicating with the network entity in a symbol for which a value of [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+Ceil(N×(numberOfSlotsPerFrame×numberOfSymbolsPerSlot/10/cadence))) modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and cadence corresponds to the scheduling cadence value.

Aspect 55: The method of one or more of Aspects 45-54, wherein communicating with the network entity comprises: communicating with the network entity in a symbol for which a value of [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+Floor(N×(numberOfSlotsPerFrame×numberOfSymbolsPerSlot/10/cadence))) modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and cadence corresponds to the scheduling cadence value.

Aspect 56: The method of one or more of Aspects 45-55, wherein communicating with the network entity comprises: communicating with the network entity in a symbol for which a value of [(SFN×numberOfSlotsPerFrame×numberOfSymbolsPerSlot)+(slot number in the frame×numberOfSymbolsPerSlot)+symbol number in the slot]= [(SFN$_{start\ time}$×numberOfSlotsPerFrame×numberOfSymbolsPerSlot+slot$_{start\ time}$×numberOfSymbolsPerSlot+symbol$_{start\ time}$)+Ceil(N×(numberOfSlotsPerFrame×numberOfSymbolsPerSlot/10/cadence)))] modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, cadence corresponds to the scheduling cadence value, SFN$_{start\ time}$ corresponds to an SFN start time, slot$_{start\ time}$ corresponds to a slot start time, and symbol$_{start\ time}$ corresponds to a symbol start time.

Aspect 57: The method of one or more of Aspects 45-56, wherein communicating with the network entity comprises: communicating with the network entity in a symbol for which a value of [(SFN×numberOfSlotsPerFrame×numberOfSymbolsPerSlot)+(slot number in the frame×numberOfSymbolsPerSlot)+symbol number in the slot]= [(SFN$_{start\ time}$×numberOfSlotsPerFrame×numberOfSymbolsPerSlot+slot$_{start\ time}$×numberOfSymbolsPerSlot+symbol$_{start\ time}$)+Floor(N×(numberOfSlotsPerFrame×numberOfSymbolsPerSlot/10/cadence)))] modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, cadence corresponds to the scheduling cadence value, SFN$_{start\ time}$ corresponds to an SFN start time, slot$_{start\ time}$ corresponds to a slot start time, and symbol$_{start\ time}$ corresponds to a symbol start time.

Aspect 58: The method of one or more of Aspects 45-57, further comprising: determining a slot within a subframe based at least in part on a time division duplexing configuration pattern; and wherein communicating with the network entity in the subframe comprises: communicating with the network entity in the slot. wherein communicating with the network entity in the subframe comprises: communicating with the network entity in the slot.

Aspect 59: The method of one or more of Aspects 45-58, further comprising: receiving an indication of an available slot within a subframe for the multimedia traffic, wherein the available slot is based at least in part on a time division duplexing configuration pattern; and wherein communicating with the network entity in the subframe comprises: communicating with the network entity in the slot. wherein communicating with the network entity in the subframe comprises: communicating with the network entity in the slot.

Aspect 60: A method of wireless communication performed by a network entity, comprising: obtaining a scheduling cadence value that corresponds to a periodicity of multimedia traffic associated with a user equipment (UE); and communicating with the UE in a subframe based at least in part on the scheduling cadence value.

Aspect 61: The method of Aspect 60, further comprising: transmitting an indication of the scheduling cadence value to the UE.

Aspect 62: The method of Aspect 60 or 61, wherein the scheduling cadence value comprises: a configured grant cadence value, or a semi-persistent scheduling cadence value.

Aspect 63: The method of one or more of Aspects 60-62, wherein communicating with the UE comprises: communicating with the UE in a subframe based at least in part on determining that a first ceiling value of (a subframe identifier n associated with the subframe*the scheduling cadence value/1000)+1 is equal to a second ceiling value of (n+1)* (the scheduling cadence value/1000).

Aspect 64: The method of Aspect 62, wherein the subframe identifier n is equal to (10*a system frame number of a frame comprising the subframe)+a subframe number of the subframe within the frame.

Aspect 65: The method of Aspect 64, wherein communicating with the UE in the subframe comprises: communicating with the UE in a slot, in the subframe, after a time domain offset from a starting time of the subframe.

Aspect 66: The method of Aspect 65, wherein communicating with the UE in the slot comprises: communicating with the UE in a symbol in the slot.

Aspect 67: The method of one or more of Aspects 60-66, wherein communicating with the UE comprises: communicating with the UE in a symbol for which a value of (numberOfSlotsPerFrame×SFN+slot number in the frame)= [(numberOfSlotsPerFrame×SFN$_{start\ time}$+slot$_{start\ time}$)+Ceil (N (numberOfSlotsPerFrame*100/cadence)] modulo (1024×numberOfSlotsPerFrame)), wherein numberOfSlotsPerFrame corresponds to a quantity of slots per frame for the UE and the network entity, SFN corresponds to a system frame number, N corresponds to an Nth resource allocation, and cadence corresponds to the scheduling cadence value.

Aspect 68: The method of one or more of Aspects 60-67, wherein communicating with the UE comprises: communicating with the UE in a symbol for which a value of (numberOfSlotsPerFrame×SFN+slot number in the frame)= [(numberOfSlotsPerFrame×SFN$_{start\ time}$+slot$_{start\ time}$)+Floor (N×(numberOfSlotsPerFrame*100/cadence)] modulo (1024×numberOfSlotsPerFrame)), wherein numberOfSlotsPerFrame corresponds to a quantity of slots per frame for the UE and the network entity, SFN corresponds to a system frame number, N corresponds to an Nth resource allocation, and cadence corresponds to the scheduling cadence value.

Aspect 69: The method of one or more of Aspects 60-68, wherein communicating with the UE comprises: communicating with the UE in a symbol for which a value of [(SFN×numberOfSlotsPerFrame×numberOfSymbolsPerSlot)+(slot number in the frame×numberOfSymbolsPerSlot)+symbol number in the slot]=(timeReferenceSFN× numberOfSlotsPerFrame×numberOfSymbolsPerSlot+ timeDomainOffset×numberOfSymbolsPerSlot+S+Ceil(N× (numberOfSlotsPerFrame×numberOfSymbolsPerSlot/10/ cadence))) modulo (1024×numberOfSlotsPerFrame× numberOfSymbolsPerSlot), wherein numberOfSlotsPer Frame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and cadence corresponds to the scheduling cadence value.

Aspect 70: The method of one or more of Aspects 60-69, wherein communicating with the UE comprises: communicating with the UE in a symbol for which a value of [(SFN×numberOfSlotsPerFrame×numberOfSymbolsPerSlot)+(slot number in the frame×numberOfSymbolsPerSlot)+symbol number in the slot]=(timeReferenceSFN× numberOfSlotsPerFrame×numberOfSymbolsPerSlot+ timeDomainOffset×numberOfSymbolsPerSlot+S+Floor (N×(numberOfSlotsPerFrame×numberOfSymbolsPerSlot/ 10/cadence))) modulo (1024×numberOfSlotsPerFrame× numberOfSymbolsPerSlot), wherein numberOf SlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and cadence corresponds to the scheduling cadence value.

Aspect 71: The method of one or more of Aspects 60-70, wherein communicating with the UE comprises: communicating with the UE in a symbol for which a value of [(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame×numberOfSymbolsPerSlot+ slot$_{start\ time}$×numberOfSymbolsPerSlot+symbol$_{start\ time}$)+ Ceil(N×(numberOfSlotsPerFrame×numberOfSymbolsPerSlot/10/cadence)))] modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, cadence corresponds to the scheduling cadence value, SFN$_{start\ time}$ corresponds to an SFN start time, slot$_{start\ time}$ corresponds to a slot start time, and symbol$_{start\ time}$ corresponds to a symbol start time.

Aspect 72: The method of one or more of Aspects 60-71, wherein communicating with the UE comprises: communicating with the UE in a symbol for which a value of [(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame×numberOfSymbolsPerSlot+ slot$_{start\ time}$ numberOfSymbolsPerSlot+symbol$_{start\ time}$)+ Floor(N×(numberOfSlotsPerFrame×numberOfSymbolsPerSlot/10/cadence)))] modulo (1024×numberOfSlotsPerFrame×numberOfSymbolsPerSlot), wherein numberOfSlotsPerFrame corresponds to a quantity of slots per frame for the UE and the network entity, the SFN correspond to a system frame number of a frame comprising the symbol, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, cadence corresponds to the scheduling cadence value, SFN$_{start\ time}$ corresponds to an SFN start time, slot$_{start\ time}$ corresponds to a slot start time, and symbol$_{start\ time}$ corresponds to a symbol start time.

Aspect 83: The method of one or more of Aspects 60-82, further comprising: determining a slot within a subframe based at least in part on a time division duplexing configuration pattern; and wherein communicating with the UE in the subframe comprises: communicating with the UE in the slot. wherein communicating with the UE in the subframe comprises: communicating with the UE in the slot.

Aspect 74: The method of one or more of Aspects 60-73, further comprising: transmitting, to the UE, an indication of an available slot within a subframe for the multimedia traffic, wherein the available slot is based at least in part on a time division duplexing configuration pattern; and wherein communicating with the UE in the subframe comprises:

communicating with the UE in the slot. wherein communicating with the UE in the subframe comprises: communicating with the UE in the slot.

Aspect 75: A method of wireless communication performed by a user equipment (UE), comprising: determining a time domain resource based at least in part on a periodicity of multimedia traffic associated with the UE, wherein the periodicity comprises a non-integer value; and communicating with a network entity in the time domain resource.

Aspect 76: The method of Aspect 75, wherein determining the time domain resource comprises: determining the time domain resource for which a value of (numberOfSlotsPerFrame×SFN+slot number in the frame)=[(numberOfSlotsPerFrame×$SFN_{start\ time}$+$slot_{start\ time}$)+Ceil(N×periodicity×numberOfSlotsPerFrame/10)] modulo (1024×numberOfSlotsPerFrame)), wherein numberOfSlotsPerFrame corresponds to a quantity of slots per frame for the UE and the network entity, SFN corresponds to a system frame number, $SFN_{start\ time}$ corresponds to an SFN start time, $slot_{start\ time}$ corresponds to a slot start time, N corresponds to an Nth resource allocation, and periodicity corresponds to the periodicity of the multimedia.

Aspect 77: The method of Aspect 75 or 76, wherein determining the time domain resource comprises: determining the time domain resource for which a value of (numberOfSlotsPerFrame×SFN+slot number in the frame)= [(numberOfSlotsPerFrame×$SFN_{start\ time}$+$slot_{start\ time}$)+Floor (N×periodicity×numberOfSlotsPerFrame/10)] modulo (1024×numberOfSlotsPerFrame)), wherein numberOfSlotsPerFrame corresponds to a quantity of slots per frame for the UE and the network entity, SFN corresponds to a system frame number, $SFN_{start\ time}$ corresponds to an SFN start time, $slot_{start\ time}$ corresponds to a slot start time, N corresponds to an Nth resource allocation, and periodicity corresponds to the periodicity of the multimedia.

Aspect 78: The method of one or more of Aspects 75-77, wherein determining the time domain resource comprises: determining the time domain resource for which a value of [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+Ceil(N×periodicity)) modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and periodicity corresponds to the periodicity for the multimedia traffic.

Aspect 78: The method of one or more of Aspects 75-78, wherein determining the time domain resource comprises: determining the time domain resource for which a value of [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+Floor (N×periodicity)) modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and periodicity corresponds to the periodicity for the multimedia traffic.

Aspect 80: The method of one or more of Aspects 75-79, wherein determining the time domain resource comprises: determining the time domain resource for which a value of [(SFN×numberOfSlotsPerFrame×numberOfSymbolsPerSlot)+(slot number in the frame×numberOfSymbolsPerSlot)+symbol number in the slot]=[(SFN$_{start\ time}$ numberOfSlotsPerFrame×numberOfSymbolsPerSlot+$slot_{start\ time}$ numberOfSymbolsPerSlot+$symbol_{start\ time}$)+Ceil(N×periodicity)] modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, SFN$_{start\ time}$ corresponds to an SFN start time, $slot_{start\ time}$ corresponds to a slot start time, $symbol_{start\ time}$ corresponds to a symbol start time, N corresponds to an Nth resource allocation, and periodicity corresponds to the periodicity of the multimedia traffic.

Aspect 81: The method of one or more of Aspects 75-80, wherein determining the time domain resource comprises: determining the time domain resource for which a value of [(SFN×numberOfSlotsPerFrame×numberOfSymbolsPerSlot)+(slot number in the frame×numberOfSymbolsPerSlot)+symbol number in the slot]=[(SFN$_{start\ time}$ numberOfSlotsPerFrame×numberOfSymbolsPerSlot+$slot_{start\ time}$ numberOfSymbolsPerSlot+$symbol_{start\ time}$)+Floor(N×periodicity)] modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, SFN$_{start\ time}$ corresponds to an SFN start time, $slot_{start\ time}$ corresponds to a slot start time, $symbol_{start\ time}$ corresponds to a symbol start time, N corresponds to an Nth resource allocation, and periodicity corresponds to the periodicity of the multimedia traffic.

Aspect 82: The method of one or more of Aspects 75-71, wherein determining the time domain resource comprises: determining a slot based at least in part on a time division duplexing configuration pattern; and wherein communicating with the network entity in the time domain resource comprises: communicating with the network entity in the slot.

Aspect 83: The method of one or more of Aspects 75-82, further comprising: receiving an indication of an available slot within a subframe for the multimedia traffic, wherein the available slot is based at least in part on a time division duplexing configuration pattern; and wherein communicating with the network entity in the time domain resource comprises: communicating with the network entity in the slot. wherein communicating with the network entity in the time domain resource comprises: communicating with the network entity in the slot.

Aspect 84: A method of wireless communication performed by a network entity, comprising: determining a time domain resource based at least in part on a periodicity of multimedia traffic associated with a user equipment (UE), wherein the periodicity comprises a non-integer value; and communicating with the UE in the time domain resource.

Aspect 85: The method of Aspect 84, wherein determining the time domain resource comprises: determining the time domain resource for which a value of (numberOfSlotsPerFrame×SFN+slot number in the frame)=[(numberOfSlotsPerFrame×SFN$_{start\ time}$+slot$_{start\ time}$)+Ceil(N×periodicity×numberOfSlotsPerFrame/10)] modulo (1024×numberOfSlotsPerFrame)), wherein numberOfSlotsPerFrame corresponds to a quantity of slots per frame for the UE and the network entity, SFN corresponds to a system frame number, SFN$_{start\ time}$ corresponds to an SFN start time, slot$_{start\ time}$ corresponds to a slot start time, N corresponds to an Nth resource allocation, and periodicity corresponds to the periodicity of the multimedia.

Aspect 86: The method of Aspect 84 or 85, wherein determining the time domain resource comprises: determining the time domain resource for which a value of (numberOfSlotsPerFrame×SFN+slot number in the frame)= [(numberOfSlotsPerFrame×SFN$_{start\ time}$+slot$_{start\ time}$)+Floor (N×periodicity×numberOfSlotsPerFrame/10)] modulo (1024×numberOfSlotsPerFrame)), wherein numberOfSlotsPerFrame corresponds to a quantity of slots per frame for the UE and the network entity, SFN corresponds to a system frame number, SFN$_{start\ time}$ corresponds to an SFN start time, slot$_{start\ time}$ corresponds to a slot start time, N corresponds to an Nth resource allocation, and periodicity corresponds to the periodicity of the multimedia.

Aspect 87: The method of one or more of Aspects 84-86, wherein determining the time domain resource comprises: determining the time domain resource for which a value of [(SFN×numberOfSlotsPerFrame×numberOfSymbolsPerSlot)+(slot number in the frame×numberOfSymbolsPerSlot)+symbol number in the slot]=(timeReferenceSFN× numberOfSlotsPerFrame×numberOfSymbolsPerSlot+ timeDomainOffset×numberOfSymbolsPerSlot+S+Ceil(N× periodicity)) modulo (1024×numberOfSlotsPerFrame× numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and periodicity corresponds to the periodicity for the multimedia traffic.

Aspect 88: The method of one or more of Aspects 84-87, wherein determining the time domain resource comprises: determining the time domain resource for which a value of [(SFN×numberOfSlotsPerFrame×numberOfSymbolsPerSlot)+(slot number in the frame×numberOfSymbolsPerSlot)+symbol number in the slot]=(timeReferenceSFN× numberOfSlotsPerFrame×numberOfSymbolsPerSlot+ timeDomainOffset×numberOfSymbolsPerSlot+S+Floor (N×periodicity)) modulo (1024×numberOfSlotsPerFrame× numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, timeReferenceSFN corresponds to an SFN time reference value, timeDomainOffset corresponds to a time domain offset value, S corresponds to a starting symbol, N corresponds to an Nth resource allocation, and periodicity corresponds to the periodicity for the multimedia traffic.

Aspect 89: The method of one or more of Aspects 84-88, wherein determining the time domain resource comprises: determining the time domain resource for which a value of [(SFN×numberOfSlotsPerFrame×numberOfSymbolsPerSlot)+(slot number in the frame×numberOfSymbolsPerSlot)+symbol number in the slot]=[(SFN$_{start\ time}$ numberOfSlotsPerFrame×numberOfSymbolsPerSlot+ slot$_{start\ time}$ numberOfSymbolsPerSlot+symbol$_{start\ time}$)+ Ceil(N×periodicity)] modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, SFN$_{start\ time}$ corresponds to an SFN start time, slot$_{start\ time}$ corresponds to a slot start time, symbol$_{start\ time}$ corresponds to a symbol start time, N corresponds to an Nth resource allocation, and periodicity corresponds to the periodicity of the multimedia traffic.

Aspect 90: The method of one or more of Aspects 84-89, wherein determining the time domain resource comprises: determining the time domain resource for which a value of [(SFN×numberOfSlotsPerFrame×numberOfSymbolsPerSlot)+(slot number in the frame×numberOfSymbolsPerSlot)+symbol number in the slot]=[(SFN$_{start\ time}$ numberOfSlotsPerFrame×numberOfSymbolsPerSlot+ slot$_{start\ time}$ numberOfSymbolsPerSlot+symbol$_{start\ time}$)+ Floor(N×periodicity)] modulo (1024×numberOfSlotsPerFrame×numberOfSymbolsPerSlot), wherein numberOfSlotsPerFrame corresponds to a quantity of slots per frame for the UE and the network entity, SFN corresponds to a system frame number, numberOfSymbolsPerSlot corresponds to a quantity of symbols per slot, SFN$_{start\ time}$ corresponds to an SFN start time, slot$_{start\ time}$ corresponds to a slot start time, symbol$_{start\ time}$ corresponds to a symbol start time, N corresponds to an Nth resource allocation, and periodicity corresponds to the periodicity of the multimedia traffic.

Aspect 91: The method of one or more of Aspects 84-90, wherein determining the time domain resource comprises: determining a slot based at least in part on a time division duplexing configuration pattern; and wherein communicating with the UE in the time domain resource comprises: communicating with the UE in the slot.

Aspect 92: The method of one or more of Aspects 84-91, further comprising: transmitting, to the UE, an indication of an available slot within a subframe for the multimedia traffic, wherein the available slot is based at least in part on a time division duplexing configuration pattern; and wherein communicating with the UE in the time domain resource comprises: communicating with the UE in the slot. wherein communicating with the UE in the time domain resource comprises: communicating with the UE in the slot.

Aspect 93: An apparatus for wireless communication at a device, comprising a processor; memory coupled with the processor; and instructions stored in the memory and executable by the processor to cause the apparatus to perform the method of one or more of Aspects 1-22.

Aspect 94: A device for wireless communication, comprising a memory and one or more processors coupled to the memory, the one or more processors configured to perform the method of one or more of Aspects 1-22.

Aspect 95: An apparatus for wireless communication, comprising at least one means for performing the method of one or more of Aspects 1-22.

Aspect 96: A non-transitory computer-readable medium storing code for wireless communication, the code comprising instructions executable by a processor to perform the method of one or more of Aspects 1-22.

Aspect 97: A non-transitory computer-readable medium storing a set of instructions for wireless communication, the set of instructions comprising one or more instructions that, when executed by one or more processors of a device, cause the device to perform the method of one or more of Aspects 1-22.

Aspect 98: An apparatus for wireless communication at a device, comprising a processor; memory coupled with the processor; and instructions stored in the memory and executable by the processor to cause the apparatus to perform the method of one or more of Aspects 23-44.

Aspect 99: A device for wireless communication, comprising a memory and one or more processors coupled to the memory, the one or more processors configured to perform the method of one or more of Aspects 23-44.

Aspect 100: An apparatus for wireless communication, comprising at least one means for performing the method of one or more of Aspects 23-44.

Aspect 101: A non-transitory computer-readable medium storing code for wireless communication, the code comprising instructions executable by a processor to perform the method of one or more of Aspects 23-44.

Aspect 102: A non-transitory computer-readable medium storing a set of instructions for wireless communication, the set of instructions comprising one or more instructions that, when executed by one or more processors of a device, cause the device to perform the method of one or more of Aspects 23-44.

Aspect 103: An apparatus for wireless communication at a device, comprising a processor; memory coupled with the processor; and instructions stored in the memory and executable by the processor to cause the apparatus to perform the method of one or more of Aspects 45-59.

Aspect 104: A device for wireless communication, comprising a memory and one or more processors coupled to the memory, the one or more processors configured to perform the method of one or more of Aspects 45-59.

Aspect 105: An apparatus for wireless communication, comprising at least one means for performing the method of one or more of Aspects 45-59.

Aspect 106: A non-transitory computer-readable medium storing code for wireless communication, the code comprising instructions executable by a processor to perform the method of one or more of Aspects 45-59.

Aspect 107: A non-transitory computer-readable medium storing a set of instructions for wireless communication, the set of instructions comprising one or more instructions that, when executed by one or more processors of a device, cause the device to perform the method of one or more of Aspects 45-59.

Aspect 108: An apparatus for wireless communication at a device, comprising a processor; memory coupled with the processor; and instructions stored in the memory and executable by the processor to cause the apparatus to perform the method of one or more of Aspects 60-74.

Aspect 109: A device for wireless communication, comprising a memory and one or more processors coupled to the memory, the one or more processors configured to perform the method of one or more of Aspects 60-74.

Aspect 110: An apparatus for wireless communication, comprising at least one means for performing the method of one or more of Aspects 60-74.

Aspect 111: A non-transitory computer-readable medium storing code for wireless communication, the code comprising instructions executable by a processor to perform the method of one or more of Aspects 60-74.

Aspect 112: A non-transitory computer-readable medium storing a set of instructions for wireless communication, the set of instructions comprising one or more instructions that, when executed by one or more processors of a device, cause the device to perform the method of one or more of Aspects 60-74.

Aspect 113: An apparatus for wireless communication at a device, comprising a processor; memory coupled with the processor; and instructions stored in the memory and executable by the processor to cause the apparatus to perform the method of one or more of Aspects 75-83.

Aspect 114: A device for wireless communication, comprising a memory and one or more processors coupled to the memory, the one or more processors configured to perform the method of one or more of Aspects 75-83.

Aspect 115: An apparatus for wireless communication, comprising at least one means for performing the method of one or more of Aspects 75-83.

Aspect 116: A non-transitory computer-readable medium storing code for wireless communication, the code comprising instructions executable by a processor to perform the method of one or more of Aspects 75-83.

Aspect 117: A non-transitory computer-readable medium storing a set of instructions for wireless communication, the set of instructions comprising one or more instructions that, when executed by one or more processors of a device, cause the device to perform the method of one or more of Aspects 75-83.

Aspect 118: An apparatus for wireless communication at a device, comprising a processor; memory coupled with the processor; and instructions stored in the memory and executable by the processor to cause the apparatus to perform the method of one or more of Aspects 84-92.

Aspect 119: A device for wireless communication, comprising a memory and one or more processors coupled to the memory, the one or more processors configured to perform the method of one or more of Aspects 84-92.

Aspect 120: An apparatus for wireless communication, comprising at least one means for performing the method of one or more of Aspects 84-92.

Aspect 121: A non-transitory computer-readable medium storing code for wireless communication, the code comprising instructions executable by a processor to perform the method of one or more of Aspects 84-92.

Aspect 122: A non-transitory computer-readable medium storing a set of instructions for wireless communication, the set of instructions comprising one or more instructions that, when executed by one or more processors of a device, cause the device to perform the method of one or more of Aspects 84-92.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive an indication of a plurality of first scheduling cycles that are based at least in part on a second scheduling cycle,
         wherein a sum of respective durations of each of the plurality of first scheduling cycles is equal to a duration of the second scheduling cycle, and
         wherein the second scheduling cycle is based at least in part on a periodicity of multimedia traffic associated with the UE; and
      communicate with a network entity based at least in part on the plurality of first scheduling cycles.

2. The UE of claim 1, wherein a duration of a third scheduling cycle of the plurality of first scheduling cycles, and a duration of a fourth scheduling cycle of the plurality of first scheduling cycles, are different durations.

3. The UE of claim 1, wherein a starting time of a third scheduling cycle of the plurality of first scheduling cycles is aligned with a starting time of the second scheduling cycle; and
   wherein an ending time of a fourth scheduling cycle of the plurality of first scheduling cycles is aligned with an ending time of the second scheduling cycle.

4. The UE of claim 1, wherein the duration of the second scheduling cycle corresponds to an integer value sum of a plurality of periods of the multimedia traffic.

5. The UE of claim 4, wherein a quantity of the plurality of first scheduling cycles corresponds to a quantity of the plurality of periods of the multimedia traffic.

6. The UE of claim 5, wherein the respective durations of each of the plurality of first scheduling cycles comprise respective integer value durations; and
   wherein durations of the plurality of periods of the multimedia traffic comprise non-integer value durations.

7. The UE of claim 1, wherein the one or more processors, to receive the indication of the plurality of first scheduling cycles, are configured to:
   receive the indication of the plurality of first scheduling cycles in a plurality of time domain offset information elements.

8. The UE of claim 1, wherein respective starting times of each of the plurality of first scheduling cycles are aligned with a time division duplexing resource configuration for a wireless connection on which the UE communicates with the network entity.

9. The UE of claim 1, wherein the duration of the second scheduling cycle is based at least in part on a time division duplexing resource configuration for a wireless connection on which the UE communicates with the network entity.

10. The UE of claim 1, wherein the plurality of first scheduling cycles comprise a plurality of semi-persistent scheduling (SPS) cycles for downlink communication with the network entity; and
   wherein the one or more processors, to communicate with the network entity based at least in part on the plurality of first scheduling cycles, are configured to:
      receive one or more downlink communications from the network entity based at least in part on the plurality of SPS cycles.

11. The UE of claim 1, wherein the plurality of first scheduling cycles comprise a plurality of configured grant (CG) cycles for uplink communication with the network entity; and
   wherein the one or more processors, to communicate with the network entity based at least in part on the plurality of first scheduling cycles, are configured to:
      transmit one or more uplink communications to the network entity based at least in part on the plurality of CG cycles.

12. The UE of claim 11, wherein the one or more processors, to receive the indication of the plurality of first scheduling cycles, are configured to:
   receive respective indications of each of the plurality of CG cycles in respective downlink control information (DCI) communications,
      wherein each of the plurality of CG cycles schedules a respective physical uplink shared channel (PUSCH) resource.

13. The UE of claim 1, wherein the respective durations of each of the plurality of first scheduling cycles comprise respective integer value durations.

14. A network entity for wireless communication, comprising:

one or more memories; and one or more processors, coupled to the one or more memories, configured to:

transmit, to a user equipment (UE), an indication of a plurality of first scheduling cycles that are based at least in part on a second scheduling cycle, wherein a sum of respective durations of each of the plurality of first scheduling cycles is equal to a duration of the second scheduling cycle, and wherein the second scheduling cycle is based at least in part on a periodicity of multimedia traffic associated with the UE; and communicate with the UE based at least in part on the plurality of first scheduling cycles.

15. The network entity of claim 14, wherein a duration of a third scheduling cycle of the plurality of first scheduling cycles, and a duration of a fourth scheduling cycle of the plurality of first scheduling cycles, are different durations.

16. The network entity of claim 14, wherein a starting time of a third scheduling cycle of the plurality of first scheduling cycles is aligned with a starting time of the second scheduling cycle; and wherein an ending time of a fourth scheduling cycle of the plurality of first scheduling cycles is aligned with an ending time of the second scheduling cycle.

17. The network entity of claim 14, wherein the one or more processors, to transmit the indication of the plurality of first scheduling cycles, are configured to:

transmit the indication of the plurality of first scheduling cycles in a plurality of time domain offset information elements.

18. The network entity of claim 14, wherein respective starting times of each of the plurality of first scheduling cycles are aligned with a time division duplexing resource configuration for a wireless connection on which the UE communicates with the network entity.

19. The network entity of claim 14, wherein the duration of the second scheduling cycle is based at least in part on a time division duplexing resource configuration for a wireless connection on which the network entity communicates with the UE.

20. The network entity of claim 14, wherein the plurality of first scheduling cycles comprise a plurality of semi-persistent scheduling (SPS) cycles for downlink communication with the network entity; and wherein the one or more processors are further configured to:

transmit one or more downlink communications to the UE based at least in part on the plurality of SPS cycles.

21. The network entity of claim 14, wherein the plurality of first scheduling cycles comprise a plurality of configured grant (CG) cycles for uplink communication with the network entity; and wherein the one or more processors are further configured to:

receive one or more uplink communications from the UE based at least in part on the plurality of CG cycles.

22. The network entity of claim 21, wherein the one or more processors, to transmit the indication of the plurality of first scheduling cycles, are configured to:

transmit respective indications of each of the plurality of CG cycles in respective downlink control information (DCI) communications, wherein each of the plurality of CG cycles schedules a respective physical uplink shared channel (PUSCH) resource.

23. A user equipment (UE) for wireless communication, comprising:

one or more memories; and one or more processors, coupled to the one or more memories, configured to:

obtain a scheduling cadence value that corresponds to a periodicity of multimedia traffic associated with the UE, wherein the scheduling cadence value is a value in hertz (Hz) or frames per second (FPS); and communicate with a network entity based at least in part on the scheduling cadence value.

24. The UE of claim 23, wherein the one or more processors, to obtain the scheduling cadence value, are configured to:

receive an indication of the scheduling cadence value from the network entity.

25. The UE of claim 23, wherein the scheduling cadence value comprises:

a configured grant cadence value, or a semi-persistent scheduling cadence value.

26. The UE of claim 23, wherein the one or more processors are further configured to:

determine a slot within a subframe based at least in part on a time division duplexing configuration pattern; and wherein the one or more processors, to communicate with the network entity in the subframe, are configured to:

communicate with the network entity in the slot.

27. The UE of claim 23, wherein the one or more processors are further configured to:

receive an indication of an available slot within a subframe for the multimedia traffic, wherein the available slot is based at least in part on a time division duplexing configuration pattern; and wherein the one or more processors, to communicate with the network entity in the subframe, are configured to:

communicate with the network entity in the slot.

28. A user equipment (UE) for wireless communication, comprising:

one or more memories; and one or more processors, coupled to the one or more memories, configured to:

determine a time domain resource based at least in part on a periodicity of multimedia traffic associated with the UE, wherein the periodicity comprises a non-integer value; and communicate with a network entity in the time domain resource.

29. The UE of claim 28, wherein the one or more processors, to determine the time domain resource, are configured to:

determine a slot based at least in part on a time division duplexing configuration pattern; and wherein the one or more processors, to communicate with the network entity in the time domain resource, are configured to:

communicate with the network entity in the slot.

30. The UE of claim 28, wherein the one or more processors are further configured to:

receive an indication of an available slot within a subframe for the multimedia traffic, wherein the available slot is based at least in part on a time division duplexing configuration pattern; and wherein the one or more processors, to communicate with the network entity in the time domain resource, are configured to:

communicate with the network entity in the available slot.

\* \* \* \* \*